(12) United States Patent
Sankrithi

(10) Patent No.: US 7,750,491 B2
(45) Date of Patent: Jul. 6, 2010

(54) FLUID-DYNAMIC RENEWABLE ENERGY HARVESTING SYSTEM

(75) Inventor: Mithra M. K. V. Sankrithi, Lake Forest Park, WA (US)

(73) Assignee: RIC Enterprises, Lake Forest Park, WA (US)

( * ) Notice: Subject to any disclaimer, the term of this patent is extended or adjusted under 35 U.S.C. 154(b) by 290 days.

(21) Appl. No.: 11/986,240

(22) Filed: Nov. 21, 2007

(65) Prior Publication Data

US 2009/0127861 A1    May 21, 2009

(51) Int. Cl.
- F03B 13/00    (2006.01)
- H02P 9/04    (2006.01)
- F03B 13/10    (2006.01)
- F03D 9/00    (2006.01)

(52) U.S. Cl. .............................. 290/54; 290/43; 290/44; 290/55

(58) Field of Classification Search .................... 290/43, 290/44, 54, 55
See application file for complete search history.

(56) References Cited

U.S. PATENT DOCUMENTS

| | | | | | |
|---|---|---|---|---|---|
| 2,387,907 | A | * | 10/1945 | Hook | 114/276 |
| 3,504,988 | A | * | 4/1970 | Stenner | 416/9 |
| 3,730,643 | A | * | 5/1973 | Davison | 416/8 |
| 3,762,353 | A | * | 10/1973 | Shutt | 114/39.24 |
| 3,789,789 | A | * | 2/1974 | Cleary | 114/280 |
| 4,302,684 | A | * | 11/1981 | Gogins | 290/55 |
| 4,572,962 | A | * | 2/1986 | Shepard | 290/55 |
| 4,589,344 | A | * | 5/1986 | Davison | 104/24 |
| 4,677,928 | A | * | 7/1987 | Hoyt | 114/102.29 |
| 4,756,666 | A | * | 7/1988 | Labrador | 416/8 |
| 4,859,146 | A | * | 8/1989 | Labrador | 416/8 |
| 4,922,845 | A | * | 5/1990 | Boyd | 114/39.15 |
| 5,063,869 | A | * | 11/1991 | Bielefeldt | 114/39.24 |
| 5,119,748 | A | * | 6/1992 | Nishimura | 114/102.16 |
| 5,168,824 | A | * | 12/1992 | Ketterman | 114/276 |
| 5,454,339 | A | * | 10/1995 | Hall | 114/39.21 |
| 5,684,335 | A | * | 11/1997 | Ou | 290/54 |
| 5,744,871 | A | * | 4/1998 | Robles Akesolo | 290/55 |
| 6,016,759 | A | * | 1/2000 | Russell | 114/39.21 |
| 6,216,621 | B1 | * | 4/2001 | Russell | 114/39.21 |
| 6,341,571 | B1 | * | 1/2002 | Russell et al. | 114/39.21 |
| 6,578,507 | B1 | * | 6/2003 | Bergmark | 114/39.24 |
| 6,691,632 | B2 | * | 2/2004 | Stevens | 114/39.31 |
| 6,740,988 | B2 | * | 5/2004 | Tseng | 290/44 |
| 6,779,473 | B1 | * | 8/2004 | Maconochie | 114/39.13 |
| 6,956,300 | B2 | * | 10/2005 | Gizara | 290/43 |
| 7,075,191 | B2 | * | 7/2006 | Davison | 290/54 |
| 7,298,056 | B2 | * | 11/2007 | Gizara | 290/54 |

(Continued)

Primary Examiner—T C Patel
Assistant Examiner—Pedro J Cuevas

(57) ABSTRACT

The invention provides a fluid-dynamic renewable energy harvesting system which includes fluid-foil means for interfacing with a fluid current such as a water current or wind or both, and which includes energy harvesting means utilizing fluid current driven periodic motion of the fluid-foil means for capturing fluid-dynamic renewable energy and converting it into usable energy in a desired form such as electricity. The invention provides devices, methods and systems for harvesting renewable energy for small-scale, medium-scale and large-scale applications, to provide real and substantial benefits towards efficiently fulfilling energy needs while also more broadly serving humanity and our global environment. The various embodiments of the invention provide energy with zero consumption of fossil fuels and zero emissions of greenhouse gases, and some selectively sited embodiments can beneficially counter global warming induced ice melting.

17 Claims, 56 Drawing Sheets

U.S. PATENT DOCUMENTS

| | | | |
|---|---|---|---|
| 7,604,454 B2* | 10/2009 | Power et al. | 415/3.1 |
| 2004/0080166 A1* | 4/2004 | Davidson | 290/55 |
| 2008/0157526 A1* | 7/2008 | Davison et al. | 290/3 |
| 2008/0240864 A1* | 10/2008 | Belinsky | 405/223.1 |
| 2009/0127862 A1* | 5/2009 | Sankrithi | 290/55 |
| 2009/0218822 A1* | 9/2009 | Rink | 290/54 |

* cited by examiner

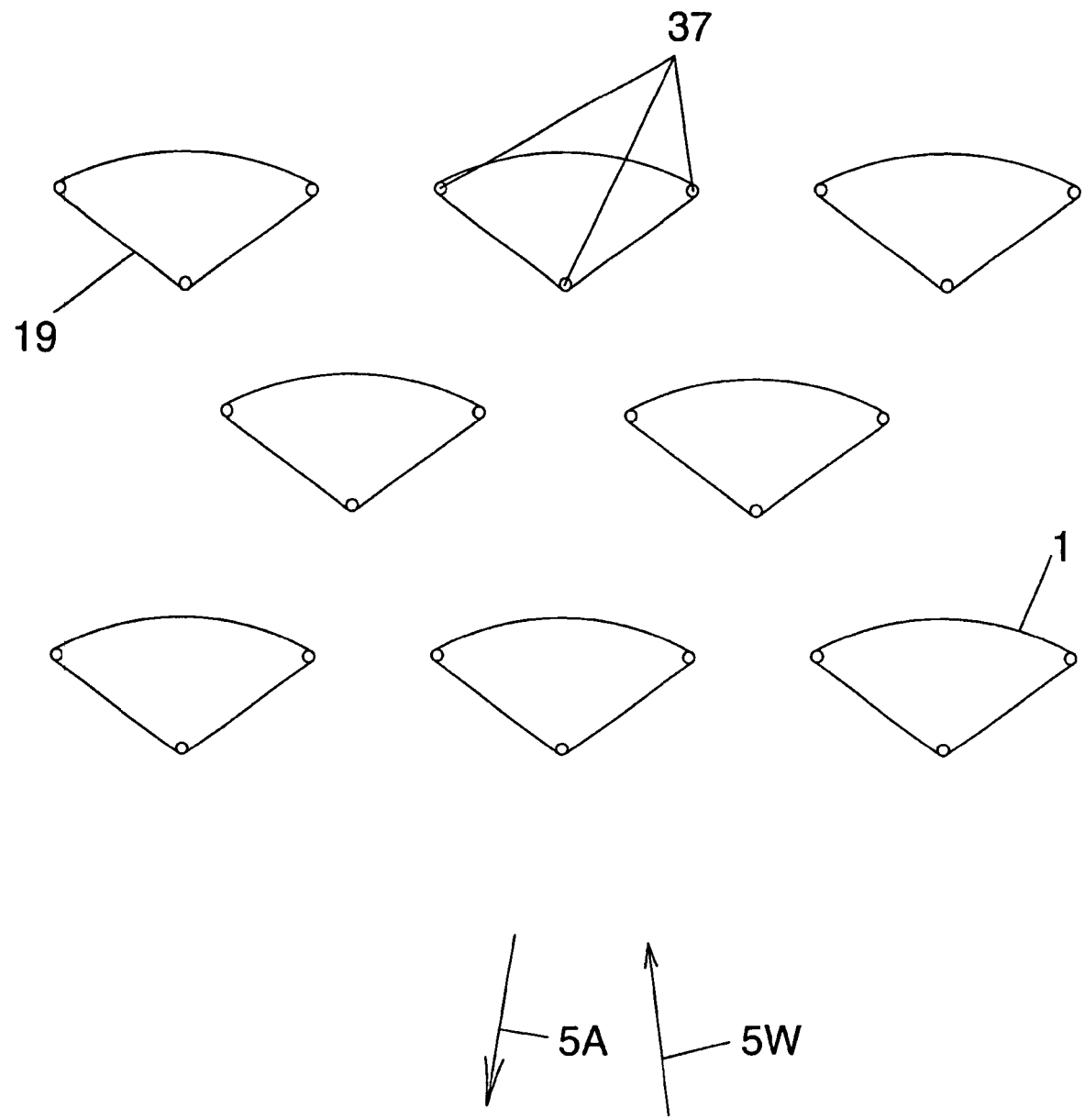

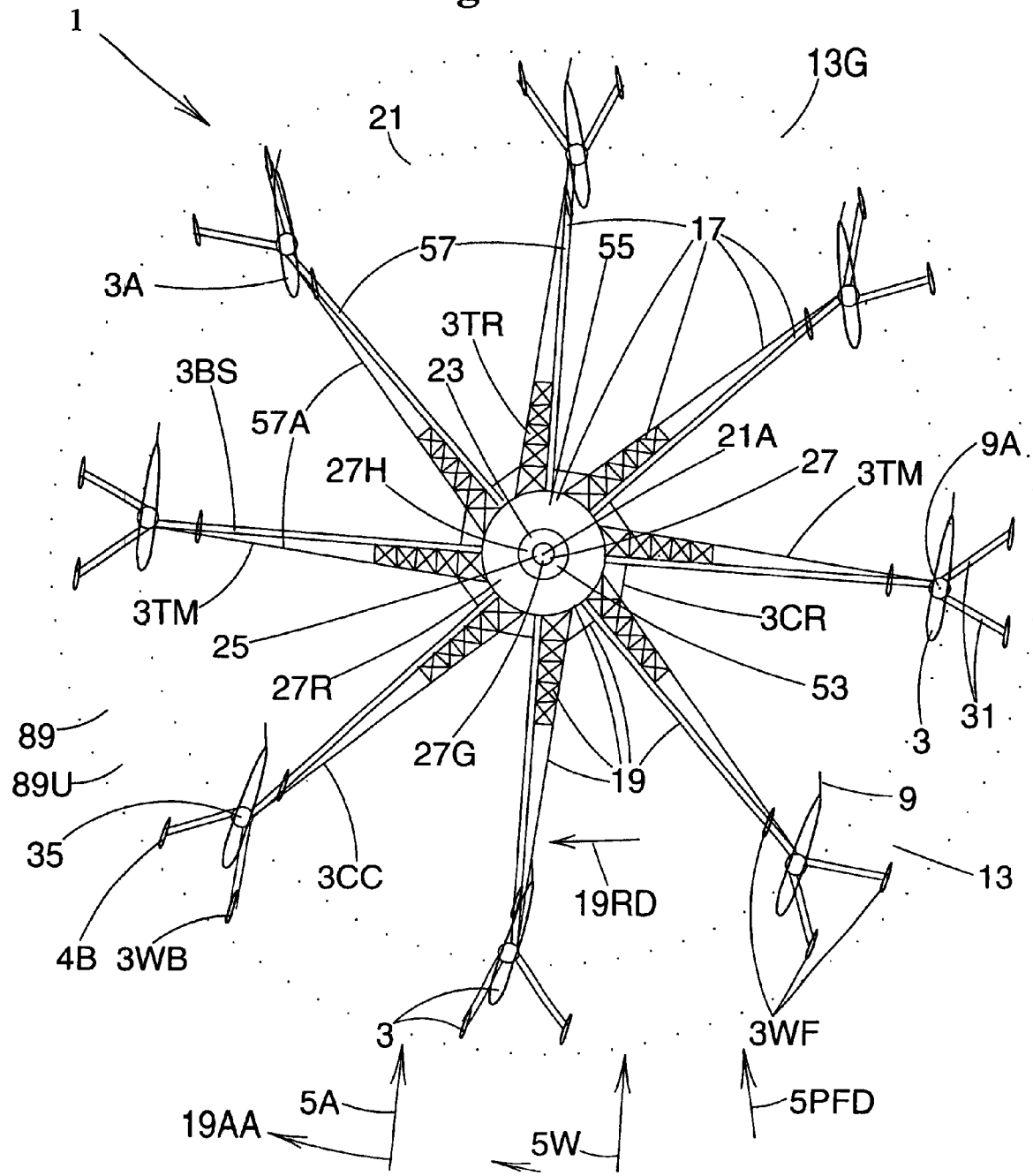

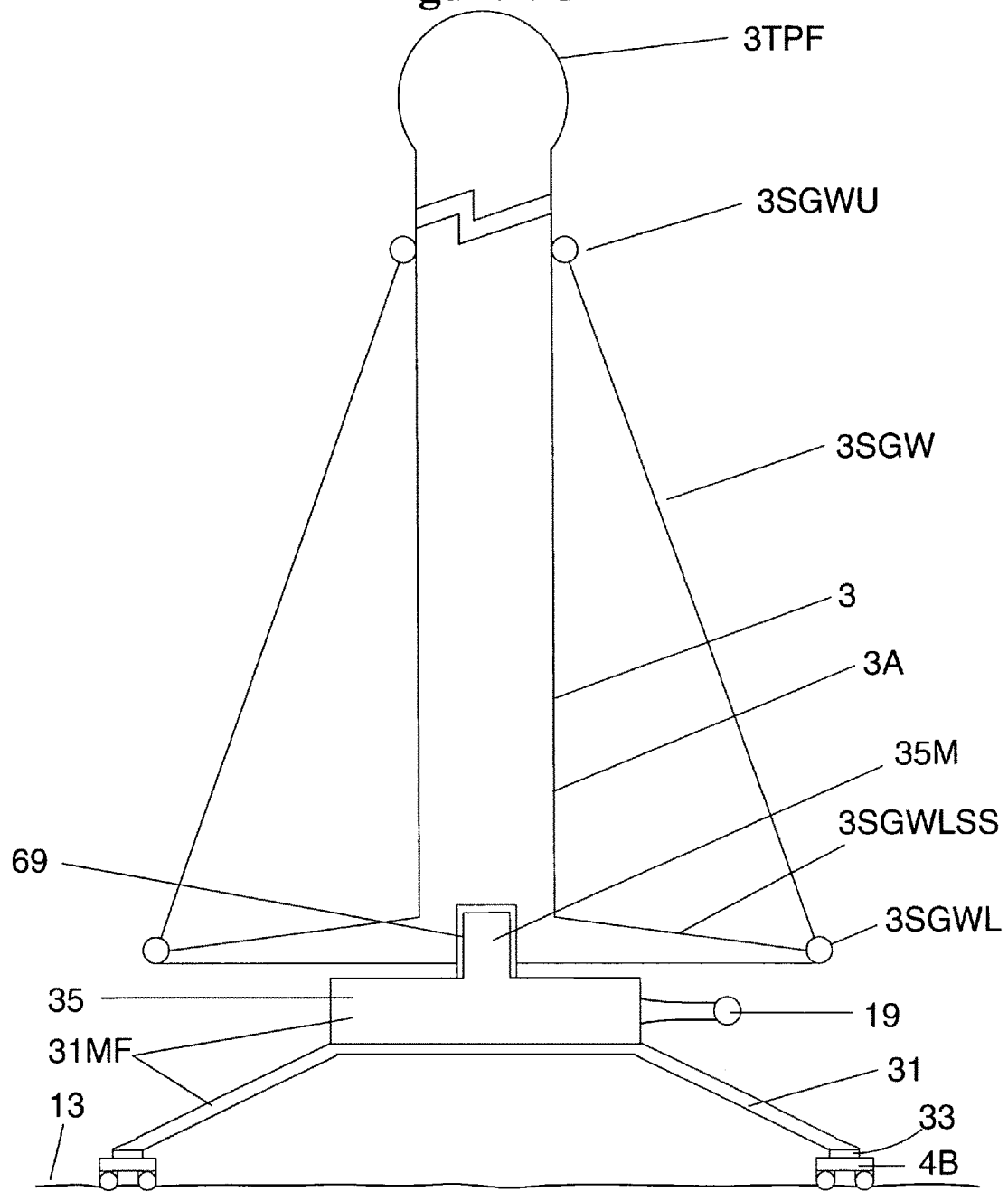

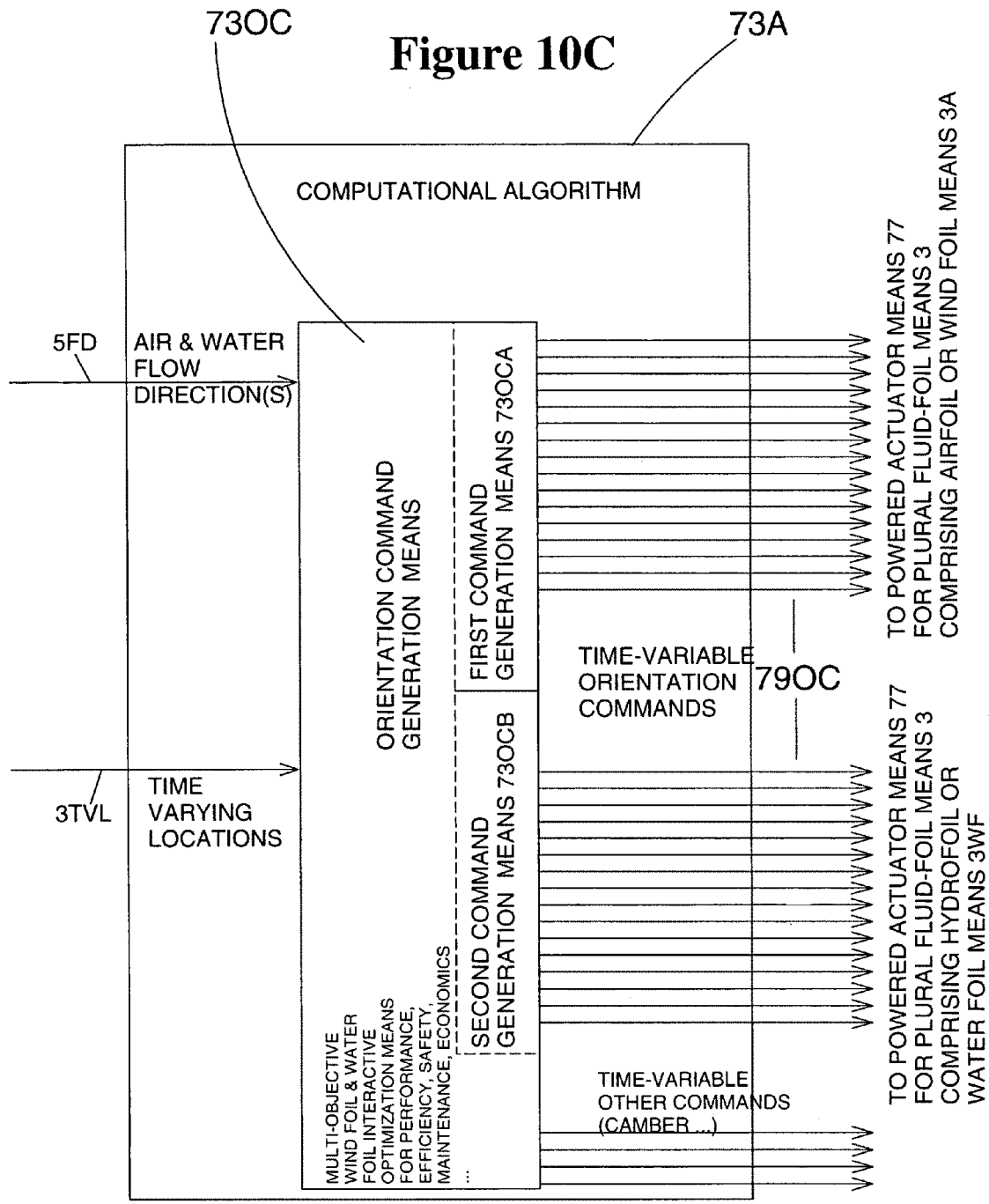

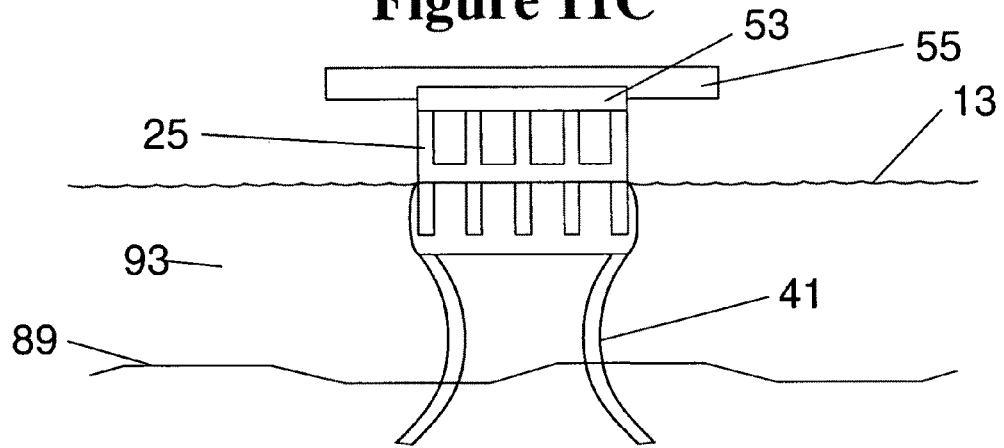
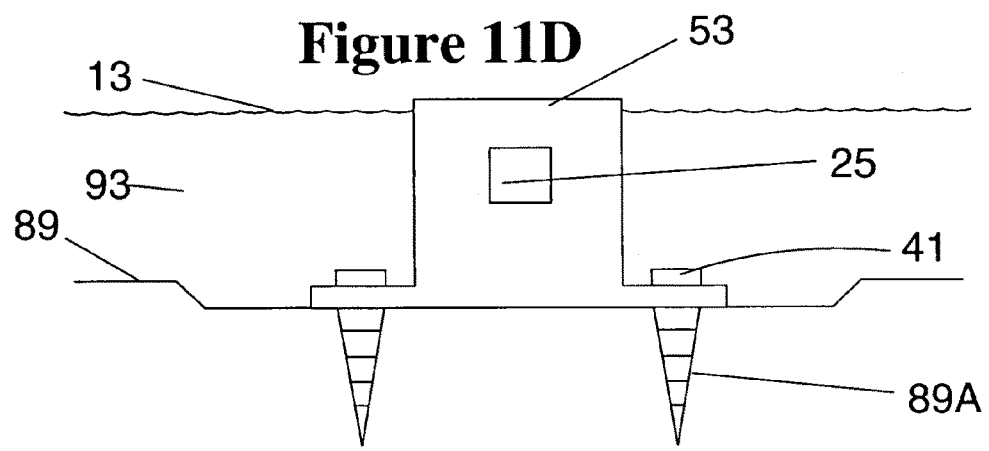
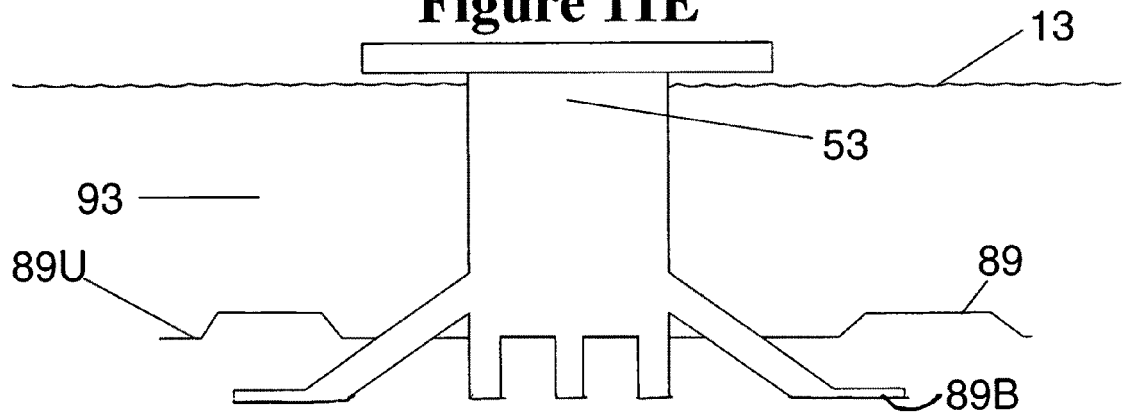

FLUID-DYNAMIC RENEWABLE ENERGY HARVESTING SYSTEM

CROSS-REFERENCE TO RELATED PATENT APPLICATIONS

This patent application entitled "FLUID-DYNAMIC RENEWABLE ENERGY HARVESTING SYSTEM" is being filed simultaneously with the related patent application entitled "WIND ENERGY HARVESTING SYSTEM ON A FROZEN SURFACE" also invented by Mithra M. K. V. Sankrithi and hereby incorporated herein by reference.

BACKGROUND OF THE INVENTION

As the World's human population grows and as the economic prosperity of our global population grows, the energy demand of our global population also grows. With limited availability of oil reserves, there is a growing need for the conception, development and deployment of cost-effective and large-scale renewable energy alternatives. The continued use of fossil fuels to meet current and emerging energy needs also has very negative environmental consequences, including massive emissions of carbon dioxide and other pollutants, along with exacerbation of global warming and climate change effects. These factors provide strong motivation for the invention, development and deployment of cost-effective, large-scale renewable energy alternatives.

The Sun provides enormous quantities of energy to the World every second, and that energy can be found in harvestable form as direct solar energy, as wind energy, and as water current energy in ocean & sea currents and in flowing rivers & streams.

BRIEF SUMMARY OF THE INVENTION

The present invention provides a renewable energy harvesting system for harvesting fluid-dynamic renewable energy as contained in one or more of wind or air current energy, ocean current energy, sea current energy, tidal current energy, river current energy, and stream current energy.

The invention provides a fluid-dynamic renewable energy harvesting system which includes fluid-foil means for interfacing with a fluid current such as a water current or wind or both, and which includes energy harvesting means utilizing fluid current driven periodic motion of the fluid-foil means, for capturing fluid-dynamic renewable energy and converting it into usable energy in a desired form such as electricity. The invention provides devices, methods and systems for harvesting renewable energy for small-scale, medium-scale and large-scale applications, to provide real and substantial benefits towards efficiently fulfilling energy needs while also more broadly serving humanity and our global environment. The various embodiments of the invention provide energy with zero consumption of fossil fuels and zero emissions of greenhouse gases, and some selectively sited embodiments can act directly to counter global warming induced polar ice melting.

The invention with its several preferred embodiments can be understood from a full consideration of the following specification including drawings, detailed description, and claims.

BRIEF DESCRIPTION OF THE DRAWINGS

FIG. 2A shows a plan view of the same portion of the same preferred embodiment of FIG. 1, while

FIG. 2E shows an alternate embodiment of the invention, wherein each fluid-dynamic renewable energy harvesting system has three rotatable pulleys.

FIG. 3A shows an alternate embodiment that utilizes radial arm structure to connect fluid foils around a rotating hub.

FIG. 8C shows a front view of another embodiment of fluid-foil means support structure.

FIGS. 10A through 10D illustrate aspects of control system means for controlling the fluid-dynamic renewable energy harvesting system.

FIGS. 11A through 11F illustrate side views of a variety of anchoring means.

DETAILED DESCRIPTION

The following section of the specification presents a detailed description of the invention and its various preferred embodiments, with reference to the attached Figures illustrating the invention.

Figure 1:
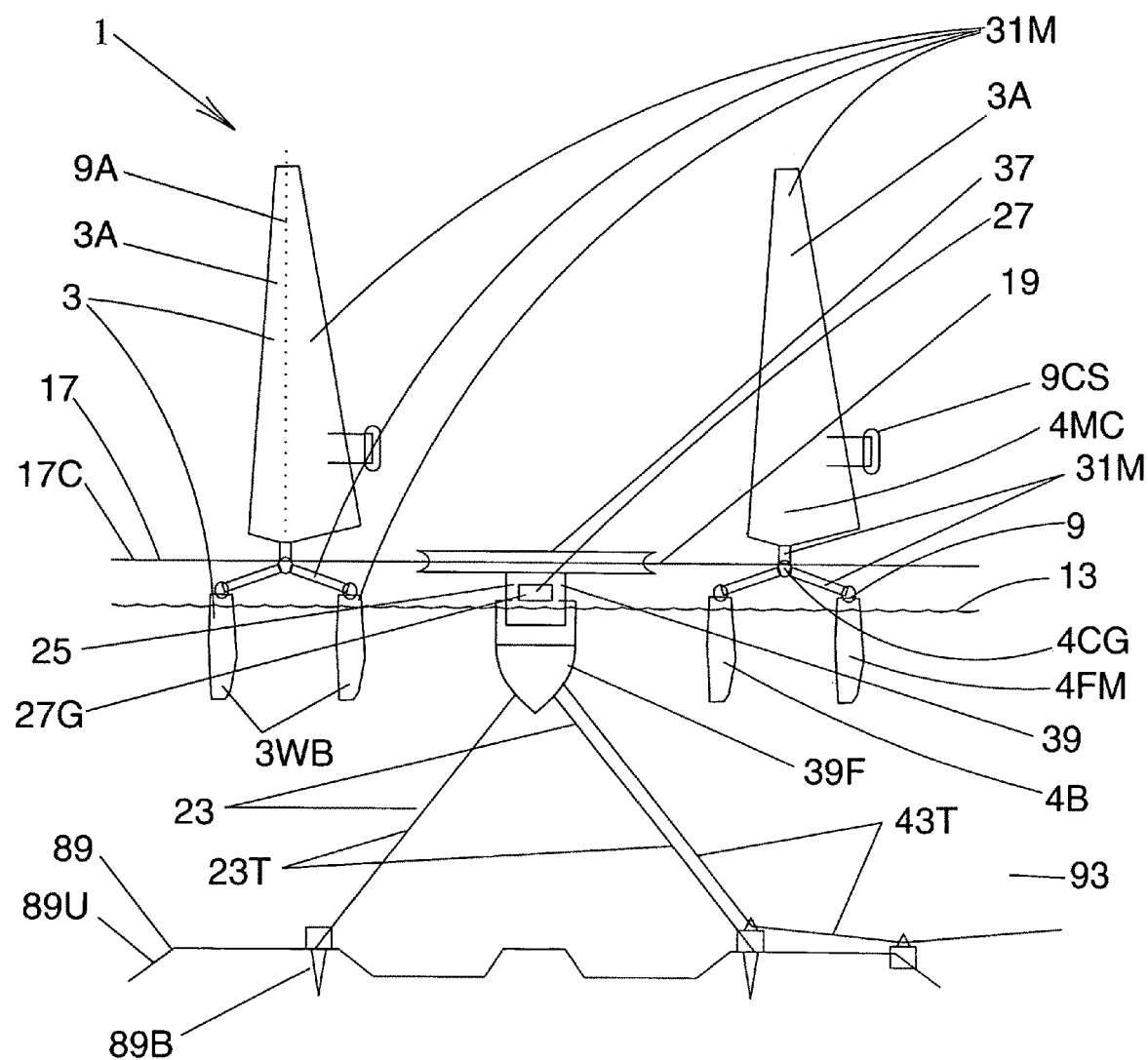
FIG. 1 shows a side view of a portion of one preferred embodiment of a fluid-dynamic renewable energy harvesting system.

FIG. 1 shows a side view of a portion of one preferred embodiment of a fluid-dynamic renewable energy harvesting system.

FIG. 1 illustrates two of a plurality of movable members 31M for a fluid-dynamic renewable energy harvesting system 1. The movable member 31M include fluid-foil means 3 for interfacing with a fluid current, wherein the illustrated fluid-foil means for interfacing with a fluid current include buoyant hydrofoils 3WB for interfacing with a water current in a body of water below a water surface 13. In the illustrated embodiment four approximately vertically oriented buoyant hydrofoils 3WB are used to contribute to buoyancy, which buoyancy provides support forces acting towards supporting the movable members 31M. For each movable member 31M, two of four buoyant hydrofoils 3WB are visible and two are hidden behind. In alternate embodiments any number of buoyant hydrofoils could be used instead of the four per movable member of this illustrated embodiment. The buoyant hydrofoils 3WB have finite thickness and here serve as buoyant support means 4B for utilizing a buoyancy force from water displacement to at least partially contribute to supporting plural fluid-foil means 3 above an underwater ground surface 89U.

FIG. 1 also illustrates connecting means 17 for connecting said fluid-foil means 3 and movable members 31M, here comprising a substantially closed loop cable 17C a portion of which is visible; and including illustrated connecting member 19 that connects the illustrated adjacently-located movable members 31M. The connecting member 19 can be a cable in tension as shown, and in alternate embodiments it could utilize chain, belt and/or rod elements in addition to or instead of a cable.

In the embodiment shown in FIG. 1, movable members 31M further comprise airfoil means 3A for interfacing with an air current; and an airfoil control system including control surface 9CS capable of controlling time-variable airfoil orientations of said airfoil means 3A relative to proximate flow fields of an air current or wind when said air current or wind exists and carries aerodynamic renewable energy in the form of wind kinetic energy. The control surface 9CS positioned by actuator means will orient the airfoil means 3A relative to the air current or wind flow field at an angle of attack suitable for generating a force that has a component that drives the connecting member (e.g., cable) 19. Similarly control system means 9 will orient the buoyant hydrofoils 3WB relative to the water current or flow field at an angle of attack suitable for generating a force that has a component that drives the connecting member (e.g., cable) 19. Thus in the illustrated embodiment wind and water current energy are both captured, by airfoil means 3A and buoyant hydrofoils 3WB respectively, with both these types of fluid-foils 3 then driving the connecting member 19 and connecting means 17 to motion around a rotatable pulley 37. The driven rotational motion of the rotatable pulley 37 powers generator means 27G, to serve as energy harvesting means 25 for harvesting fluid-current energy here including both wind energy and water current energy. The generator means 27G may generate DC or AC power, with various voltages, current and phase attributes, synchronously or asynchronously, and with various other attributes and features as are known from the extensive prior art of electrical generator means for generating electricity.

Note that the embodiments of FIG. 1 and subsequent embodiments can be built and used at many different scales and with morphed component shapes and configurations and relative sizes, within the spirit and scope of the invention. At a relatively small scale the airfoil means 3A may be 1 to 10 meters tall; at a medium scale the airfoil means may be 10 to 100 meters tall; at a large scale the airfoil means may be 100 to 1000 meters tall; and at a giant scale the airfoil means may be 1000 to 10000 meters tall.

FIG. 1 also illustrates an effective axis of rotation 9A around which each of the airfoil means 3A (which are fluid-foil means) can effectively rotate in orientation to some extent, said axis of rotation 9A being substantially vertical in the illustration but more generally being disposed within 60 degrees of vertical during normal operation of the fluid-dynamic energy harvesting system 1.

FIG. 1 thus illustrates a fluid-dynamic renewable energy harvesting system 1, wherein the movable members 31M including airfoil means 3A, each comprise a movable frame 31MF connected to both at least one upwardly extending airfoil means 3A and to at least three downwardly extending buoyant hydrofoils 3WB.

While the illustrated embodiment has four downwardly extending buoyant hydrofoils 3W in each movable member 31M, in alternate embodiments 3, 4, 5, 6, 7, 8, 9, 10, 11, 12, 13, 14, 15, 16, 17, 18, 19, 20 or more buoyant hydrofoils could be incorporated.

FIG. 1 illustrates a fluid-dynamic renewable energy harvesting system 1, wherein the buoyant support means 4B includes movable floating members 4FM that displace some finite volume of liquid water 93; wherein the fluid-foil means 3 include upwardly extending airfoil members 3A supported above the movable floating members 4FM; and wherein said energy conversion means 27 includes a rotating member (connected here to rotatable pulley 37) driven to rotational motion by said motion of said fluid-foil means 3, which rotating member is rotatable around a nonrotating hub member (here hub 39) supported by pulley support float 39F and connected and substantially anchored to a ground surface 89 which is here an underwater ground surface 89U, and which energy conversion means 27 further includes generator means 27G for generating electrical power from the rotational motion of the rotating member relative to the nonrotating hub member.

Means for transmitting energy 43T carry energy from said generator means 27G, such as electrical energy which is the time integral of electrical power generated by said generator means 27G driven by captured wind power and water current power and flowing as mechanical power in the aligned forces acting on said connecting means 17 multiplied by the velocity of said connecting means 17.

In the illustrated fluid-dynamic renewable energy harvesting system 1, at least some (here all) of the airfoil members 3A are also movable relative to the movable floating members 4FM.

This relative movement ability is necessary for the airfoils and hydrofoils to be independently controlled in angle of attack relative to incident flow angles for wind and water currents, which may not be in the same direction.

In the fluid-dynamic renewable energy harvesting system 1 of FIG. 1, the buoyancy force is provided by displacement of liquid water 93 below a water surface 13, in this case by the underwater portions of the buoyant hydrofoils 3WB.

FIG. 1 also illustrates a fluid-dynamic renewable energy harvesting system 1, wherein a portion of said fluid-dynamic renewable energy harvesting system (here comprising the entire movable member 31M supported by the buoyant hydrofoils 3WB) that is supported by said buoyancy force, has a center of gravity location 4CG that is below a metacenter 4MC associated with said buoyancy force.

It is well known in the art of floating entities that floating entities have a metacenter associated with the entity's center of buoyancy and its movement, and that a floating entity will typically float stably when it has a center of gravity location that is below this metacenter. Sometimes there are multiple metacenters associated with different axes of rotation of a floating entity, and in this case it will float stably when it has a center of gravity location below the lowest of the plural metacenters associated with different possible axes of rotation. For cases with water and/or air displacement buoyancy, the concept of stability associated with center of gravity location below one or more equivalent metacenters can be similarly defined by extension.

FIG. 1 also illustrates a fluid-dynamic renewable energy harvesting system 1, wherein position-keeping means 23 are provided, that include at least one of a tether or cable 23T and an anchor 89B fastened to the underwater ground surface 89U.

Figure 2A:
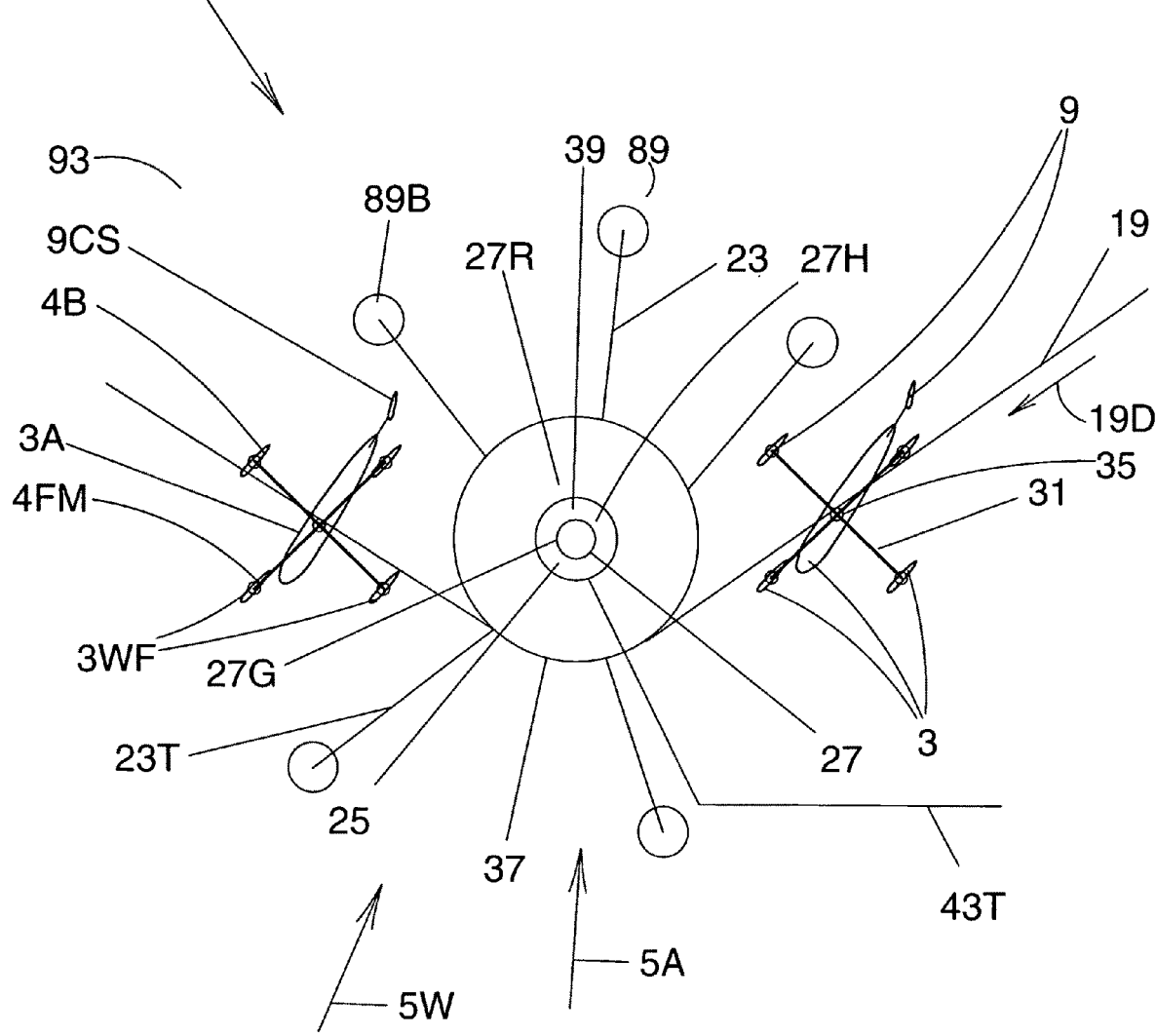
Figure 2B:
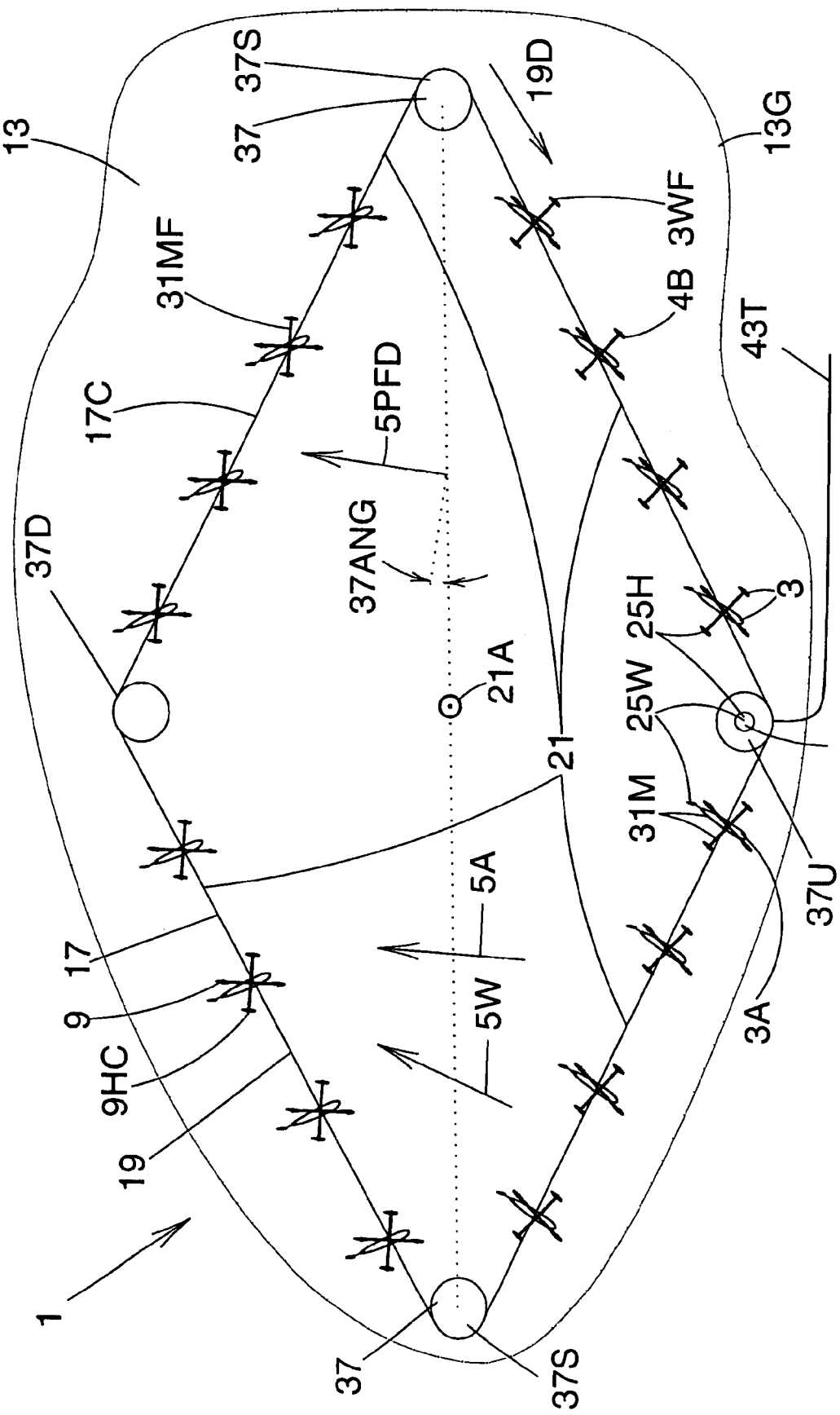
FIG. 2B shows a plan view of this preferred embodiment in its entirety.

FIG. 2A shows a plan view of substantially the same portion of the preferred embodiment of FIG. 1, while FIG. 2B shows a plan view of this preferred embodiment in its entirety.

In addition to elements shown in FIG. 1, FIG. 2A shows arrows or vectors for the wind or air current 5A and water current 5W, as well as the cable travel direction of motion 19D for the connecting member 19 here comprising a cable, as illustrated. FIG. 2A also illustrates the fluid-dynamic renewable energy harvesting system 1, wherein at least some of the airfoil members 3A are also movable relative to said movable floating members 4FM.

FIG. 2A illustrates a fluid-dynamic renewable energy harvesting system 1, wherein buoyant support means 4B includes movable floating members 4FM that displace some finite volume of liquid water 93; wherein the fluid-foil means 3 include upwardly extending airfoil members 3A supported above the movable floating members 4FM; and wherein said energy conversion means 27 includes a rotating member 27R driven to rotational motion by said motion of said fluid-foil means 3, which rotating member 27R is rotatable around a nonrotating hub member 27H connected and substantially anchored to the ground surface 89, and which energy conversion means 27 further includes generator means 27G for generating electrical power from the rotational motion of the rotating member 27R relative to the nonrotating hub member 27H.

FIG. 2B shows a full plan view of the preferred embodiment shown in partial views in FIGS. 1 and 2A.

A fluid-dynamic renewable energy harvesting system 1 is shown, wherein plural movable members 31M including movable frames 31MF are connected by connecting means 17. The fluid-dynamic renewable energy harvesting system 1 as illustrated has connecting means 17 that includes a substantially closed-loop cable 17C linking all of the plural fluid-foil means 3 in a closed-loop sequential arrangement.

The connecting means 17 serves as means for connecting the plural fluid-foil means in a sequential arrangement around a circuit 21 of closed periphery topology enclosing an axis of revolution 21A, as illustrated, wherein said axis of revolution 21A is disposed within 60 degrees of vertical (vertical being out from the page in this plan view).

The connecting means 17 here illustrated includes connecting members 19 that comprise at least one of connecting cable elements and connecting rod elements.

The closed-loop cable 17C loops around at least two buoyantly supported rotatable pulleys 37.

The fluid-dynamic renewable energy harvesting system 1 as shown in this plan view is configured wherein two specific pulleys 37S of the at least two buoyantly supported rotatable pulleys 37, are disposed such that a line connecting their respective centers of rotation is disposed within plus or minus 40 degrees from a line perpendicular to a time averaged prevailing flow direction 5PFD of a fluid current which may be the prevailing flow direction of the water current 5W or prevailing flow direction of the wind or air current 5A or a linear combination of the two.

The fluid-dynamic renewable energy harvesting system 1 is illustrated in FIG. 2B, further comprising at least one additional specific pulley of the at least two buoyantly supported rotatable pulleys 37, which at least one additional specific pulley includes at least one of (a) an additional specific downstream pulley that is located downstream 37D or a positive distance along said time averaged prevailing direction, relative to either of the two specific pulleys, and (b) an additional specific upstream pulley 37U that is located upstream or a negative distance along said time averaged prevailing direction, relative to either of the two specific pulleys 37S.

The illustrated embodiment of the fluid-dynamic renewable energy harvesting system 1 has both an upstream pulley 37U and a downstream pulley 37D, and is contained substantially within a desired geographic envelope 13G.

FIG. 2B also illustrates wind energy harvesting means 25A that includes an airfoil control system capable of controlling time-variable airfoil orientations of the airfoil means 3A relative to proximate flow fields of the wind or air current 5A.

FIG. 2B also illustrates the buoyant support means 4B that includes said plural hydrofoil means 3WF of finite thickness; further comprising water current energy harvesting means 25H including hydrofoil control system means 9HC, for converting a portion of water current kinetic energy when a water current 5W exists and carries water current energy in the form of said water current kinetic energy.

FIGS. 1, 2A and 2B together illustrate one preferred embodiment of the invention that utilizes fluid-foils 3 that include airfoil means 3A and hydrofoils 3W. It should be understood that alternate and variant embodiments may have only one or the other of airfoils and hydrofoils.

FIGS. 1, 2A and 2B together illustrate a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement, including connecting members 19 that connect adjacently-located fluid-foil means in said sequential arrangement; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

FIGS. 1, 2A and 2B together illustrate a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent; said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B comprising at least one of a float, an inflated float, a pontoon, a hull, a catamaran hull, a trimaran hull, multiple connected hulls, plural hydroskis with finite thickness and plural hydrofoils with finite thickness, for utilizing a buoyancy force from water displacement to at least partially contribute to supporting said plural fluid-foil means 3 above an underwater ground surface 89U;

connecting means 17 for connecting said plural fluid-foil means in a sequential arrangement, including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

FIGS. 1, 2A and 2B together illustrate a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement around a circuit 21 of closed periphery topology enclosing an axis of revolution 21A, wherein said axis of revolution is disposed within 60 degrees of vertical; said connecting means 17 including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means 3 as they revolve around closed circuit paths substantially corresponding to said circuit 21, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

Note that each fluid foil (airfoil or water foil) path may vary somewhat from the circuit 21, being offset by particular fluid foil location and or cable movement and or fluid force induced path displacements.

FIGS. 1, 2A and 2B together illustrate a fluid-dynamic renewable energy harvesting system 1, wherein said fluid-foil means 3 for interfacing with a fluid current comprise buoyant hydrofoils for interfacing with a water current; wherein said buoyant hydrofoils 3WB contribute to said buoyancy force; wherein said proximate flow fields of said fluid current 5 when said fluid current exists comprise proximate flow fields of a water current 5W when said water current exists; wherein said fluid-dynamic renewable energy in the form of fluid-dynamic kinetic energy comprises water current renewable energy in the form of water current kinetic energy; wherein said time-variable fluid-dynamic forces comprise time-variable hydrodynamic forces;

and further comprising movable members 31M at least partially supported by said buoyancy force, which movable members 31M include airfoil means 3A for interfacing with an air current; and wherein said energy harvesting means 25 further comprises wind energy harvesting means 25A that includes an airfoil control system capable of controlling time-variable airfoil orientations of said airfoil means 3A relative to proximate flow fields of said air current 5A when said air current exists and carries aerodynamic renewable energy in the form of wind kinetic energy, for converting a portion of said wind kinetic energy into net work on said airfoil means over the course of a cycle of airfoil periodic motion of said airfoil means, by utilizing time-variable aerodynamic forces acting on said airfoil means 3A at said time-variable airfoil orientations to further contribute to driving said airfoil periodic motion.

Note that for variant embodiments the airfoil periodic motion may or may not be equal to the hydrofoil substantially periodic motion.

The embodiment illustrated in FIGS. 1, 2A and 2B together, also embodies a fluid-dynamic renewable energy harvesting system 1, wherein liquid water 93 being displaced by water displacement, comprises water of at least one of an ocean, a sea, an inlet, a bay, a gulf, a sound, a strait, a channel, a passage, an arm, a reach, a harbor, a port, an estuary, a lake, a reservoir, a pond, a pool, a river, a stream, a brook, a creek, a canal, a bog, a swamp, a slough, and a marsh.

The embodiment illustrated in FIGS. 1, 2A and 2B together, also embodies a fluid-dynamic renewable energy harvesting system 1, wherein the buoyant support means 4B support movable members 31M, with underwater portions of the buoyant support means 4B displacing a volume of liquid water 93 beneath a water surface 13 to generate a corresponding hydrostatic buoyant support force, and with water engaging surfaces of the buoyant support means 4B capable of translational sliding motion relative to liquid water 93 beneath the water surface 13.

In variant embodiments the buoyant support means 4B may comprise one or more of hulls, submerged hydrofoil floats, hydroskis, floats or buoys. Buoyant support means may also be combined or integrated with hydrodynamic support means over and above the hydrostatic support inhering in the buoyant support means 4B.

The embodiment illustrated in FIGS. 1, 2A and 2B together, also embodies a fluid-dynamic renewable energy harvesting system 1, wherein a fluid current 5 comprises an air current or wind 5, wherein renewable energy as fluid-dynamic kinetic energy comprises air current or wind energy, and wherein fluid-foil means 3 comprise airfoil means 3A.

The embodiment illustrated in FIGS. 1, 2A and 2B together, also embodies a fluid-dynamic renewable energy harvesting system 1, wherein a fluid current 5 comprises a water current 5W beneath a water surface 13, wherein renewable energy as fluid-dynamic kinetic energy comprises water current energy, and wherein fluid-foil means 3 comprise hydrofoil (or water foil) means 3WF.

The embodiment illustrated in FIGS. 1, 2A and 2B together, also embodies a fluid-dynamic renewable energy harvesting system 1, wherein buoyant support means 4B includes plural hydrofoil means 3WF of finite thickness; wherein the fluid-foil means 3 comprise the plural hydrofoil means 3WF with finite thickness and wherein the fluid current 5 when the fluid current exists comprises a water current 5W when said water current exists.

The embodiment illustrated in FIGS. 1, 2A and 2B together, also embodies a fluid-dynamic renewable energy harvesting system 1, wherein the buoyant support means 4B includes said plural hydrofoil means 3WF of finite thickness; further comprising water current energy harvesting means 25H including hydrofoil control system means 9HC, for converting a portion of water current kinetic energy when a water current 5W exists and carries water current energy in the form of said water current kinetic energy, into net work on said plural hydrofoil means 3WF over the course of a cycle of substantially periodic hydrofoil motion of said plural hydrofoil means 3WF, by utilizing time-variable fluid-dynamic pressure distributions and resulting hydrodynamic forces acting on said plural hydrofoil means 3WF at time-variable hydrofoil orientations to contribute to driving said substantially periodic hydrofoil motion when said water current 5W exists and carries said water current energy in the form of said water current kinetic energy.

Some representative geographic locations for the embodiment of the invention illustrated in FIGS. 1, 2A and 2B include water surfaces that may be present anywhere in the World, including portions of the Atlantic Ocean, Pacific Ocean, Indian Ocean, Arctic Ocean, any and all Seas, bays, gulfs, sounds, channels, straits, lakes, reservoirs, rivers, and other bodies of water. This embodiment of the invention will be particularly beneficial and offer synergistic benefits at locations where both wind energy and water current energy often exist. An example of such a location is off the eastern coast of the United States, such as the Straits of Florida and the Atlantic Ocean just east of Florida and Georgia and South and North Carolina, where there is a huge amount of water current kinetic energy (on the order of 50,000 megawatts) in the Gulf Stream, as well as significant offshore wind energy to be tapped. Tapping the combination of water current and wind energy enables reduced statistical variation of the renewable energy rate (i.e., power) being fed into a utility electrical grid, as there are two separate complementary energy sources.

Tapping the Gulf Stream kinetic energy can also have a beneficial effect in reducing melting of the ice cap on Kalaallit Nunaat (Greenland) and pack ice in the Arctic Ocean, by reducing heat transfer to those areas and thereby reducing temperatures in those areas. This could be an effective avenue towards combating ice melt and rising ocean levels caused by global warming, in addition to the other benefit mechanism of the renewable energy replacing fossil fueled energy and thereby reducing global carbon dioxide emissions. Similar benefits can accrue from tapping the North Atlantic Drift and Norwegian Currents in the North Atlantic, the Kuroshio and Alaska Currents in the North Pacific, the Brazil Current in the South Atlantic, the Agulhas and Mozambique Currents in the South Indian Ocean, and the East Australia Current in the South Pacific, along with winds in those areas. Another area of huge power potential is south of Australia, New Zealand and South America, where tremendous power densities are contained both in the westerly water currents of the Antarctic Circumpolar Current and the westerly winds of the Roaring Forties and Howling Fifties and Screaming Sixties. Other areas of high potential are locations where strong tidal streams (i.e., tidal water currents) exist in addition to strong winds, such as the Bay of Fundy, Ungava Bay, Pentland Firth, Strait of Gibraltar, Strait of Messina, Gulf of Cambay, Penzhinsk Bay, the Bering Strait, Cook Inlet and many other locations. Still other areas of high potential are locations with strong river or estuarine currents exist in addition to strong winds.

FIGS. 1, 2A and 2B also illustrate a fluid-dynamic renewable energy harvesting system 1, comprising:

a plurality of movable members wherein buoyancy provides support forces acting towards supporting said movable members, and wherein said movable members include fluid-foil means for interfacing with a fluid current;

connecting member means for connecting said movable members in a sequential arrangement, comprising connecting elements that connect adjacently-located movable members in said sequential arrangement;

position-keeping means for maintaining said fluid-dynamic renewable energy harvesting system substantially within a desired geographic envelope; and energy harvesting means that includes a control system capable of controlling time-variable orientations of said fluid-foil means relative to proximate flow fields of said fluid current when said fluid current exists and carries fluid-dynamic renewable energy in the form of fluid-dynamic kinetic energy, for converting a portion of said fluid-dynamic kinetic energy into net work on said fluid-foil means over the course of a cycle of substantially periodic motion of said fluid-foil means, by utilizing time-variable fluid-dynamic forces acting on said fluid-foil means at said time-variable orientations to contribute to driving said substantially periodic motion;

and wherein said energy harvesting means further includes conversion means for converting at least some of said net work into usable energy in a desired form.

FIGS. 1, 2A and 2B also illustrate a fluid-dynamic renewable energy harvesting system 1, comprising:

a movable member wherein buoyancy provides support force acting towards supporting said movable member, and wherein said movable member includes fluid-foil means for interfacing with a fluid current;

position-keeping means for maintaining said fluid-dynamic renewable energy harvesting system substantially within a desired geographic envelope; and energy harvesting means that includes a control system capable of controlling time-variable orientation of said fluid-foil means relative to a proximate flow field of said fluid current when said fluid current exists and carries fluid-dynamic renewable energy in the form of fluid-dynamic kinetic energy, for converting a portion of said fluid-dynamic kinetic energy into net work on said fluid-foil means over the course of a cycle of substantially periodic motion of said fluid-foil means, by utilizing time-variable fluid-dynamic forces acting on said fluid-foil means at said time-variable orientation to drive said substantially periodic motion;

and wherein said energy harvesting means further includes conversion means for converting at least some of said net work into usable energy in a desired form.

Finally, FIGS. 1, 2A and 2B also illustrate a fluid-dynamic renewable energy harvesting system 1, comprising:

a plurality of movable members wherein a liquid water surface provides support forces acting towards supporting said movable members, and wherein said movable members include fluid-foil means for interfacing with a fluid current;

connecting member means for connecting said movable members in a sequential arrangement, comprising connecting elements that connect adjacently-located movable members in said sequential arrangement;

position-keeping means for maintaining said fluid-dynamic renewable energy harvesting system substantially within a desired geographic envelope; and energy harvesting means that includes a control system capable of controlling time-variable orientations of said fluid-foil means relative to proximate flow fields of said fluid current when said fluid current exists and carries fluid-dynamic renewable energy in the form of fluid-dynamic kinetic energy, for converting a portion of said fluid-dynamic kinetic energy into net work on said fluid-foil means over the course of a cycle of substantially periodic motion of said fluid-foil means, by utilizing time-variable fluid-dynamic forces acting on said fluid-foil means at said time-variable orientations to drive said substantially periodic motion;

and wherein said energy harvesting means further includes conversion means for converting at least some of said net work into usable energy in a desired form.

Figure 2C:
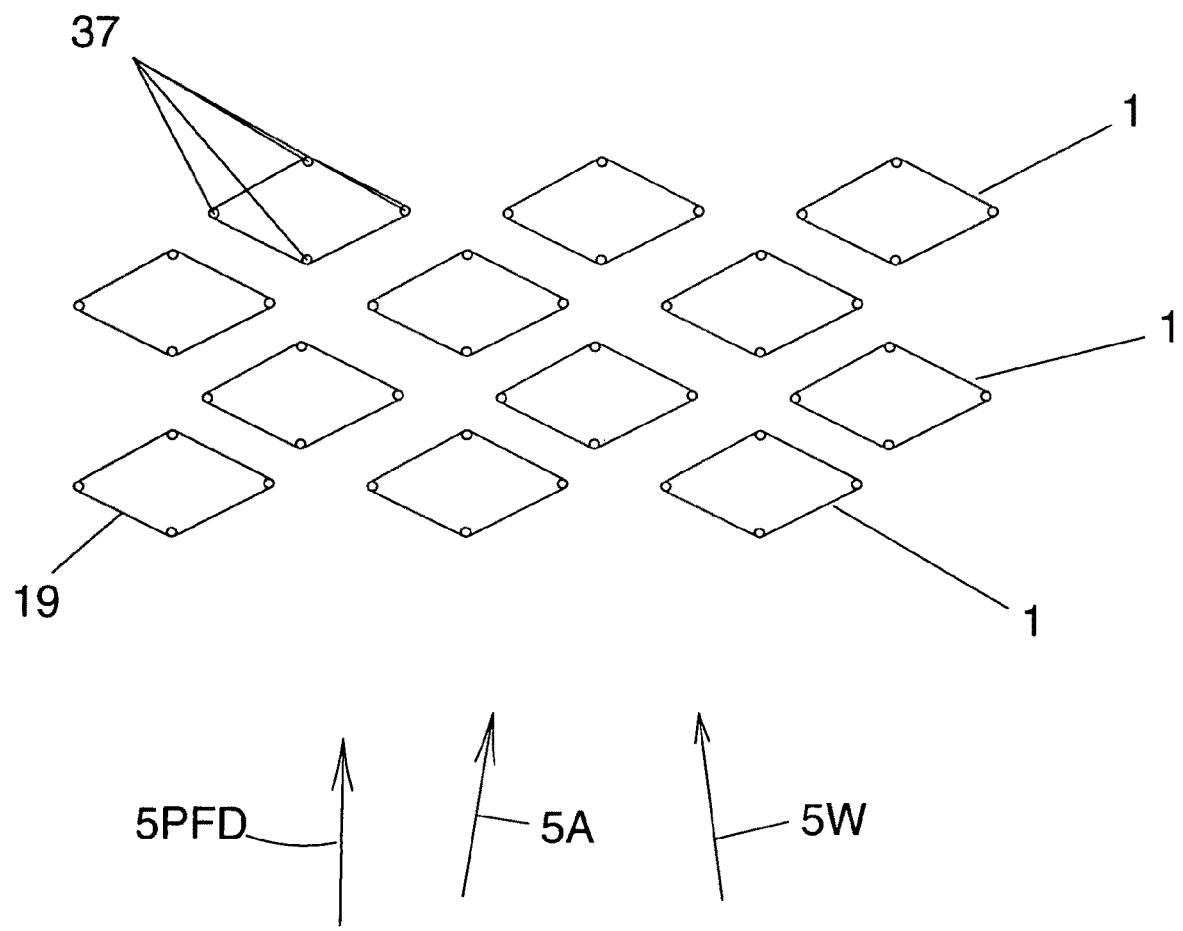
FIG. 2C shows how a plurality of fluid-dynamic renewable energy harvesting systems of the configuration shown in FIG. 2B, can be arranged in a lattice or matrix arrangement.

FIG. 2C shows a plan view of how a plurality of fluid-dynamic renewable energy harvesting systems 1 of the configuration shown in FIG. 2B, can be arranged in a lattice or matrix arrangement comprising a diamond shaped space filling array in this illustrated embodiment. A rectangular array, triangular array, or other array type could be used in alternate embodiments, within the spirit and scope of the invention. Each fluid-dynamic renewable energy harvesting system 1 is wider than it is long relative to a prevailing fluid-flow direction 5PFD, to maximize power harvesting when fluid flow (wind and/or water flow) is in this direction and the fluid-foils (airfoils and/or hydrofoils) generate large thrust values well aligned with the cable direction for a larger portion of the cable circuit. However, note from the lattice arrangement that these renewable energy harvesting systems will be able to intersect and capture energy from wind and water currents coming from any direction and not necessarily aligned with each other or with the prevailing flow direction 5PFD. In variant embodiments the spacing between the fluid-dynamic renewable energy harvesting systems 1 can be increased or decreased, with a benefit of reduced shadowing losses when the spacing is increased, and with a benefit of increased power production per square mile of area when the spacing is decreased.

Figure 2D:
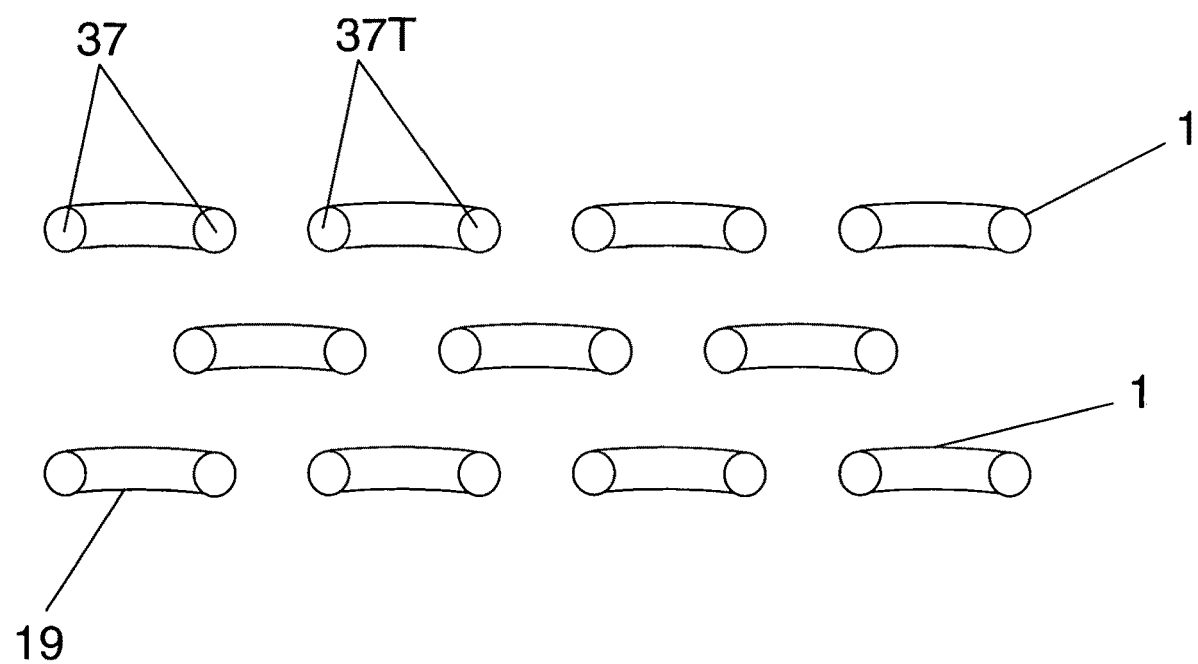
FIG. 2D shows an alternate embodiment of the invention, wherein each fluid-dynamic renewable energy harvesting system has two rotatable pulleys.
Figure 2D:
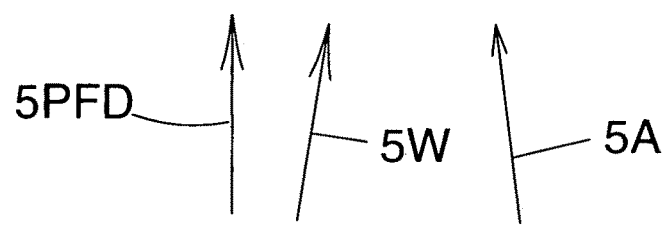

FIG. 2D shows a plan view of an alternate embodiment of the invention, wherein each fluid-dynamic renewable energy harvesting system has rotatable pulleys 37 comprising just two specific pulleys 37T, that are disposed such that a line connecting their respective centers of rotation is aligned within plus or minus 40 degrees from a line perpendicular to a time averaged prevailing fluid-flow direction 5PFD. This configuration is designed to work particularly well in regions where there are a strong aligned prevailing wind and water current directions with relatively little variation over time. A perfect example of such locations is south of Australia, New Zealand and South America, where tremendous power densities are contained in the well-aligned westerly water currents of the Antarctic Circumpolar Current and the westerly winds of the Roaring Forties and Howling Fifties and Screaming Sixties.

FIG. 2E shows a plan view of an alternate embodiment of the invention, wherein each fluid-dynamic renewable energy harvesting system 1 has three rotatable pulleys 37. Note that the lattice array in which the fluid-dynamic renewable energy harvesting systems 1 are arranged, is a triangular space filling array in this embodiment. While the embodiment of FIG. 2E has one more pulley per energy harvesting system 1 than the embodiment of FIG. 2D, it has the balancing benefit of being better able to harvest wind energy for times when the wind or water current directions are non-aligned and/or time-variable to a substantial extent.

Figure 2F:
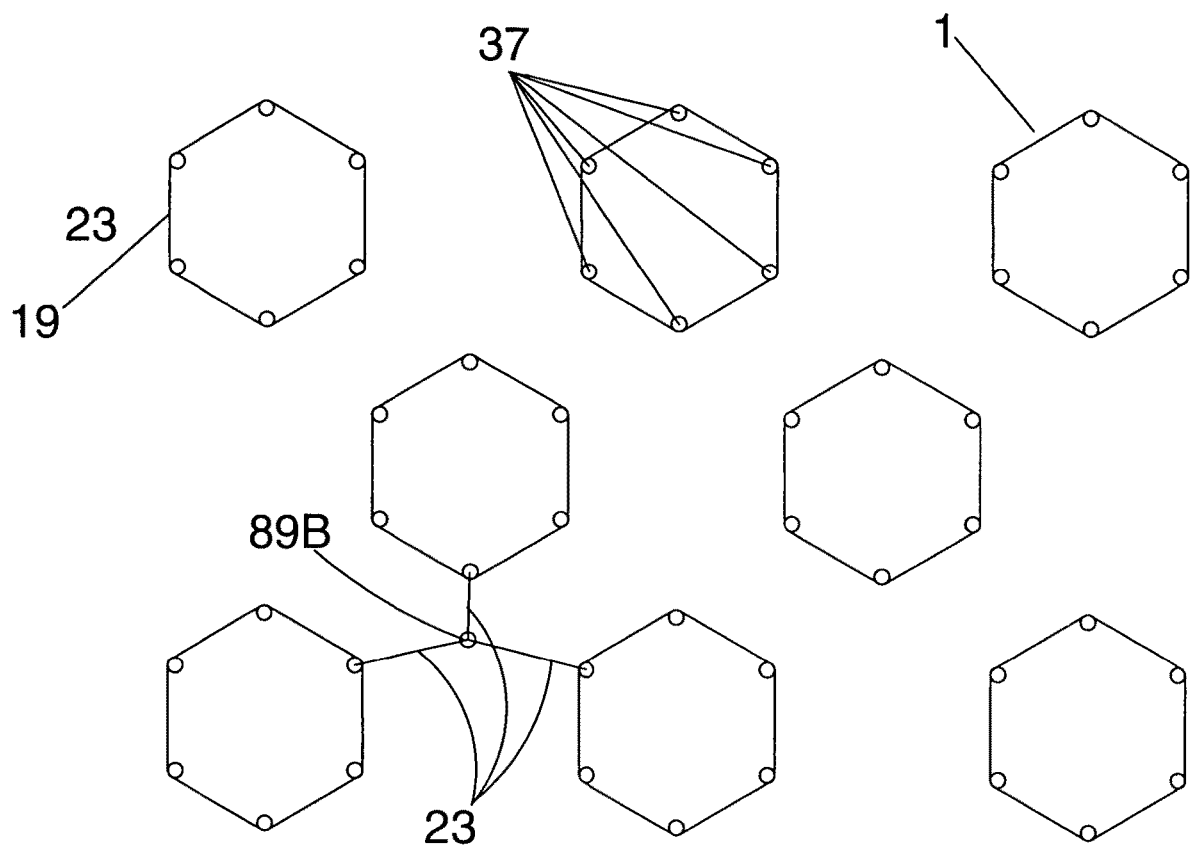
FIG. 2F shows an alternate embodiment of the invention, wherein each fluid-dynamic renewable energy harvesting system has six rotatable pulleys.
Figure 2F:
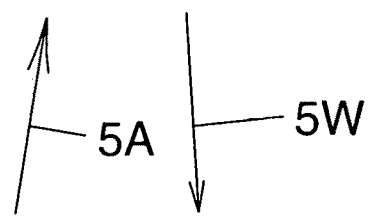

FIG. 2F shows an alternate embodiment of the invention, wherein each fluid-dynamic renewable energy harvesting system 1 has six rotatable pulleys 37. The renewable energy harvesting systems have a hexagonal configuration and are arranged in a hexagonal array, which may be advantageous to provide effective wind and water current power harvesting in regions where there is significant misalignment and/or time variability of wind and water current directions.

FIG. 2F also illustrates a representative tether and anchor geometry, with position-keeping means 23 comprising cables from 3 adjacent vertices of 3 adjacent fluid-dynamic renewable energy harvesting systems 1, connect to a common anchor point with an underwater ground anchor 89B. If similar cables and anchors are provided to secure each vertex of each energy harvesting system, the energy harvesting systems should be securely maintained in their desired locations. Note that shared anchors between adjacent fluid-dynamic renewable energy harvesting systems 1 could be used for arbitrary arrangements or arrays, within the spirit and scope of the invention.

Relative to the embodiment illustrated in FIG. 2F, note that still other embodiments may have one or the other of a hexagonal configuration or a hexagonal array, but not both; and still other embodiments may have arbitrary shapes and arbitrary spatial arrangements.

FIG. 3A shows an alternate embodiment of a fluid-dynamic renewable energy harvesting system 1 that utilizes radial arm structure to connect fluid foils comprising both airfoil or wind foil means 3A and hydrofoil or water foil means 3WF, around a rotatable structure 55 that can rotate around a nonrotating hub 53 that can be connected and anchored to an underwater ground surface via position keeping means 23. This embodiment does not need the rotatable pulleys 37 or the substantially closed-loop cable 17C of the embodiment of FIGS. 1, 2A and 2B.

More specifically, in the embodiment of FIG. 3A a rotatable structure 55 is bearing mounted to be able to rotate around the nonrotating hub 53. The rotatable structure 55 has radial, spoke-like members 57 that project outwards to structurally connect to fluid-foil base members 35 that support fluid-foil means 3 such as upwardly projecting airfoil means 3A. The fluid-dynamic renewable energy harvesting system 1 shown in FIG. 3A has connecting members 19 that include at least one of a fluid-foil base member 35 (included), beam structural element 3BS (included), tubular structural element, plate structural element, truss structural element 3TR (included), connecting structural element, connecting rod element 3CR (included), inflated structural elements, connecting cable element 3CC (included) and connecting tension member 3TM (included).

Long structural members such as the illustrated beam structural elements 3BS in this embodiment, and corresponding tubular structural elements in alternative embodiments, can be manufactured of composite material systems with non-autoclave cure, or with constant section members "extruded" through an autoclave with shaped holes on either side, with multiple constant section members subsequently bonded and/or bolted together to form the desired long structural members. Metal or plastic or composite extrusions could alternatively be used. These structural design and manufacturing considerations can be applied not only for the long radial members here, but also towards other structural elements such as fluid foil spars etc. Various subassemblies can be preassembled by bonding bolting and or other fastening, and/or assembled in situ at a location of installation for the fluid-dynamic renewable energy system 1.

The fluid-foil base members 35 that support the airfoil means 3A, are supported by buoyant support means 4B here comprising buoyant hydrofoils 3WB, through connecting structure 31. In the illustrated embodiment eight airfoil members are shown, but in alternate variant embodiments of this class any number of airfoil members could be used, within the spirit and scope of the invention. The entire assembly of fluid-foil means, fluid-foil base members, connecting structure, spoke-like members and rotatable structure is rotated in cyclic motion around the nonrotating hub in a rotational direction of motion 19RD, driven by wind forces and water current forces acting on the fluid-foil means 3 such as airfoil means 3A and hydrofoil means 3WF, which are varied in angle of attack as a function of wind direction & water current direction, as well as relative azimuth location of each fluid-foil at any given time. FIG. 3A illustrates azimuthal angle 19AA along the rotational direction of motion 19RD, starting with zero angle at incoming flow directions 5A for an air current, and similarly azimuthal angle 19WA along the rotational direction of motion 19RD, starting with zero angle at incoming flow directions 5W for a water current. While the illustrated sense of rotation is clockwise, in alternate embodiments counterclockwise rotation may be used, and for systems of plural energy harvesting systems 1, some might rotate clockwise and others counterclockwise, in optimized arrangements for power extraction and reducing net induced vorticity in the downstream wind and water currents.

The fluid-dynamic renewable energy harvesting system 1 in FIG. 3A utilizes kinetic energy from an air current 5 which comprises at least one of a wind, a gust, a mass flow of air, a volume flow of air, and a fluid-dynamic air movement induced by meteorological effects including but not limited to pressure differential effects; as well as kinetic energy from a water current 5W which comprises at least one of a an ocean current, a tidal current, a river current, an estuary current, a wind-induced water current, a water current modified by at least one of underwater surface geometry and shoreline geometry, a water current modified by Coriolis effects and a water current modified by an Ekman spiral. Energy harvesting means 25 includes energy conversion means 27 located at or near the nonrotating hub 53.

The embodiment of FIG. 3A illustrates a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement, including connecting members 19 that connect adjacently-located fluid-foil means in said sequential arrangement; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

The embodiment of FIG. 3A also illustrates a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B comprising at least one of a float, an inflated float, a pontoon, a hull, a catamaran hull, a trimaran hull, multiple connected hulls, plural hydroskis with finite thickness and plural hydrofoils with finite thickness, for utilizing a buoyancy force from water displacement to at least partially contribute to supporting said plural fluid-foil means 3 above an underwater ground surface 89U;

connecting means 17 for connecting said plural fluid-foil means in a sequential arrangement, including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

The embodiment of FIG. 3A also illustrates a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement around a circuit 21 of closed periphery topology enclosing an axis of revolution 21A, wherein said axis of revolution is disposed within 60 degrees of vertical; said connecting means 17 including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means 3 as they revolve around closed circuit paths substantially corresponding to said circuit 21, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

Note that each fluid foil (airfoil or water foil) path may vary somewhat from the circuit 21, being offset by particular fluid foil location and or cable movement and or fluid force induced path displacements.

The embodiment illustrated in FIG. 3A, also discloses a fluid-dynamic renewable energy harvesting system 1, wherein plural hydrofoil means 3WF are arranged at spaced azimuth angles around an axis 21A of rotation of a rotating member 27R, wherein said plural hydrofoil means 3WF are structurally connected to said rotating member 27R by radial connecting members 57R, wherein said rotating member 27R is rotatable around a nonrotating hub member 27H connected and substantially anchored to said underwater ground surface 89U, and wherein said energy conversion means 27 further includes generator means 27G for generating electrical power from the rotational motion of said rotating member 27R relative to said nonrotating hub 27H.

Figure 3B:
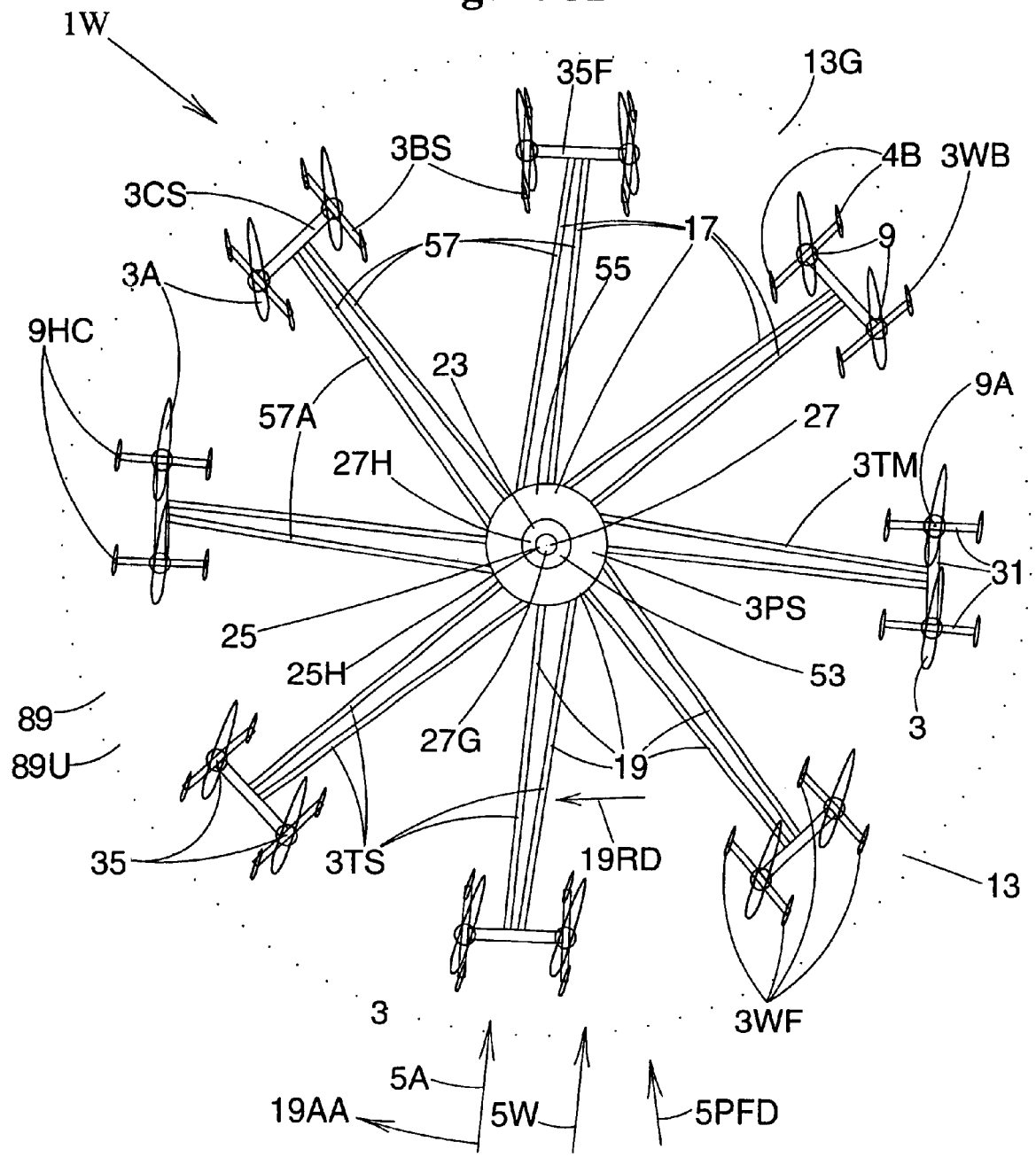
FIG. 3B illustrates another preferred embodiment of the invention, of the same general class of embodiments as that shown in FIG. 3A.

FIG. 3B illustrates another preferred embodiment of the invention, of the same general class of embodiments as shown in FIG. 3A. In this embodiment each pair of fluid-foil means 3 that are airfoil means 3A, is supported by a base frame structure 35F supporting the two airfoil means 3A each via its airfoil or fluid-foil base member 35. Control system means 9 include actuator means in the fluid-foil base members 35 to control the angular orientation and thus control angle of attack of the airfoil means 3A, according to an appropriate schedule, algorithm or function of input variables/signals, as the airfoil means 3A execute their cyclic motion around the nonrotating hub member 27H. The base frame structure 35F includes 2 legs and 2 buoyant hydrofoils or buoyant water foil means 3WB under each of the airfoil means 3A, adding up for each base frame structure 35F, a total of 4 legs all structurally connected and 4 buoyant hydrofoils 3WB here connected one each to a leg. The two pairs of legs are connected by a connecting structural element 3CS. Varying numbers of fluid-foils comprising airfoils and hydrofoils and varying numbers of legs can be associated with each base frame structure, in alternate embodiments of the invention.

The fluid-dynamic renewable energy harvesting system 1 shown in FIG. 3B has connecting members 19 that include a fluid-foil base member 35, a tubular structural element 3TS, a plate structural element 3PS, and a connecting structural element 3CS. The tubular structural elements 3TS in the embodiment of FIG. 3B replace the beam, truss and tension member structural elements performing a similar function in FIG. 3A. The various structural elements may be made of metallic, composite, plastic or other material systems singly or in combination. Advanced composite structures such as ply-tailored composite tubular structural elements may be used in one exemplary version of this embodiment, to meet design load conditions with a lightweight structure at low cost (including material cost and fabrication cost). Further combinations of structural materials, structural elements, and structural arrangements are possible within the spirit and scope of the invention as claimed.

The fluid-foil renewable energy harvesting system 1 shown in FIG. 3B further illustrates position-keeping means 23 for maintaining said energy harvesting system 1W substantially within a desired geographic envelope 13G, which comprises use of a nonrotating hub 53 anchored to a ground surface 89 beneath the water surface 13, and a rotatable structure 55 surrounding said hub 53, said rotatable structure 55 including a plurality of radial members 57 serving towards connecting said plurality of fluid-foil means 3 to said hub 53. The radial members 57 in turn comprise at least one of spoke-like elements, radial spokes, angled spokes, tension elements, and angled tension elements, in variant preferred embodiments within the same family as the illustrated preferred embodiment of the invention.

The fluid-dynamic renewable energy harvesting system 1 of FIG. 3B further illustrates energy conversion means 27 which comprises generator means 27G for generating electrical power from the rotation of said rotatable structure 55 around said nonrotating hub 53. The rotational direction of motion 19RD may be clockwise or counterclockwise in different variants of the invention, and a field of multiple wind energy harvesting systems may have some rotating clockwise and others counterclockwise, to enhance efficient energy harvesting and reduce downstream induced vorticity in the atmosphere and in the water 89.

The embodiment of FIG. 3B also illustrates a fluid-dynamic renewable energy harvesting system 1, wherein the buoyant support means 4B includes said plural hydrofoil means 3WF of finite thickness; further comprising water current energy harvesting means 25H including hydrofoil control system means 9HC, for converting a portion of water current kinetic energy when a water current 5W exists and carries water current energy in the form of said water current kinetic energy, into net work on said plural hydrofoil means 3WF over the course of a cycle of substantially periodic hydrofoil motion of said plural hydrofoil means 3WF, by utilizing time-variable fluid-dynamic pressure distributions and resulting hydrodynamic forces acting on said plural hydrofoil means 3WF at time-variable hydrofoil orientations to contribute to driving said substantially periodic hydrofoil motion when said water current 5W exists and carries said water current energy in the form of said water current kinetic energy.

While the embodiments of FIGS. 3A and 3B utilize fluid-foil means 3 that include both airfoil means 3A and buoyant hydrofoil means 3WB, clearly variants of these embodiments could utilize just buoyant hydrofoil means 3WB with no airfoil means 3A at all. Such variants might be preferred at locations wherein there is a strong water current, but light winds with little wind energy available for extraction.

Some representative geographic locations for the embodiments of the invention illustrated in FIGS. 3A and 3B include water surfaces that may be present anywhere in the World, including portions of the Atlantic Ocean, Pacific Ocean, Indian Ocean, Arctic Ocean, any and all Seas, bays, gulfs, sounds, channels, straits, lakes, reservoirs, rivers, and other bodies of water. These embodiments of the invention will be particularly beneficial and offer synergistic benefits at locations where both wind energy and water current energy often exist. An example of such a location is off the eastern coast of the United States, such as the Straits of Florida and the Atlantic Ocean just east of Florida and Georgia and South and North Carolina, where there is a huge amount of water current kinetic energy (on the order of 50,000 megawatts) in the Gulf Stream, as well as significant offshore wind energy to be tapped. Tapping the combination of water current and wind energy enables reduced statistical variation of the renewable energy rate (i.e., power) being fed into a utility electrical grid, as there are two separate complementary energy sources. Tapping the Gulf Stream kinetic energy can also have a beneficial effect in reducing melting of the ice cap on Kalaallit Nunaat (Greenland) and pack ice in the Arctic Ocean, by reducing heat transfer to those areas and thereby reducing temperatures in those areas. This could be an effective avenue towards combating ice melt and rising ocean levels caused by global warming, in addition to the other benefit mechanism of the renewable energy replacing fossil fueled energy and thereby reducing global carbon dioxide emissions. Similar benefits can accrue from tapping the North Atlantic Drift and Norwegian Currents in the North Atlantic, the Kuroshio and Alaska Currents in the North Pacific, the Brazil Current in the South Atlantic, the Agulhas and Mozambique Currents in the South Indian Ocean, and the East Australia Current in the South Pacific, along with winds in those areas. Another area of huge power potential is south of Australia, New Zealand and South America, where tremendous power densities are contained both in the westerly water currents of the Antarctic Circumpolar Current and the westerly winds of the Roaring Forties and Howling Fifties and Screaming Sixties. Other areas of high potential are locations where strong tidal streams (i.e., tidal water currents) exist in addition to strong winds, such as the Bay of Fundy, Ungava Bay, Pentland Firth, Strait of Gibraltar, Strait of Messina, Gulf of Cambay, Penzhinsk Bay, the Bering Strait, Cook Inlet and many other locations. Still other areas of high potential are locations with strong river or estuarine currents exist in addition to strong winds.

Figure 3C:
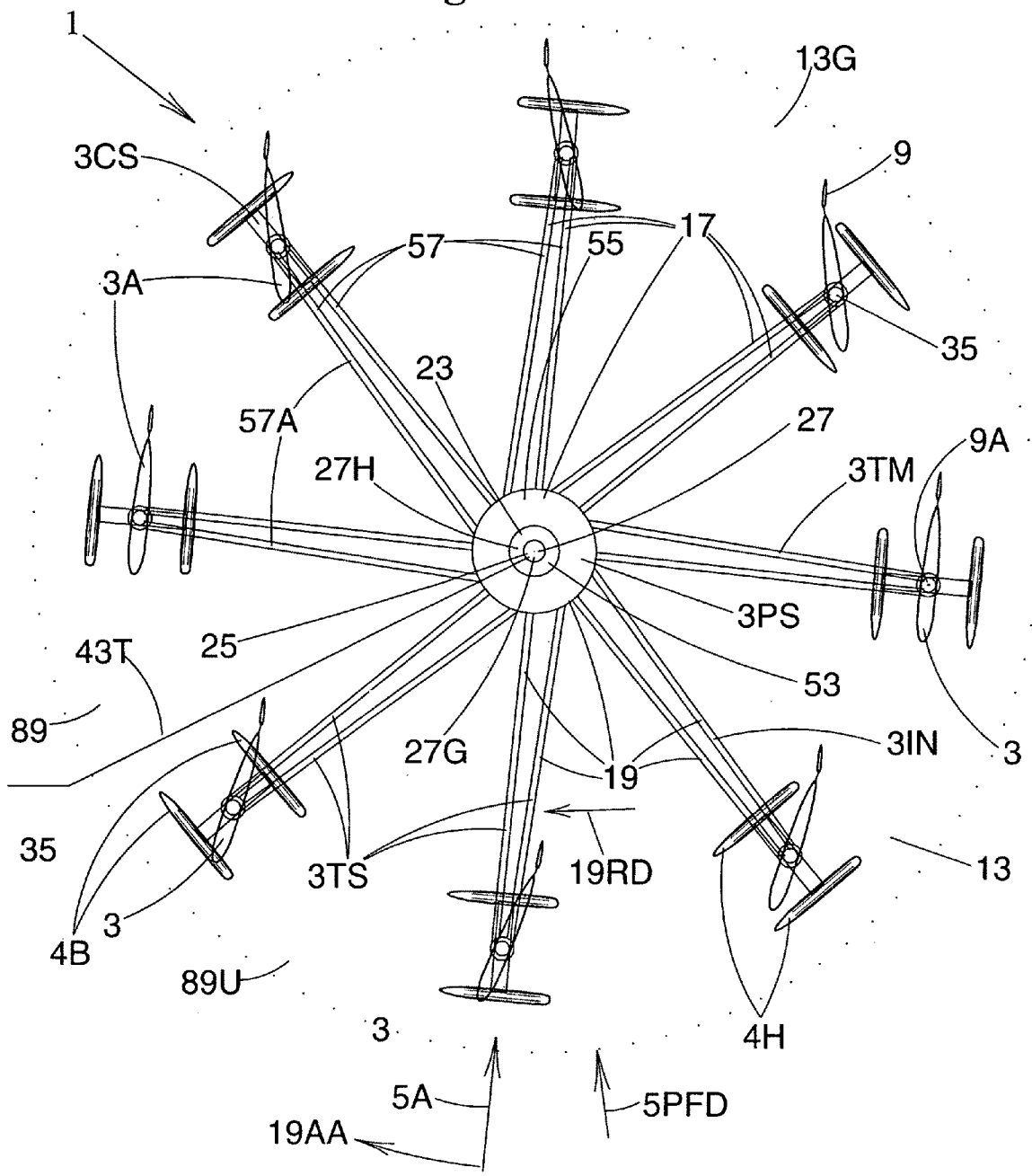
FIG. 3C shows another preferred embodiment of the invention of a similar genus to those of FIGS. 3A and 3B.

FIG. 3C shows another preferred embodiment of the invention of a similar genus to those of FIGS. 3A and 3B, but wherein the fluid-foil means 3 comprise exclusively airfoil or wind foil means 3A, with no hydrofoil means 3WF or buoyant hydrofoil means 3WB, but with buoyant support means 4B comprising hulls 4H. While catamaran hulls are shown, in variant embodiments single or multiple hulls can be used, of various sizes, shapes and lofts as are known from the prior art of hull design and manufacture. The hulls may optionally have planing surfaces to permit lower drag movement of the buoyant support means 4B on the water surface 13, when there is sufficient wind power to drive the rotatable structure 55 of the renewable energy harvesting system 1 to rotate at relatively high rotational angular rate. Rigid, semirigid or inflated hull members may be used in variant embodiments.

The fluid-dynamic renewable energy harvesting system 1 shown in FIG. 3C further illustrates position-keeping means 23 for maintaining said energy harvesting system 1 substantially within a desired geographic envelope 13G, which comprises use of a nonrotating hub 53 anchored in a ground surface 89 beneath a liquid water layer 93, and a rotatable structure 55 surrounding said hub 53, said rotatable structure 55 including a plurality of radial members 57 serving towards connecting said plurality of fluid-foil means 3 to said hub 53.

The fluid-dynamic renewable energy harvesting system 1 shown in FIG. 3C also has connecting members 19 that include a fluid-foil base member 35 and inflated structural element 3IN, where the tubular structural element 3TM is inflated to above ambient pressure in the illustrated embodiment; and further illustrates energy conversion means 27 which comprises generator means 27G for generating electrical power from the rotation of said rotatable structure 55 around said nonrotating hub 53. Electrical power from the generator means 27G is transmitted from the energy harvesting system 1 through means for transmitting energy 43T, such as electrical power cable with suitable insulating and protecting sheathing.

Figure 3D:
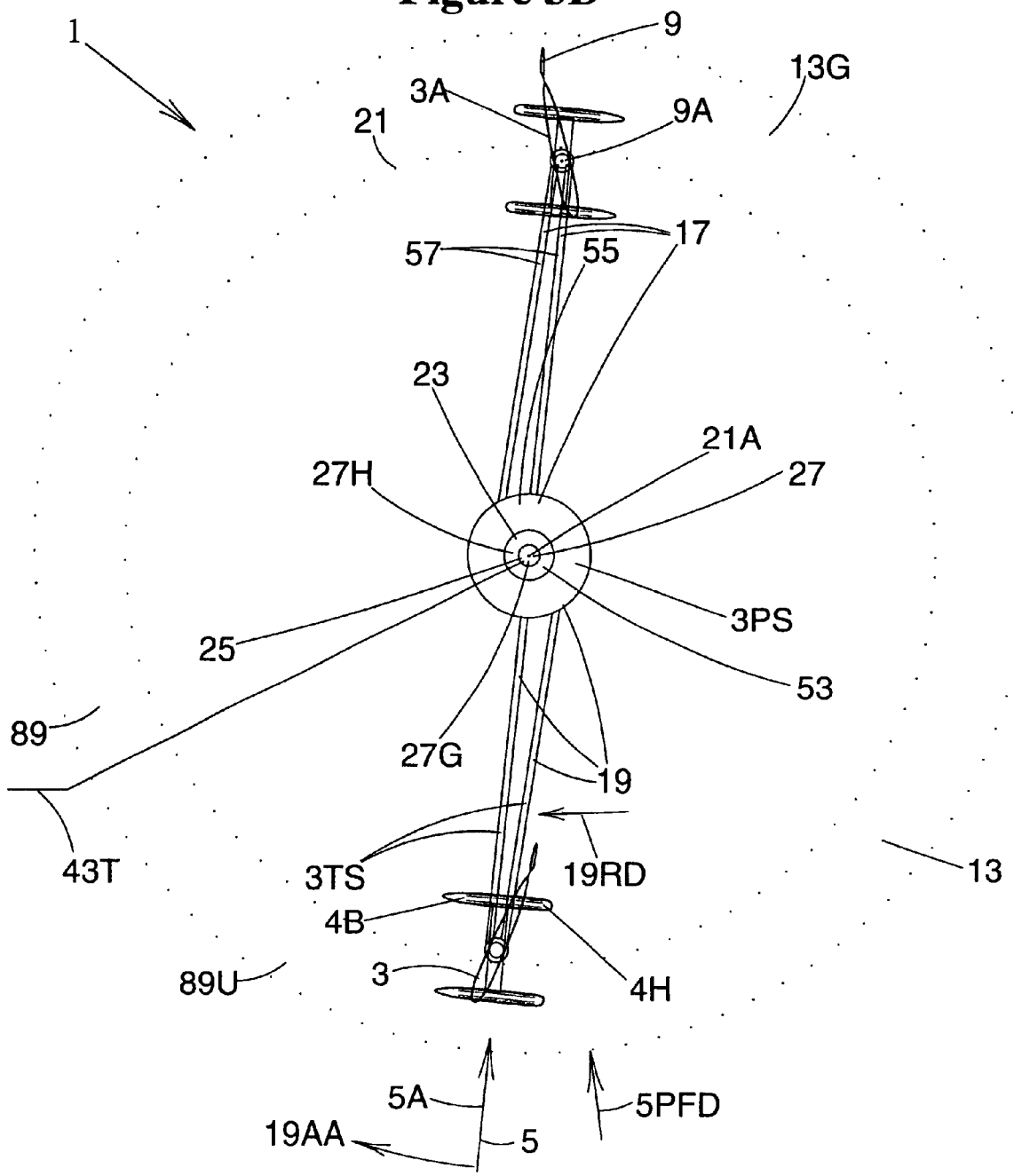
FIG. 3D shows a plan view of a fluid-dynamic renewable energy harvesting system with two radial elements.

FIG. 3D shows a plan view of a fluid-dynamic renewable energy harvesting system 1 similar to that of FIG. 3C, but with two radial elements instead of eight. Still other embodiments can have any arbitrary number n of arms, ranging from 1 to an arbitrarily large integer.

The embodiment illustrated in FIG. 3D illustrates a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement, including connecting members 19 that connect adjacently-located fluid-foil means in said sequential arrangement; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

The embodiment illustrated in FIG. 3D also illustrates a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B comprising at least one of a float, an inflated float, a pontoon, a hull 4H, a catamaran hull, a trimaran hull, multiple connected hulls, plural hydroskis with finite thickness and plural hydrofoils with finite thickness, for utilizing a buoyancy force from water displacement to at least partially contribute to supporting said plural fluid-foil means 3 above an underwater ground surface 89U;

connecting means 17 for connecting said plural fluid-foil means in a sequential arrangement, including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

The embodiment illustrated in FIG. 3D also illustrates a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement around a circuit 21 of closed periphery topology enclosing an axis of revolution 21A, wherein said axis of revolution is disposed within 60 degrees of vertical; said connecting means 17 including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means 3 as they revolve around closed circuit paths substantially corresponding to said circuit 21, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

Some representative geographic locations for the embodiments of the invention illustrated in FIGS. 3C and 3D include bodies of water with substantial extractable wind energy above the water surface 13 but without substantial extractable water current energy below the water surface 13, such as some lakes, reservoirs, lagoons, slow-flowing rivers, and selected portions of seas or selected portions of oceans.

Embodiments such as those of FIGS. 3A, 3B, 3C and 3D also have a potential advantage in that they can be assembled at one geographic location, then towed by a tugboat or similar means to the installation site, then installed by underwater cables at the desired site.

Figure 3E:
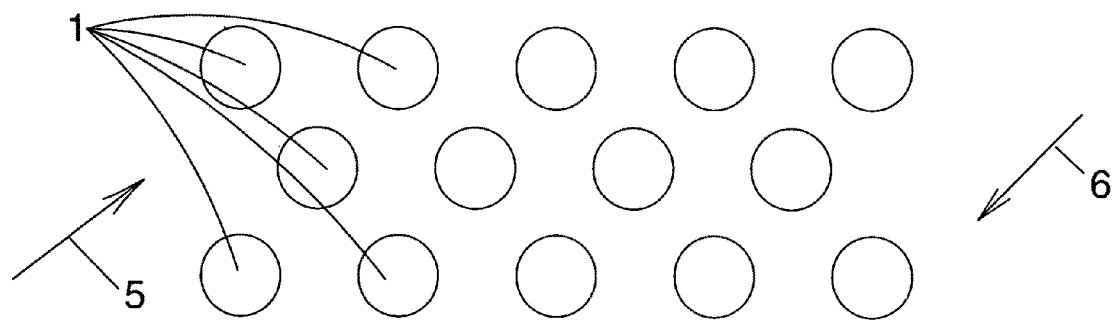
FIG. 3E shows a plan view of an array of fluid-dynamic renewable energy harvesting systems in a triangular matrix or grid or array.

FIG. 3E shows a plan view of an array of fluid-dynamic renewable energy harvesting systems 1 of any of the embodiments of FIGS. 3A through 3D or variants thereof, in a triangular matrix or grid or array.

Figure 3F:
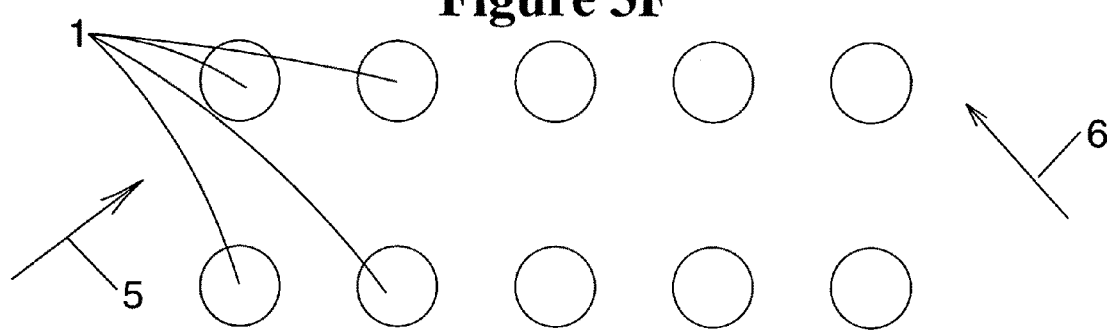
FIG. 3F shows a plan view of an array of fluid-dynamic renewable energy harvesting systems in a rectangular matrix or grid or array.

FIG. 3F shows a plan view of an array of fluid-dynamic renewable energy harvesting systems 1 of any of the embodiments of FIGS. 3A through 3D or variants thereof, in a rectangular matrix or grid or array. A square matrix or grid or array would be one specific embodiment of the case shown in FIG. 3F.

Figure 3G:
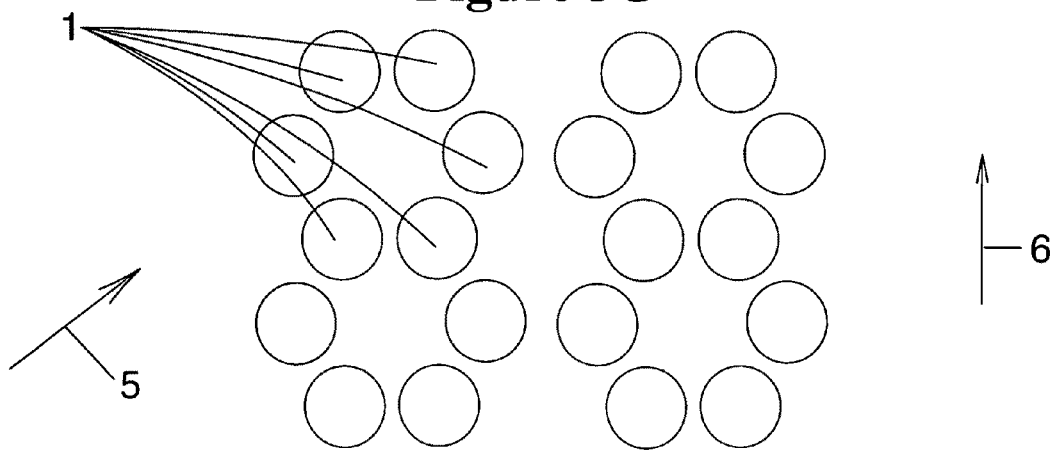
FIG. 3G shows a plan view of an array of fluid-dynamic renewable energy harvesting systems in a hexagonal matrix or grid or array.

FIG. 3G shows a plan view of an array of fluid-dynamic renewable energy harvesting systems 1 of any of the embodiments of FIGS. 3A through 3D or variants thereof, in a hexagonal matrix or grid or array.

For specific geographic locations and prevailing wind and/or water current patterns, it will be understood that alternate array or non-array arrangements may be preferable to meet a variety of objectives including system cost reduction, maximization of energy harvested, time optimization of energy harvested relative to energy demand, environmental and aesthetic impacts, and other objectives.

Figure 4A:
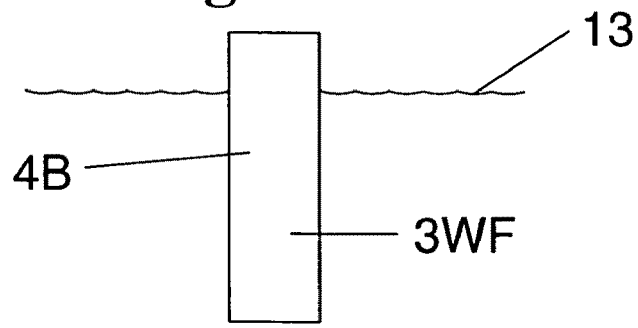
FIGS. 4A through 4O show side views of a variety of preferred embodiments of fluid-foil means comprising hydrofoil or water foil means.
Figure 4B:
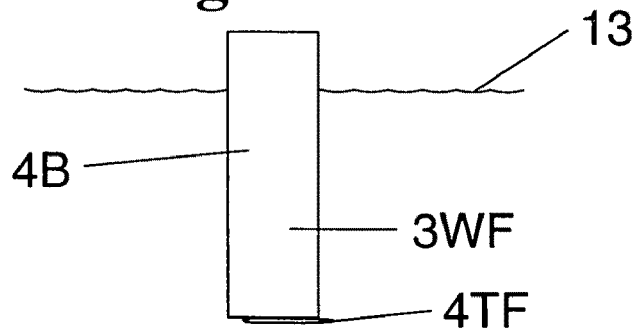
Figure 4C:
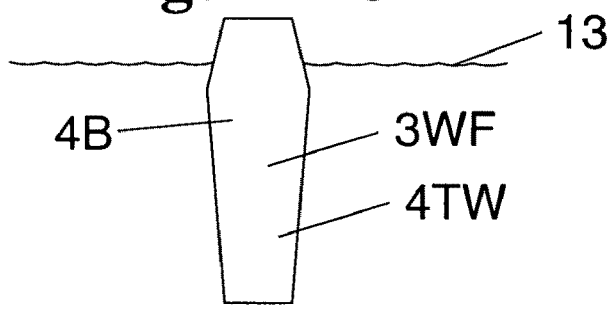
Figure 4D:
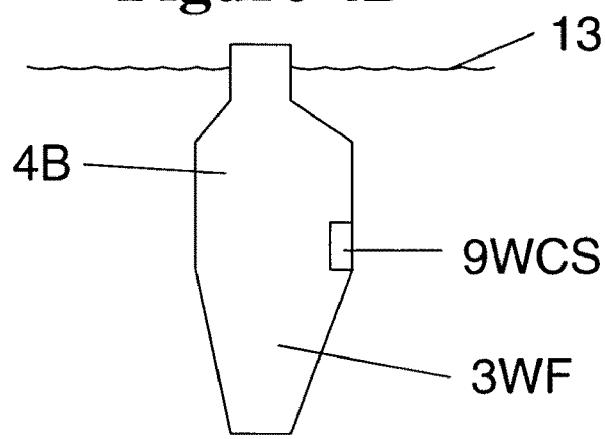
Figure 4E:
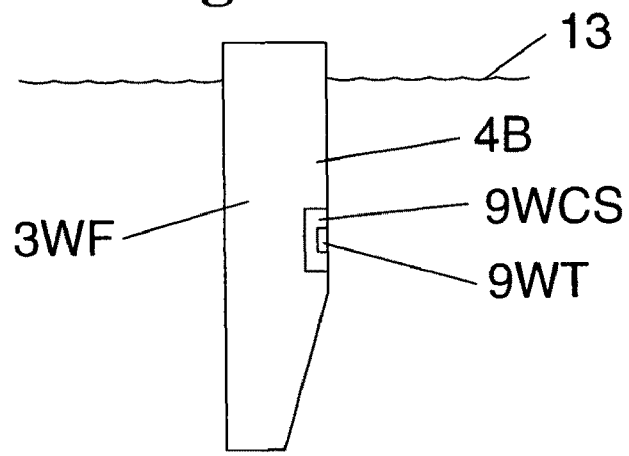
Figure 4F:
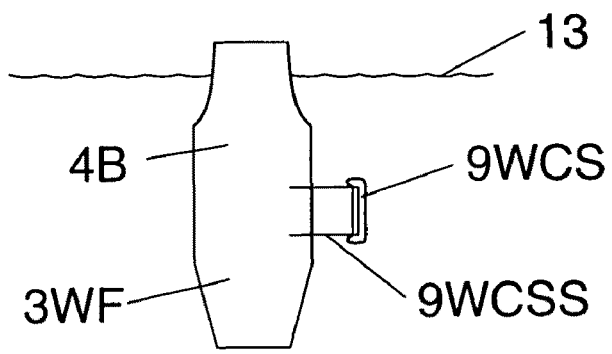
Figure 4G:
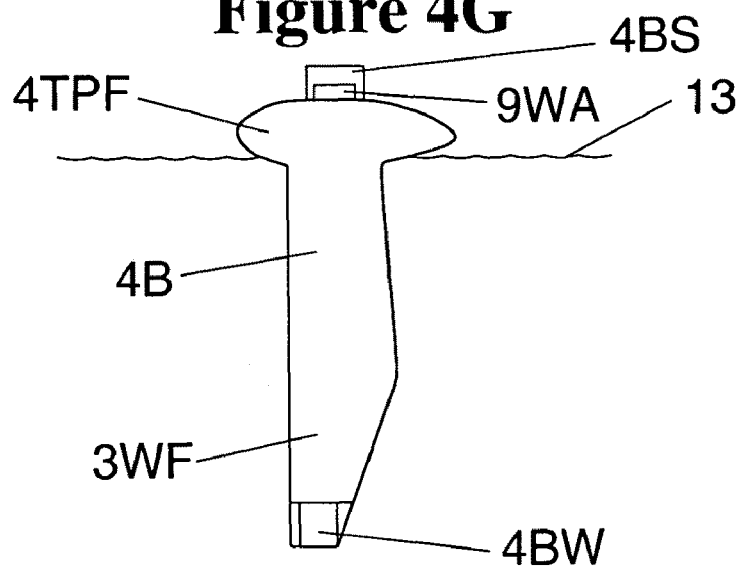
Figure 4H:
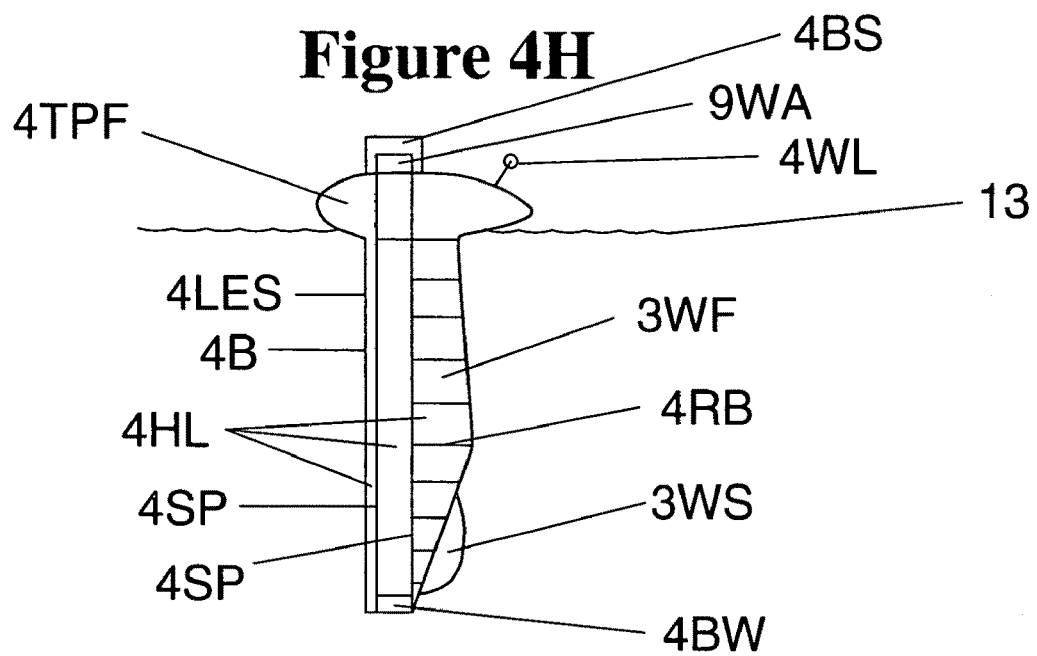
Figure 4I:
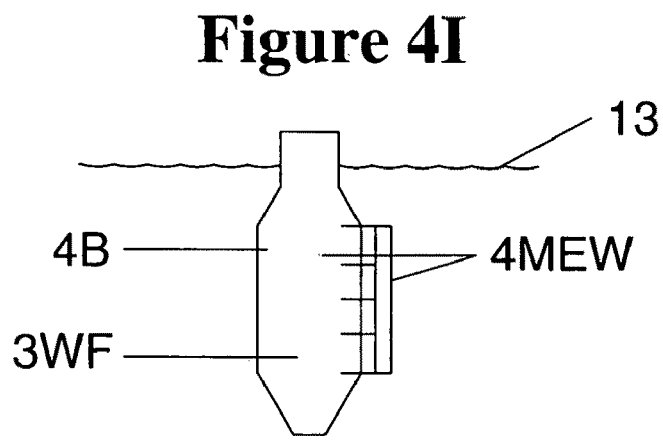
Figure 4J:
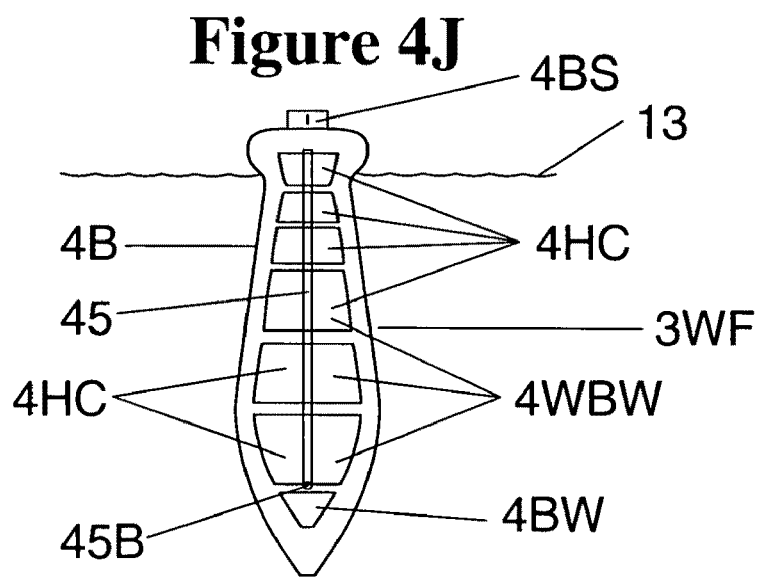
Figure 4K:
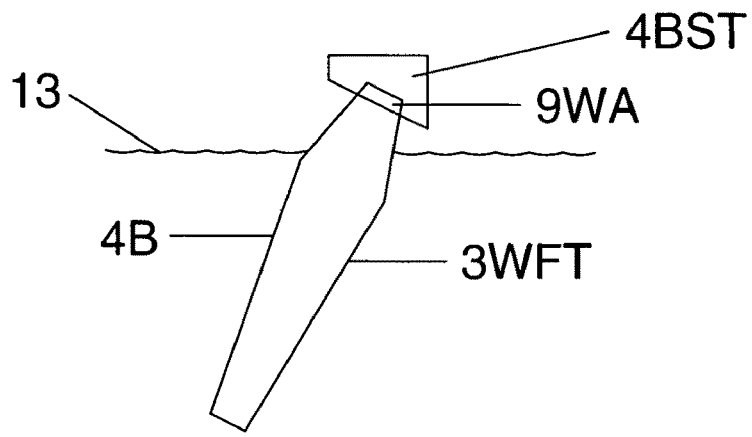
Figure 4L:
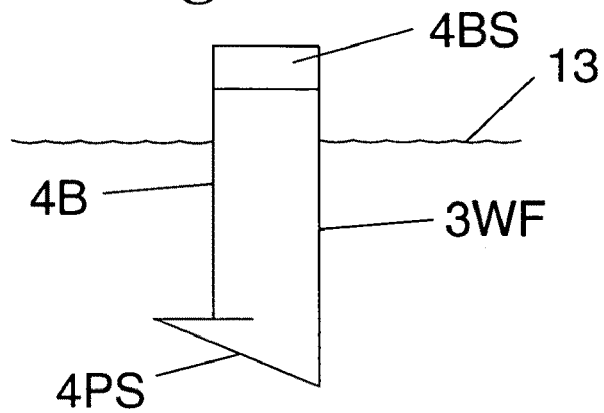
Figure 4M:
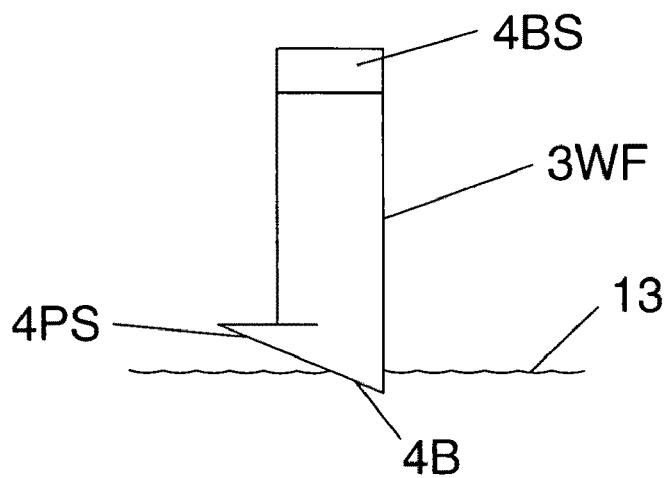
Figure 4N:
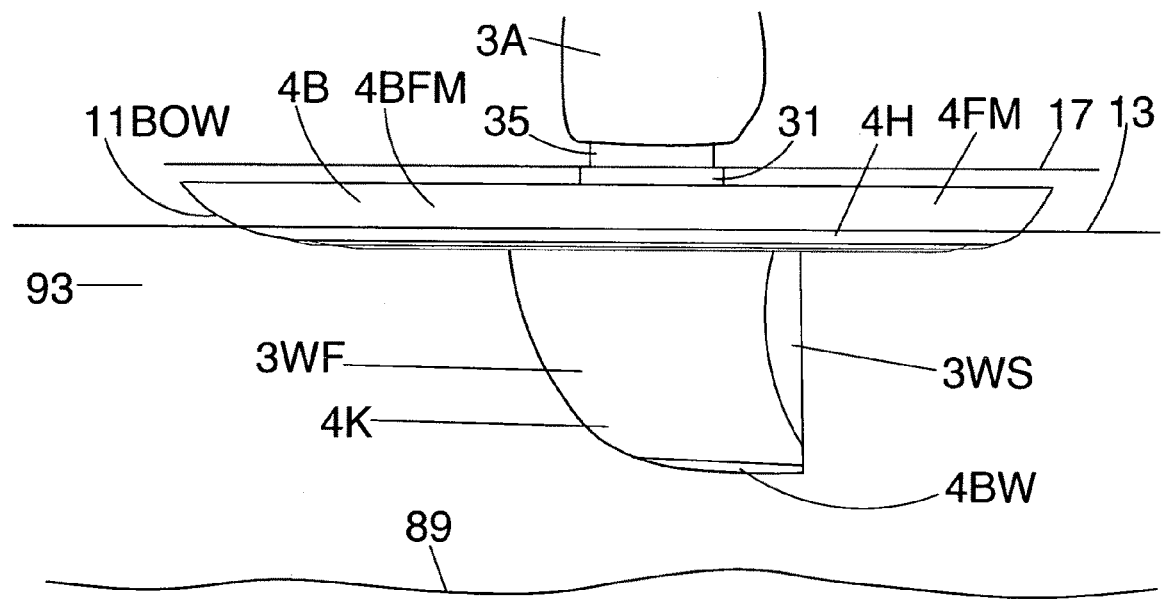
Figure 4O:
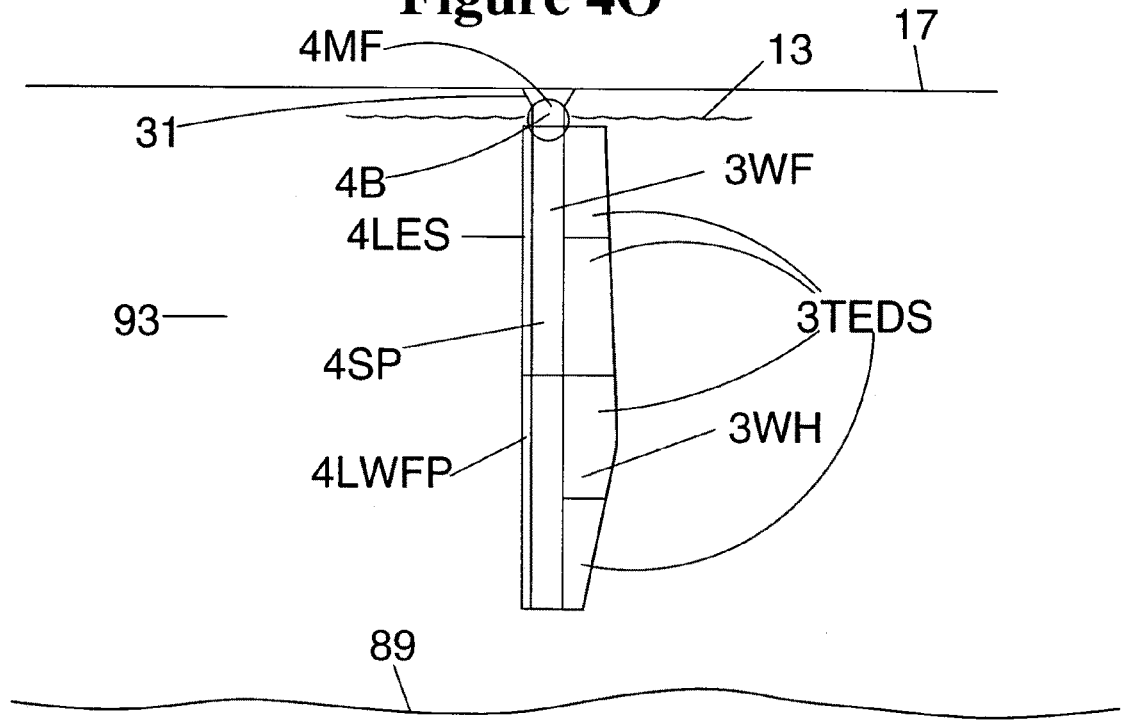

FIGS. 4A through 4O show side views of a variety of preferred embodiments of buoyant support means 4B comprising hydrofoil or water foil means 3WF, that can be used as parts of fluid-dynamic renewable energy harvesting systems 1. The hydrofoils have nonzero thickness, and contribute to buoyant support force generation by displacement of some finite volume of water below a water surface 13. While various hydrofoils may be shown penetrating through a water surface 13, in alternate variant embodiments they may be fully submerged rather than surface penetrating.

FIG. 4A shows buoyant support means 4B comprising a substantially rectangular hydrofoil means 3WF shown underwater but penetrating up through a water surface 13.

FIG. 4B shows support means 4B comprising a substantially rectangular hydrofoil means 3WF with a tip fence 4TF. The tip fence acts to increase the effective aspect ratio of the hydrofoil, thereby increasing its fluid-foil lift capability and reducing its induced drag and bottom tip vortex strength.

FIG. 4C shows buoyant support means 4B comprising a hydrofoil means 3WF with a planform including a tapered water foil 4TW. The use of taper can reduce induced drag and bottom tip vortex strength, and can also reduce hydrofoil structural bending loads when it is at angle of attack relative to a water current.

FIG. 4D shows buoyant support means 4B comprising a hydrofoil means 3WF and also comprising a water foil control surface 9WCS. The water foil control surface 9WCS can generate a positioning moment to orient the hydrofoil or water foil means 3WF to a desired angle of attack relative to an incipient water current stream, as commanded by control system means (not shown). A variety of actuator means could control the water foil control surface 9WCS, including linear actuator means, rotary actuator means, electric actuator means, hydraulic actuator means, electro-hydraulic actuator means, electro-hydrostatic actuator means, shape memory alloy actuator means, pneumatic actuator means, geared actuator means, and/or other of many actuator means known from the prior art of actuator design and technology.

FIG. 4E shows buoyant support means 4B comprising a hydrofoil means 3WF and also comprising a water foil control surface 9WCS fitted with a water foil tab 9WT. The water foil tab could serve one or more functions among a control tab function, a trim tab function and a servo tab function. An advantage of using the water foil tab as a control tab is that it enables positioning of the control surface 9WCS with less actuator torque or power needed for the tab than would be needed to directly position the control surface. The water foil control surface 9WCS can generate a positioning moment to orient the hydrofoil or water foil means 3WF to a desired angle of attack relative to an incipient water current stream, as commanded by control system means (not shown). A variety of actuator means could control the water foil tab 9WT, including linear actuator means, rotary actuator means, electric actuator means, hydraulic actuator means, electro-hydraulic actuator means, electro-hydrostatic actuator means, shape memory alloy actuator means, pneumatic actuator means, geared actuator means, and/or other of many actuator means known from the prior art of actuator design and technology.

FIG. 4F shows buoyant support means 4B comprising a hydrofoil means 3WF and also comprising a water foil control surface 9WCS, which water foil control surface 9WCS is now supported at a downstream location from the hydrofoil means 3WF by water foil control surface support structure 9WCSS. A smaller control surface force can achieve desired water foil orientation control, as the control surface is located at a greater moment arm from the quarter-chord location of the hydrofoil means 3WF, as compared with the embodiment of FIG. 4D for example.

FIG. 4G shows buoyant support means 4B comprising a hydrofoil means 3WF, with a buoyant float 4TPF at the upper end of the hydrofoil means 3WF, and further comprising a water foil actuator 9WA in buoyant support means support structure 4BS connected to the top of the buoyant float 4TPF. The water foil actuator 9WA can optionally be a rotary actuator serving as part of the actuator means in the control system means 9 including actuator means, for controlling time-variable orientations of fluid-foil means comprising the hydrofoil means 3WF, relative to proximate flow fields of a fluid current comprising a water current, when said fluid current exists and carries fluid current energy (here water current energy) in the form of fluid-dynamic kinetic energy. FIG. 4G also illustrates the use of a ballast weight 4BW in a lower part of the buoyant support means 4B, to help keep the hydrofoil means 3WF submerged below the water surface 13 to a desired extent, and to help keep the center of gravity of the buoyant support means 4B lower so as to enhance stability relative to one or more metacenters of the buoyant support means singly or in combination. In variant embodiments solid, granular, or liquid ballast can be used, including water tank ballast. High density solids such as lead weight elements may optionally be used. Alternate geometries and configurations of ballast weights are possible within the spirit and scope of the invention.

FIG. 4H shows buoyant support means 4B similar in configuration to the embodiment of FIG. 4G. Additional aspects of this embodiment include (i) a water foil structural box including two spars 4SP that provide strength and stiffness to the water foil structure; (ii) a water foil leading edge structure 4LES forward of the front spar, which leading edge structure may be single or multiple piece and designed to withstand impact by objects in the water and which may be fitted with a smooth contoured surface to promote laminar flow and minimize risk of leading edge flow separation; (iii) water foil ribs 4RB that support and maintain shape of the surface/skin, and connect to at least the rear spar; (iv) laminar flow hydrofoil or water foil portions 4HL that help reduce hydrofoil drag; (v) a water sail 3WS; and (vi) a warning light 4WL attached to the hydrofoil means or water foil means 3WF and buoyant support means 4B.

FIG. 4I shows buoyant support means 4B comprising hydrofoil means or water foil means 3WF that incorporate a multi-element water foil 4MEW.

FIG. 4J shows an embodiment of buoyant support means 4B comprising hydrofoil means 3WF that includes a ballast weight 4BW near its bottom extremity, and that includes plural water foil hollow compartments 4HC. Typically the lower hollow compartments 4HC will be filled with water ballast weight 4WBW while the upper hollow compartments will be filled with air or water vapor, while some transition zone hollow compartments may optionally have some water and some air/vapor. By using water ballast pump means to add or remove water from the hollow compartments, the total weight and total buoyancy of the buoyant support means can be varied in a desired and controlled manner.

The embodiment of FIG. 4J shows a portion of a fluid-dynamic renewable energy harvesting system, comprising means for controlling a support force 45 acting on said fluid-foil means 3 which means for controlling a support force comprises at least one of means for controlling a buoyant force 45B and means for controlling a fluid dynamic force (not shown).

FIG. 4K shows an embodiment of buoyant support means 4B comprising tilted water foil means 3WFT projecting at an angle downward from buoyant support means structure with a tilted attachment interface, designated 4BST in this Figure. A water foil actuator 9WA controls orientation angle of the water foil or hydrofoil, penetrating downward below a water surface 13. Note that this angular orientation control will yield increments to both thrust and lift concurrently.

FIG. 4L shows an embodiment of buoyant support means 4B comprising hydrofoil or water foil means 3WF projecting downward from buoyant support means support structure 4BS, down through a water surface 13. The bottom end of the water foil means 3WF is fitted with an end device in the form of a planing surface or hydroski 4PS. In the illustrating configuration the planing surface is not planing, but acts as an end element to the underwater water foil means 3WF traveling at slow or modest speeds through the water.

FIG. 4M shows the same embodiment of FIG. 4L, but moving through the water at a relatively high speed, as when airfoils (such as airfoil means 3A shown in FIG. 3B) reacting to a high wind condition are pulling water foil means rapidly through the water, leading them to rise up on their planing surface bottom ends. Thus in FIG. 4M the planing surface or hydroski 4PS is planing on the water surface 13, generating enough planing lift to raise the bulk of the water foil means 3WF and elements above, out of the water.

FIG. 4N illustrates an embodiment with a movable floating member 4FM comprising a floating module 4BFM with a hull 4H connected both to airfoil or wind foil means 3A via connecting structure 31 and a fluid-foil base member 35, and to hydrofoil or water foil means 3WF here comprising a keel 4K. The hull 4H serves as buoyant support means 4B for supporting fluid-foil means including wind foil means 3A and water foil means 3WF. The water foil means 3WF has also a water sail 3WS at a trailing edge portion of the fin type of keel 4K, and ballast weight 4BW at the bottom end of the keel 4K. The front end of the hull 4H is designated as the bow section 11BOW.

The hull floats on a liquid water layer 93 above a ground surface 89 and below a water surface 13. Connecting means 17 are also shown, for connecting the illustrated floating module 4BFM with adjacently located floating modules, not shown in this view.

A variant embodiment could be similar to the embodiment of FIG. 4N but without the water foil 3WF or keel 4K or water sail 3WS. Such an alternative embodiment may have one or catamaran or multiple hull(s) 4H supporting airfoil means 3A, and may have some merit at locations where there is significant over water wind energy, but not significant water current energy.

FIG. 4O shows an embodiment with hydrofoil or water foil means 3WF attached to buoyant support means 4B that in turn is connected by connecting structure 31 to connecting means 17. This embodiment is useful in locations where there is significant water current but not significant economically extractable wind energy. The water foil means 3WF comprises a hydrodynamic wing 3WH and includes a water foil spar 4SP and water foil leading edge structure 4LES, as well as plural (four shown) trailing edge deflectable surfaces 3TEDS. In minor variant embodiments any number of trailing edge deflectable surfaces can be used. The plural trailing edge deflectable surfaces are independently controllable in angle, for a variety of purposes including optimal angle setting for desired force vector generation at each water depth when water current direction (and speed) varies with depth. It is well known in the science of ocean currents that current direction does vary with depth for various reasons including Coriolis forces and the Ekman spiral effect. For tall water foil means 3WF on the order of a hundred feet tall or more, having depth variable independent control of trailing edge deflectable surfaces 3TEDS and/or independent control of overall water foil angle such as the illustrated independently orientable lower water foil portion 4LWFP, are beneficial.

Thus FIGS. 4N and 4O illustrate for a fluid-dynamic renewable energy harvesting system, the use of hydrofoil or water foil means 3WF that comprise at least one of hydrodynamic wings 3WH and hydrodynamic sails 3WS.

FIGS. 4N and 4O also illustrate for a fluid-dynamic renewable energy harvesting system, the use of movable floating members 4FM that comprise at least one of a float, an inflated float, a pontoon, a hull, a catamaran hull, a trimaran hull, multiple connected hulls, a hydroski with finite thickness and a hydrofoil with finite thickness. Note that many of these floating member types are well understood from the prior art of floating devices.

FIGS. 4N and 4O also illustrate how the buoyant support means 4B for utilizing a buoyancy force from fluid displacement (here water displacement) serves as friction-reducing means for reducing frictional forces that act to oppose said motion of the fluid-foil means (airfoil means 3A and/or water foil means 3WF in the presence of water), relative to an alternate condition wherein said buoyant support means 4B is absent (where there would be frictional drag relative to the ground surface 89).

The various embodiments of FIGS. 4A through 4O may also employ structural optimization architectures and design elements known from the prior art, as well as passive and/or active hydroelastic tailoring elements known from the prior art. The various embodiments of FIGS. 4A through 4O may also employ anti-fouling and surface cleaning design elements known from the prior art, e.g., to keep the surfaces of the hydrofoil or water foil means free of plant or animal adhesions to the underwater surfaces. The various embodiments of FIGS. 4A through 4O may also employ anti-ice and/or de-ice methods and systems known from the prior art.

The use of buoyant support means to reduce drag or friction is important in increasing the efficiency or wind or water current energy harvesting, relative to other prior art devices with higher drag due to rolling resistance if they are supported by wheels, and/or induced drag if they are supported by fluid-dynamic lift forces but with no fluid-static or buoyancy lift forces.

FIGS. 5A through 5H show plan views of a variety of preferred embodiments of connecting structure geometries connecting fluid-foil means including wind foil means and hydrofoil or water foil means.

Figure 5A:
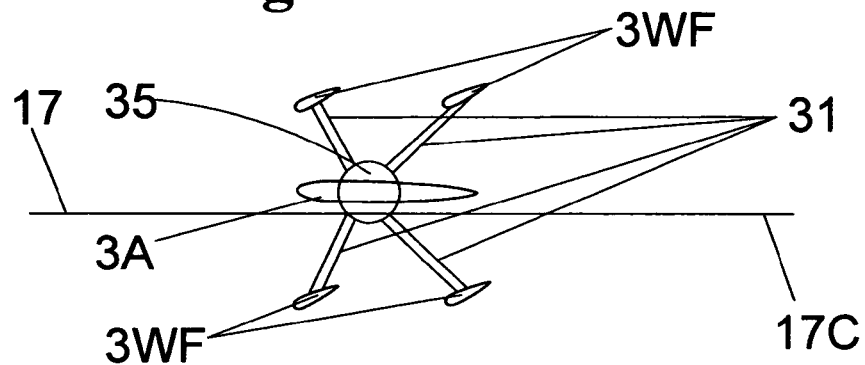
FIGS. 5A through 5H show plan views of a variety of preferred embodiments of connecting structure geometries connecting fluid-foil means including wind foil means and hydrofoil or water foil means.

FIG. 5A shows a connecting structure geometry of the class used in the embodiment of FIGS. 1, 2A and 2B. As illustrated, fluid-foil means comprising airfoil or wind foil means 3A are connected through fluid-foil base member 35 and connecting structure 31 here comprising four legs, to four fluid-foil means comprising hydrofoil or water foil means 3WF. In this embodiment the fluid-foil base member 35 is connected to connecting means 17 here comprising a substantially closed-loop cable 17C, in a manner consistent to that earlier illustrated in FIGS. 1, 2A and 2B. The four water foil means 3WF are arranged in a rectangular formation relative to the orientation of the cable 17C. A square formation is a subset of this more general rectangular formation.

Figure 5B:
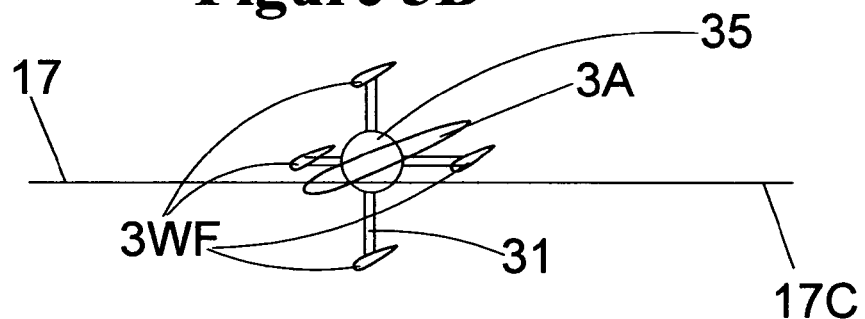

FIG. 5B shows a connecting structure geometry similar to the embodiment of FIG. 5A. The four water foil means 3WF are arranged in a diamond formation relative to the orientation of the cable 17C, in this embodiment.

Figure 5C:
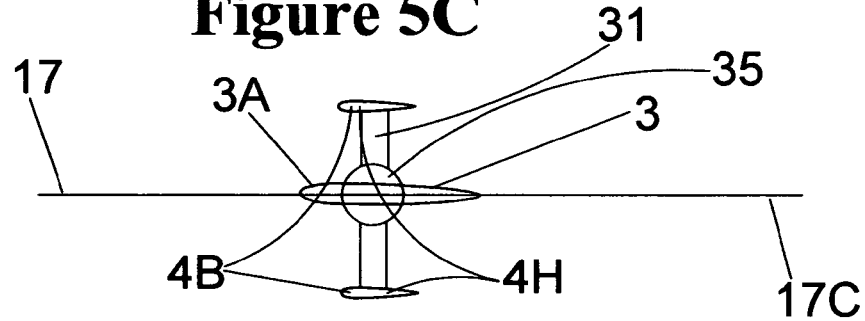

FIG. 5C shows another variant connecting structure geometry wherein fluid-foil means 3 here comprising airfoil or wind foil means 3A are connected through fluid-foil base member 35 and connecting structure 31 here comprising two legs, to two buoyant support means 4B here comprising two hulls 4H arranged in a catamaran formation or arrangement.

Figure 5D:
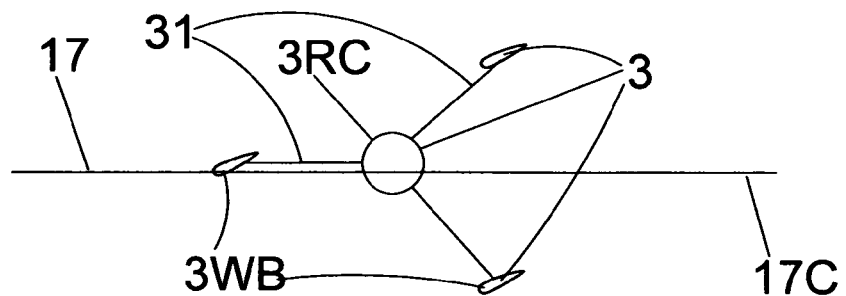

FIG. 5D shows another variant connecting structure geometry wherein fluid-foil means 3 are connected through connecting structure 31 here comprising three legs. The fluid-foil means 3 included in this embodiment include a Magnus force generating rotating cylinder 3RC for harvesting wind energy and three buoyant hydrofoils or buoyant water foil means 3WB for harvesting water current energy.

Figure 5E:
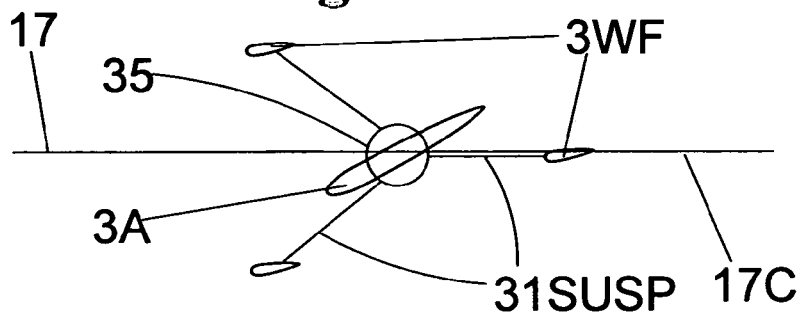

FIG. 5E shows another variant connecting structure geometry wherein airfoil means 3A are connected through fluid-foil base member 35 and connecting structure 31 (here comprising three legs with suspension 31SUSP integrated into the connecting structure), to three water foil means 3WF.

Figure 5F:
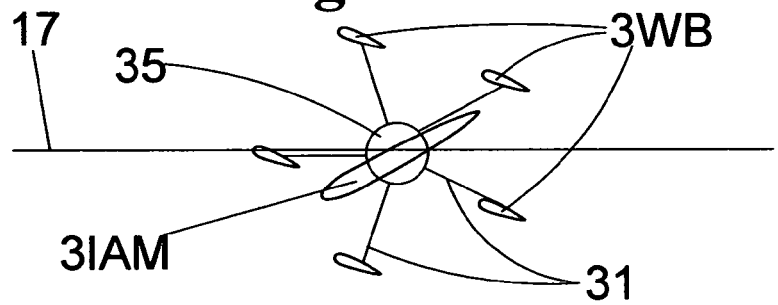

FIG. 5F shows another variant connecting structure geometry wherein fluid-foil means comprising an inflated airfoil member 31AM is connected through fluid-foil base member 35 and connecting structure 31 here comprising five legs, to five fluid-foil means comprising buoyant water foil means 3WB. The use of five legs will provide a more stable base less susceptible to tipping than the three leg and four leg cases (for equal leg length), as is known from the analogous prior art for five castor bases for office chairs as opposed to three or four castor bases for office chairs. It will be understood that there is a valid cost versus tipping risk tradeoff between these options.

Figure 5G:
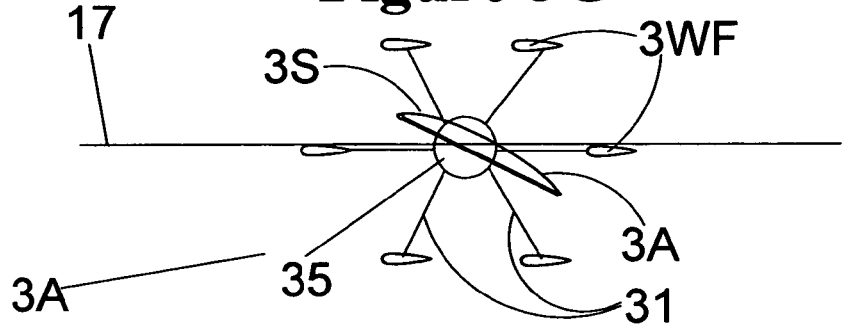

FIG. 5G shows another variant connecting structure geometry wherein airfoil or wind foil means 3A comprising a sail 3S is connected through fluid-foil base member 35 and connecting structure 31 here comprising six legs, to six buoyant water foil means 3WB. The use of six legs will provide an even more stable base of support for the airfoil or wind foil means 3A, than the cases of four or five legs with equal leg length as the six leg case.

Figure 5H:
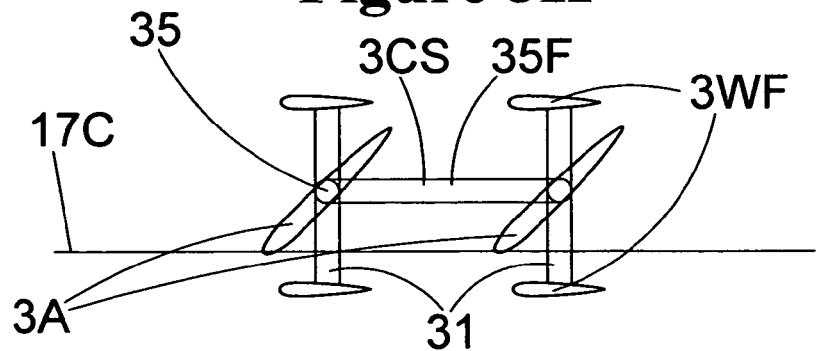

FIG. 5H shows another variant connecting structure geometry wherein a pair of fluid-foil means comprising a pair of airfoil or wind foil means 3A are each connected through a corresponding fluid-foil base member 35 to base frame structure 35F including connecting structure 31 and specifically also a connecting structural element 3CS, to each other and to a plurality of (here four) fluid-foil means comprising hydrofoil or water foil means 3WF. Connections to a cable 17C are made above two of the legs on one side of the device, in the embodiment as illustrated. The base frame structure 35 in this embodiment is similar to that shown earlier in FIG. 3B, but applied to a cable connected rather than a spoke connected embodiment of the wind energy harvesting system.

Figure 6A:
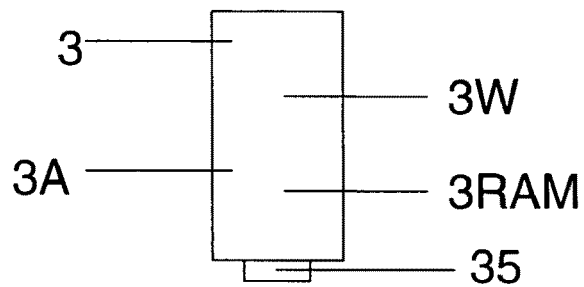
FIGS. 6A through 6N show side views of a variety of preferred embodiments of fluid-foil means comprising airfoil or wind foil means.
Figure 6B:
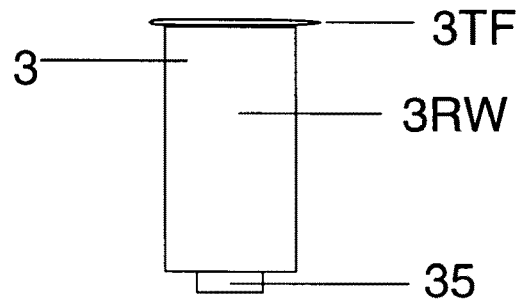
Figure 6C:
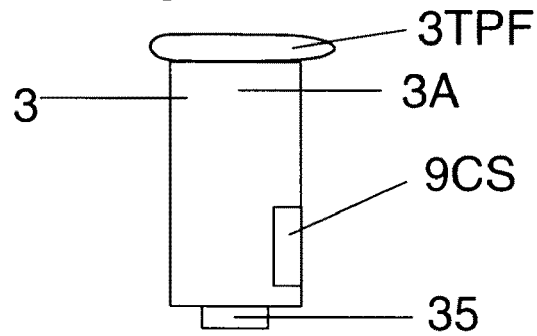
Figure 6D:
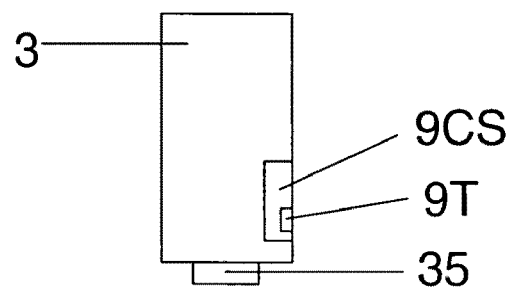
Figure 6E:
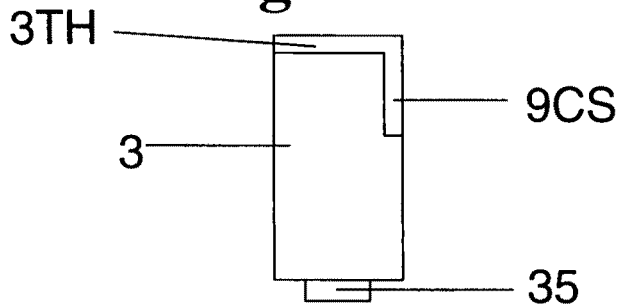
Figure 6F:
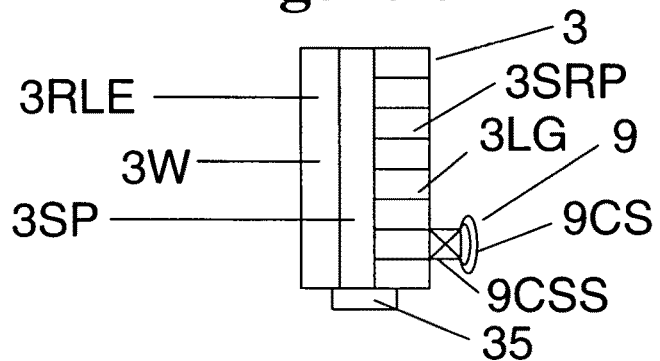
Figure 6G:
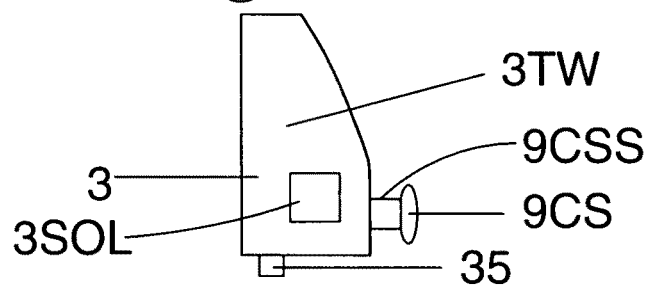
Figure 6H:
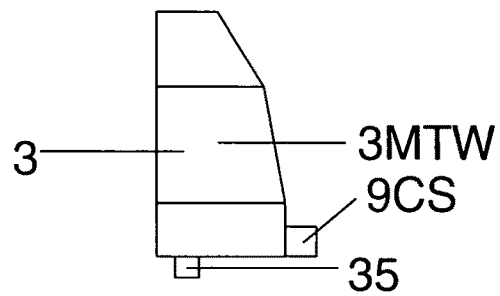
Figure 6I:
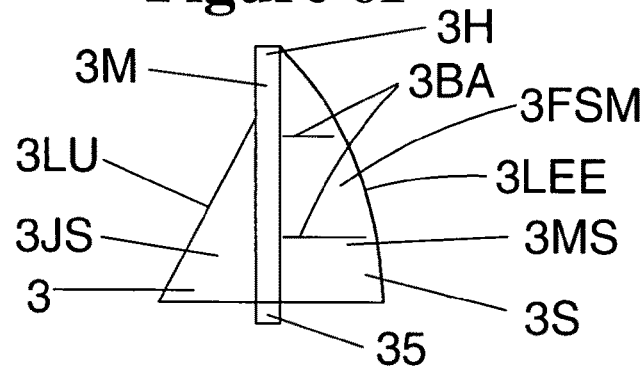
Figure 6J:
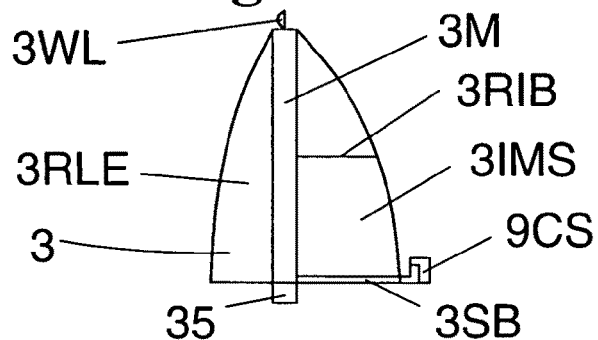
Figure 6K:
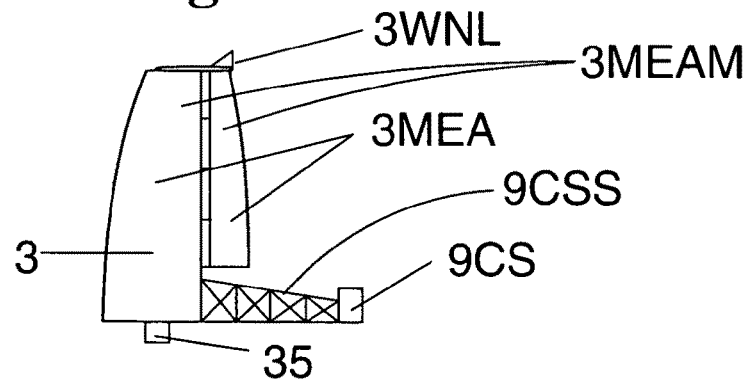
Figure 6L:
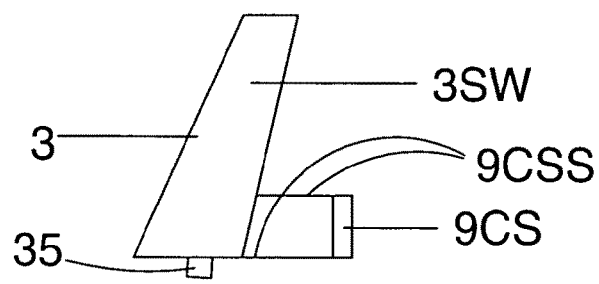
Figure 6M:
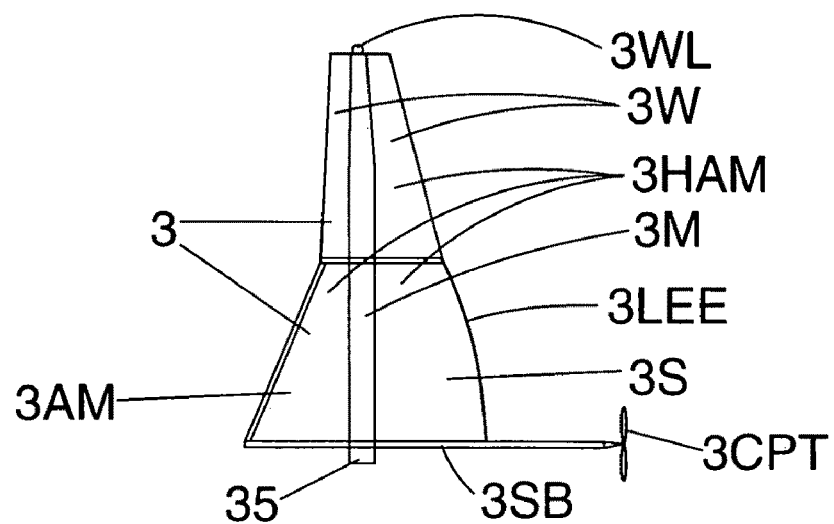
Figure 6N:
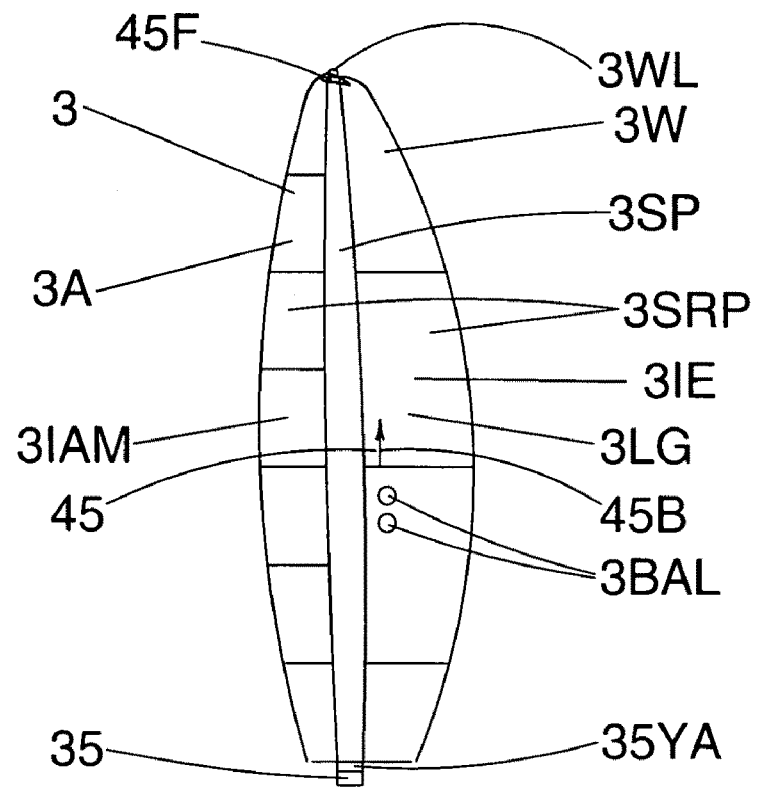

FIGS. 6A through 6N show side views of a variety of preferred embodiments of fluid-foil means 3 comprising airfoil or wind foil means 3A. The airfoil or wind foil means may include in various embodiments 1, 2, 3, 4 or more upward wings, biplane wings; 1, 2, 3, 4 or more sails; or combinations of wing and sail elements.

FIG. 6A shows fluid-foil means 3 comprising airfoil or wind foil means 3A, utilizing a wing 3W with a substantially rigid airfoil member 3RAM. The wing 3W is here supported by a fluid-foil base member 35, preferably in a manner that will permit it to be oriented about a yaw axis to set it at a desired angle of attack relative to a prevailing wind field. In representative embodiments the wing 3W may range anywhere from 2 feet tall to 20 feet to 200 feet to 2000 feet tall, depending on whether the application is intended for small-scale, medium-scale, large-scale or mega-scale wind energy harvesting.

It should be understood that fluid-foil means of varying dimensions, heights, areas, aspect ratios, taper ratios, and planforms can be used within the spirit and scope of the invention as described and claimed.

FIG. 6B shows fluid-foil means 3 comprising a wing that is a substantially rectangular wing 3RW, here fitted with a tip fence 3TF. In alternative embodiments a tip fence or other tip device (e.g., winglet, tip feathers) could be fitted on a variety of fluid-foil means, within the spirit and scope of the invention.

FIG. 6C shows fluid-foil means 3 comprising airfoil or wind foil means 3A, here fitted with a control surface 9CS and also fitted with a tip pod fairing 3TPF. The tip pod fairing 3TPF could optionally be filled with lifting gas such as helium or hydrogen, to effectively reduce the weight of the airfoil or wind foil means 3A on the fluid-foil base member 35. The interior of the airfoil or wind foil means 3A could also optionally be filled with lifting gas.

FIG. 6D shows fluid-foil means 3, here fitted with a control surface 9CS and also fitted with a tab 9T on said control surface 9CS, which tab provides at least one of a control tab function and a trim tab and a servo tab function.

FIG. 6E shows fluid-foil means 3, here fitted with a control surface 9CS that has a tip horn 3TH. The design and operation of control surfaces with tip horns is known from the prior art, including widespread use on aircraft of the First World War era.

FIG. 6F shows an alternative embodiment of fluid-foil means 3, comprising a wing 3W with a wing spar 3SP, a substantially rigid leading edge 3RLE forward of this spar, and a semi-rigid portion 3SRP aft of the wing spar 3SP. The wing 3W can optionally be filled at least in part with lifting gas 3LG, such as helium or hydrogen gas, to reduce the weight load of the wing 3W on the fluid-foil base member 35. In the embodiment of FIG. 6F, a control surface 9CS is mounted behind the trailing edge of the airfoil of the wing 3W, by means of control surface support 9CSS that may employ a variety of structural designs including the truss structure shown.

FIG. 6G shows fluid-foil means 3, comprising a tapered wing 3TW also fitted with a control surface 9CS connected to the wing by control surface support 9CSS here consisting of upper and lower plate-like structures such as composite sandwich plates. FIG. 6G also shows a solar panel 3SOL fitted on the surface of the fluid-foil means 3, to harvest solar energy that can be added to harvested wind energy and water current energy, as applicable in various embodiments of the invention.

FIG. 6H shows fluid-foil means 3, comprising a multi taper wing 3MTW, also fitted with a control surface 9CS, here fitted directly to the trailing edge of the wing.

FIG. 6I shows fluid-foil means 3, comprising at least one sail 3 utilizing a flexible sail member 3FSM. A mast 3M is supported by fluid-foil base member 35, with the mast rising from the fluid-foil base member 35 up to the headboard 3H. A main sail 3MS and a jib sail 3JS connect to the mast 3M. The fluid-foil means 3 thus spans from the luff 3LU of the jib sail back to the leech 3LEE of the main sail. Some representative, optional battens 3BA are shown, which may help maintain a sail in a preferred shape configuration under a variety of wind and gust conditions, and/or may help prevent undesirable fluttering of the sail cloth or material.

FIG. 6J shows another embodiment with fluid-foil means 3, comprising a mast 3M that is supported by fluid-foil base member 35, with the mast rising from the fluid-foil base member 35 up to a warning light 3WL at the headboard end of the mast. A substantially rigid leading edge 3RLE, preferably in the shape of an airfoil leading edge, projects forward from the mast 3M. An inflatable main sail 31MS projects aft from the mast 3M. The inflatable main sail will preferably have some shaping or rigidizing frame members, such as the illustrated substantially rigid sail rib 3RIB and substantially rigid sail boom 3SB. The combination of the substantially rigid leading edge 3RLE, mast 3M and inflatable main sail 31MS appropriately inflated, will preferably assume smooth airfoil-like surface lofts when viewed on planar cuts perpendicular to the mast 3M. This type of fluid-foil means 3 may afford offer some of the combined advantages of sails and airfoils, with the lower cost and larger area of sails combined with the better aerodynamic efficiency of airfoils. In the illustrated embodiment a control surface 9CS is mounted on an aft projection of the sail boom 3SB.

FIG. 6K shows another embodiment, with fluid-foil means 3 comprising a multi-element aerodynamic member 3MEAM here utilizing a multi element airfoil 3MEA, with a slotted airfoil shown supported by fluid-foil base member 35. The two elements may be adjustable in spacing, location and orientation to optimize desired aerodynamic attributes in different conditions. Actuator means (not shown) may be used to achieve this adjustability, or alternatively passive means such as spring and damper fitted hinge means for connecting the elements may be used. A winglet 3WNL is fitted to the upper wingtips of the multi element airfoil, as illustrated. The winglet can reduce wingtip vortex noise by weakening the tip vortex; and many other noise reduction features can be adapted for the fluid-foil means 3 operating in a wind, as for instance those known from prior art of aerodynamic devices such as wings and flaps and exposed landing gear structure on aircraft.

The winglet may be fitted with an optional lighting rod element and grounding path connection). The fluid-foil means 3 is fitted with a control surface 9CS, connected to the multi element airfoil 3MEA via control surface support 9CSS, a truss boon structure as illustrated. The use of a long truss boom as illustrated has a benefit of reducing actuator loads needed to actuate the control surface 9CS to an extent needed to generate a desired yawing moment associated with balancing the multi element airfoil's moment associated with its desired angle of attack and lateral lift (or thrust) in reaction to wind blowing over the multi element airfoil.

FIG. 6L shows another embodiment, with fluid-foil means 3 comprising a swept wing 3SW, also fitted with a control surface 9CS connected to the swept wing 3SW by control surface support 9CSS members. Note that the fluid-foil base member 35 is also slightly tilted in this illustrated embodiment.

FIG. 6M shows an embodiment of fluid-foil means 3 comprising a hybrid aerodynamic member 3HAM utilizing a hybrid sail and wing construction, with the bottom part having a geometrically shaped aerodynamic member 3AM forward, a mast 3M, and a sail 3S aft, with a control and power turbine 3CPT behind the aft end of the sail boom 3SB. The control and power turbine 3CPT in this embodiment serves both as a means for generation of local power for use for actuation and/or signaling and/or computation, and as a control tab for generating a yawing moment to contribute to adjusting the angle of attack of the fluid-foil means 3. In alternate embodiments a horizontal axis turbine (HAT) or a vertical axis turbine (VAT) can be installed in various locations for the purpose of generating local power.

A wing 3W is located above the mast 3M and is structurally connected to it, e.g. with the wing main spar being a structural continuation of the mast. A warning light 3WL is mounted atop the wing 3W. Thus the embodiment of FIG. 6M illustrates fluid-foil means 3 that comprise at least one of a wing 3W, a sail 3S and a geometrically shaped aerodynamic member 3AM.

FIG. 6N shows an embodiment of fluid-foil means 3 comprising a wing 3W, which has a rigid spar 3SP supporting forward and aft semirigid portions 3SRP, which are also inflated to maintain the shape of their skin surfaces between framing elements. The rigid spar may have a closed cell construction or an open cell or I-beam construction in variant embodiments. Faces of the spar that need to carry high tensile or compressive loads may incorporate composite fiber plies of higher modulus fibers such as carbon composite fibers, at along-spar orientations or small angle deviations therefrom. Of course different types of interleaved ply fibers, ply angles, ply thicknesses, and resin systems may be used to optimize the structure for an appropriate combination of low cost, low weight, high strength and stiffness, damage tolerance and arrestment, ease of manufacture and repair, and other considerations, as is known from the prior art of optimized composite or hybrid structural design.

An inflatable airfoil member 31AM is provided, supported by the mast 3M between the fluid-foil base member 35 and the warning light 3WL. In the embodiment of FIG. 6N, the inflatable airfoil member 31AM is inflated with at least one of air and a lifting gas 3LG comprising at least one of helium gas, hydrogen gas, and hot gas such as hot air. Thus airfoil members 3A include inflatable elements 3E capable of being inflated with lifting gas (or "lighter than air gas") 3LG.

The inflatable elements 3E may include variable volume outside surfaces or volume control using ballonets 3BAL as known from the prior art of dirigibles, to vary aerostatic lift acting on the fluid-foil 3.

Thus FIG. 6N shows an illustrated embodiment of a portion of a fluid-dynamic renewable energy harvesting system, further comprising means for controlling a support force 45 acting on said fluid-foil means 3 which means for controlling a support force comprises at least one of means for controlling a buoyant force 45B and means for controlling a fluid dynamic force 45F (e.g., an aerodynamic lifting surface, shown integrated into a winglet, with at least one of means for changing angle of attack and means for changing camber such as a trailing edge deflectable surface).

The housing of the warning light 3WL may be fitted with an optional lighting rod element and grounding path connection. In this illustrated embodiment the fluid-foil base member is fitted with a yaw actuator 35YA that can orient the entire wing 3W by rotating the rigid spar 3SP to a commanded angle of attack relative to the local wind direction.

In summary FIGS. 6A through 6N illustrate for a fluid-dynamic renewable energy harvesting system, a plurality of embodiments with inclusion of fluid-foil means comprising airfoil or wind foil means 3A that comprise at least one of wings 3W and sails 3S.

The various embodiments of FIGS. 6A through 6N may also employ structural optimization architectures and design elements known from the prior art, as well as passive and/or active aeroelastic tailoring elements known from the prior art. The various embodiments of FIGS. 6A through 6N may also employ anti-ice and/or de-ice methods and systems known from the prior art.

FIGS. 7A through 7I show cross-sectional views of a variety of preferred embodiments of fluid-foil means. These Figures illustrate embodiments applicable to airfoil or wind foil means 3A, but it should be understood that similar embodiments are also possible and applicable to hydrofoil or, water foil means 3WF in still other embodiments of the invention according to the spirit and scope of the invention as claimed.

Figure 7A:
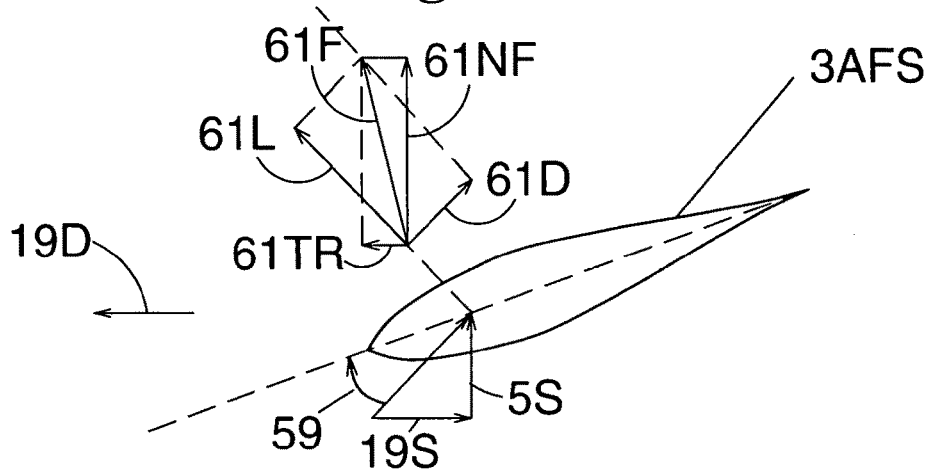
FIGS. 7A through 7I show cross-sectional views of a variety of preferred embodiments of fluid-foil means.

FIG. 7A illustrates an airfoil section 3AFS that is moving in a cable direction 19D. The effective wind seen by the airfoil section 3AFS is the vector sum of the wind speed 5S and the effective wind speed 19S induced by the cable speed in the cable direction 19D. Note that the cable speed parameter applicable to embodiments such as that shown in FIGS. 1, 2A and 2B, can be replaced by local fluid-foil (e.g., airfoil or wind foil 3A) speed in alternate embodiments such as those in FIG. 3A etc. The resultant angle of attack 59 of the airfoil section relative to the vector sum wind, causes the airfoil to generate airfoil lift 61L and airfoil drag 61D, as illustrated. The lift is perpendicular to the vector sum wind and the drag is parallel to the vector sum wind. Resolving the resultant force on the airfoil 61F in a different axis system yields a tractive force 61TR that pulls the cable in a direction parallel to the local cable direction for embodiments such as that of FIGS. 1, 2A and 2B (or pulls a spoke in an azimuthal direction in an embodiment such as FIG. 3A etc.); and a normal force 6INF that acts perpendicular to the cable direction for embodiments such as that of FIGS. 1, 2A and 2B (or in a radial direction in an embodiment such as FIG. 3A etc.). The control system means may set airfoil angle of attack 59 and either cable speed (for embodiments such as that of FIGS. 1, 2A and 2B) or device RPM (revolutions per minute around a hub, for embodiments such as that of FIGS. 3A, 3B, 3C and 3D) so as to maximize power being harvested from the wind. For example, airfoil angle of attack may be set to that value associated with maximum lift coefficient of the airfoil before it stalls, or to a value just slight shy of the stall angle of attack.

Figure 7B:
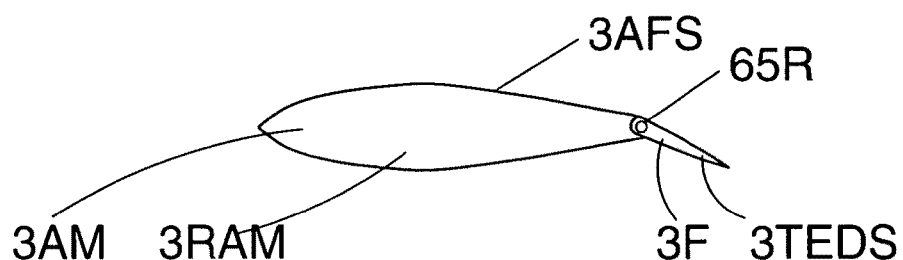

FIG. 7B illustrates an airfoil section 3AFS comprising a geometrically shaped aerodynamic member 3AM that is a substantially rigid airfoil member 3RAM, with a trailing edge deflectable surface 3TEDS comprising a flap 3F that is deflectable around a hinged attachment by a rotary actuator 65R.

Figure 7C:
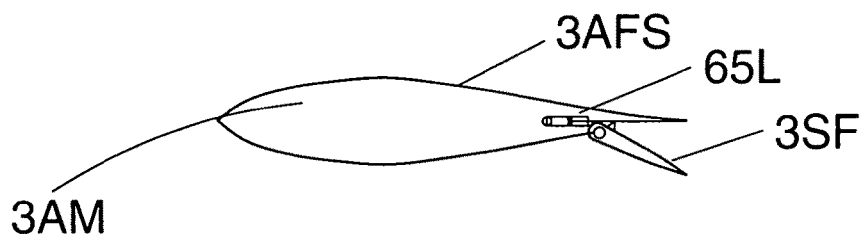

FIG. 7C illustrates an airfoil section 3AFS comprising a geometrically shaped aerodynamic member 3AM fitted with a split flap 3SF that is deployable by action of a linear actuator 65L.

Figure 7D:
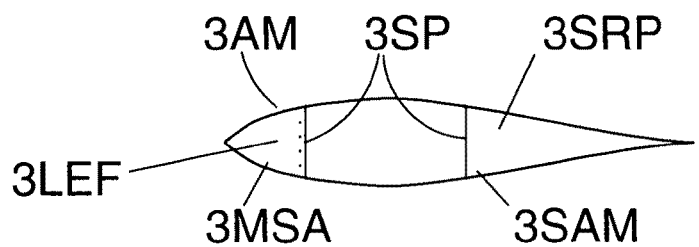

FIG. 7D illustrates an airfoil section 3AFS comprising a geometrically shaped aerodynamic member 3AM that is a semirigid airfoil member 3SAM with an aft semi-rigid portion 3SRP illustrated. The rigid portion is held rigid by two wing spars 3SP as illustrated. Forward of the front spar, a leading edge flap 3LEF is illustrated that uses a morphing shape aerodynamic member 3MSA.

Figure 7E:
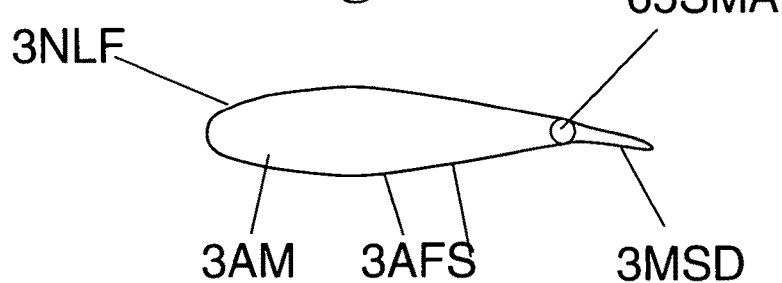

FIG. 7E illustrates airfoil section 3AFS comprising a geometrically shaped aerodynamic member 3AM that utilizes a natural laminar flow airfoil 3NLF that is fitted with a variable camber trailing edge utilizing a shape memory alloy actuator 65SMA to control a flap that comprises a morphing shape aerodynamic member 3MSA.

Figure 7F:
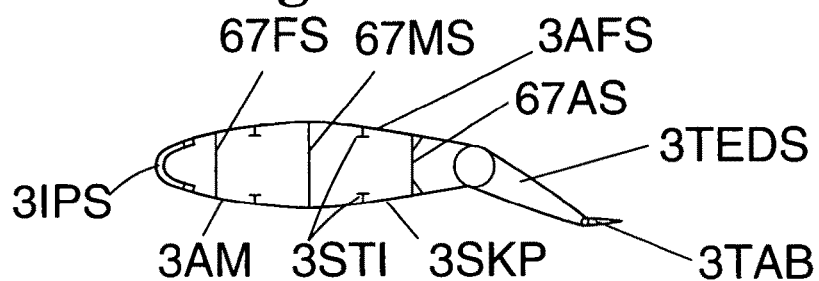

FIG. 7F illustrates airfoil section 3AFS comprising a geometrically shaped aerodynamic member 3AM that utilizes a three-spar structural design with a front spar 67FS, a mid spar 67MS and an aft spar 67AS. The structural design also includes at least one of stiffeners or stringers, designated 3STI on this figure. Such stiffeners or stringers may be beneficially used to stiffen skin panels 3SKP, whether those panels are metallic or composite or hybrid in material, and single-layer or laminated multi-ply layers or honeycomb sandwich or other sandwich in construction architecture. The airfoil section 3AFS is fitted with an ice protection system 31PS in its leading edge region, which may be any of a variety of anti-ice and de-ice system designs known from the prior art of aircraft wing and propeller anti-ice and de-ice systems, such as thermal systems using hot fluid or electrical heating, such as weeping glycol or other chemical systems, and such as mechanical systems. FIG. 7F also illustrates a trailing-edge deflectable surface 3TEDS fitted with a tab 3TAB, such as a control tab and/or trim tab and/or servo tab.

Figure 7G:
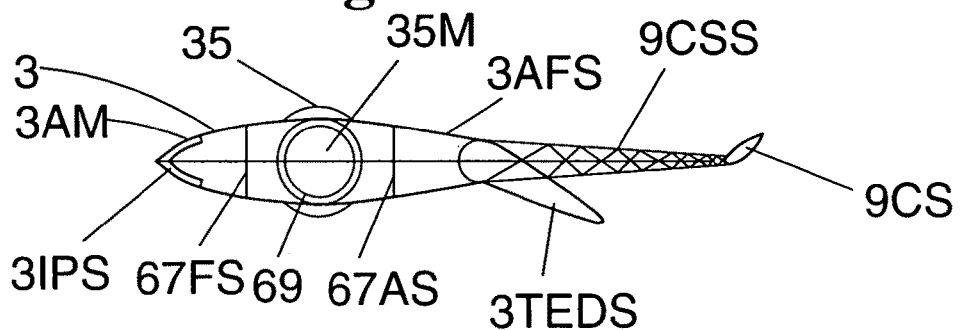

FIG. 7G illustrates fluid-foil means 3 with an airfoil section 3AFS comprising a geometrically shaped aerodynamic member 3AM that is rotatable around a mast 35M through a bearing interface 69. The mast is supported by fluid-foil base member 35. In this illustrated preferred embodiment the airfoil has two spars, the front spar 67FS and the aft spar 67AS. An ice protection system 31PS is also shown on the leading edge, but may also extend to other portions of the fluid-foil means 3 that may be susceptible to ice deposit or accumulation, including the upper end of the fluid-foil means 3. The embodiment of FIG. 7G is fitted with a control surface 9CS located behind the airfoil section 3AFS spaced some distance behind the airfoil section, and connected to the airfoil section by means of control system support 9CSS. While a truss structure is illustrated for the control system support 9CSS, alternate structural architectures can be used for this purpose, including sandwich panels, hollow booms of various cross-sections and tapers, structural beams of various cross-sections and tapers, etc. The embodiment of FIG. 7G is also fitted with a trailing-edge deflectable surface 3TEDS, which in this embodiment serves as a trailing-edge flap to increase the achievable lift coefficient of the airfoil section 3AFS, rather than as a control surface. To use an aircraft analogy, in this embodiment the trailing-edge deflectable surface 3TEDS serves a role similar to an aircraft's wing trailing-edge flap, while the control surface 9CS serves a role similar to an aircraft's elevator control surface.

Figure 7H:
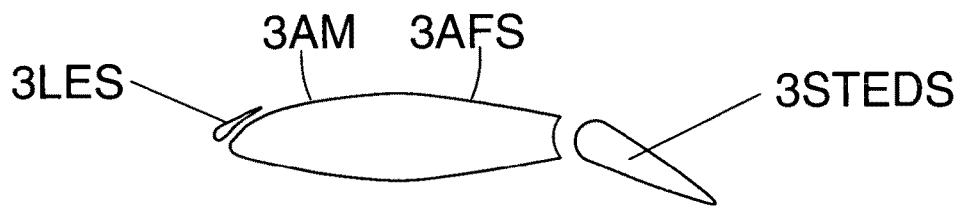

FIG. 7H illustrates airfoil section 3AFS comprising a geometrically shaped aerodynamic member 3AM that is fitted with a slotted trailing edge deflectable surface 3STEDS such as a slotted flap, while the leading edge is fitted with a leading edge slat 3LES.

Figure 7I:
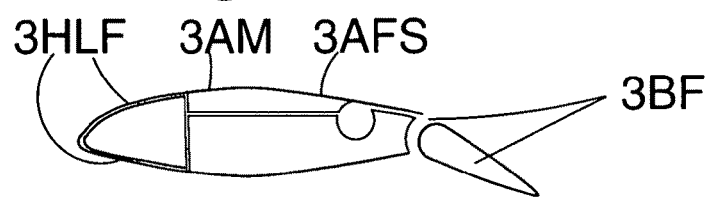

FIG. 7I illustrates airfoil section 3AFS comprising a geometrically shaped aerodynamic member 3AM that utilizes a hybrid laminar flow airfoil 3HLF with at least one of suction and blowing to foster laminar flow, and is also fitted with a blown flap 3BF. An optional air passage for transmission of sucked air from the skin pores in the forward end of the airfoil section, through the hybrid laminar flow system and then to the flap blowing system, is illustrated in this embodiment; the flow through this passage may be powered or induced by naturally occurring aerodynamically induced pressure effects. It should be recognized that in alternate variant embodiments the hybrid laminar flow system may be entirely independent of a flap blowing system, or only one or the other of the two systems provided. The hybrid laminar flow system may also optionally include heating elements that at least one of (i) foster laminar flow and (ii) serve as anti-icing or de-icing elements.

The combined embodiments of FIGS. 6 and 7 illustrate fluid-dynamic renewable energy harvesting systems wherein a geometrically shaped aerodynamic member 3AM includes at least one of a substantially rigid airfoil member 3RAM, a semirigid airfoil member 3SAM, a flexible sail member 3FSM, a multi-element aerodynamic member 3MEAM, a hybrid aerodynamic member 3HAM, a morphing shape aerodynamic member 3MSA, a flap 3F, a blown flap 3BF, a slat 3SL, a control surface 9CS, a tab 3TAB, a natural laminar flow airfoil 3NLF, a hybrid laminar flow airfoil 3HLF, an airfoil having a surface with riblets 3RS, and an inflatable airfoil member 31AM, wherein said inflatable airfoil member 31AM is inflated with at least one of air and a lifting gas 3LG comprising at least one of helium gas, hydrogen gas, and hot gas such as hot air.

The combined embodiments of FIGS. 6 and 7 also illustrate fluid-dynamic renewable energy harvesting systems wherein control system means 9 including actuator means, for controlling time-variable orientations of said fluid-foil means 3, include means for controlling at least one of said control surface 9CS, tab 3TAB, flap 3F, blown flap 3BF, slat 3SC, and morphing shape aerodynamic member 3MSA.

Figure 8A:
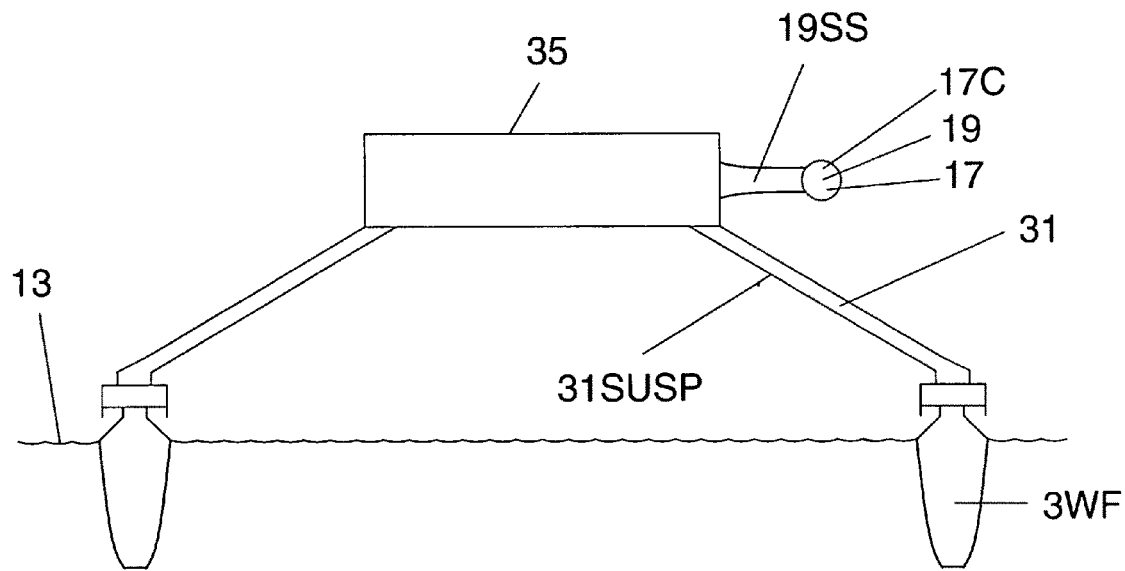
FIGS. 8A and 8B show two front views of fluid-foil means support structure.
Figure 8B:
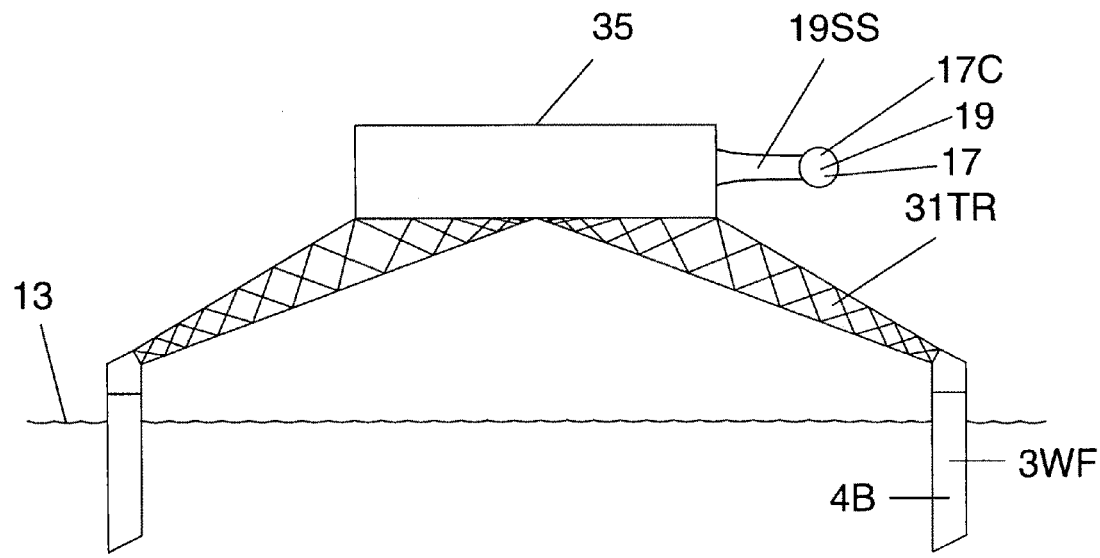

FIGS. 8A and 8B show two front views of fluid-foil means support structure.

FIG. 8A shows a fluid-foil base member 35 (which is a base member for airfoil or wind foil means 3A not shown in this view), which fluid-foil base member 35 is supported by other fluid-foil means that are hydrofoil or water foil means 3WF, through connecting structure 31 with suspension means 31SUSP for providing spring and damping forces, integrated into the connecting structure 31. The hydrofoil or water foil means penetrate below a water surface 13, and are preferably buoyant. The fluid-foil base member 35 connects to and engages with connecting means 17 connecting plural fluid-foil means in a sequential arrangement, including connecting member 19 that connect adjacently-located fluid-foil means in said sequential arrangement. This connection and engagement in the illustrated embodiment is through cable support structure 19SS connecting and engaging with a substantially closed loop cable 17C, as illustrated.

FIG. 8B shows a fluid-foil base member 35 supported by other fluid-foil means that are hydrofoil or water foil means 3WF, through connecting structure 31 here including truss supports 31TR.

FIG. 8C shows a front view of another embodiment of fluid-foil means, along with its support structure. Fluid-foil means 3 comprising airfoil or wind foil means 3A is supported by fluid-foil base member 35 including a mast projection 35M from the base member, through a bearing interface 69. The fluid-foil means includes at least one of a strut and guy wire 3SGW to help react wind-induced bending loads on the fluid-foil means 3. The at least one of a strut and guy wire 3SGW is connected on top to the fluid-foil 3 and at the bottom end to a lower anchor 3SGWL laterally offset by structure projecting laterally from the base of the fluid-foil 3. The illustrated fluid-foil 3 also has a tip pod fairing 3TPF. The fluid-foil base member 35 supported by buoyant support means 4B through connecting structure 31 here including a separate suspension element 33, which may include at least one of spring means and damper means to reduce vertical load and motion of said fluid-foil means 3 that may be induced by the buoyant support means 4B running over waves or undulations in the water surface 13. Thus FIG. 8C illustrates an embodiment with at least one of a connecting structure 31 and a suspension element 33 which suspension element 33 comprises at least one of a spring element and a damper element, in the support path between the buoyant support means 4B and said fluid-foil means 3 comprising airfoil or wind foil means 3A. While simple inflated catamaran type floats are shown for the buoyant support means 4B in the illustrated embodiment, in variants buoyant hydrofoil or water foil means could be used, that can also harvest water current energy in addition to the wind energy that can be harvested by the airfoil means 3A.

FIG. 8C also illustrates that the fluid-foil means 3 is supported by a movable frame 31MF; wherein said movable frame 31MF is supported at least in part by the buoyant support means 4B; and wherein said fluid-foil means 3 is movable relative to its corresponding movable frame 31MF.

The embodiments shown in FIGS. 8A through 8C illustrate portions of a fluid-dynamic renewable energy harvesting system, wherein connecting members 19 comprise at least one of connecting cable elements and connecting rod elements.

While the connecting member 19 could be a cable 17 that is a closed-loop cable 17C, in alternate variant embodiments a linear cable or linear rod could be used, with cyclic motion comprising oscillatory motion rather than revolutionary motion.

Figure 9A:
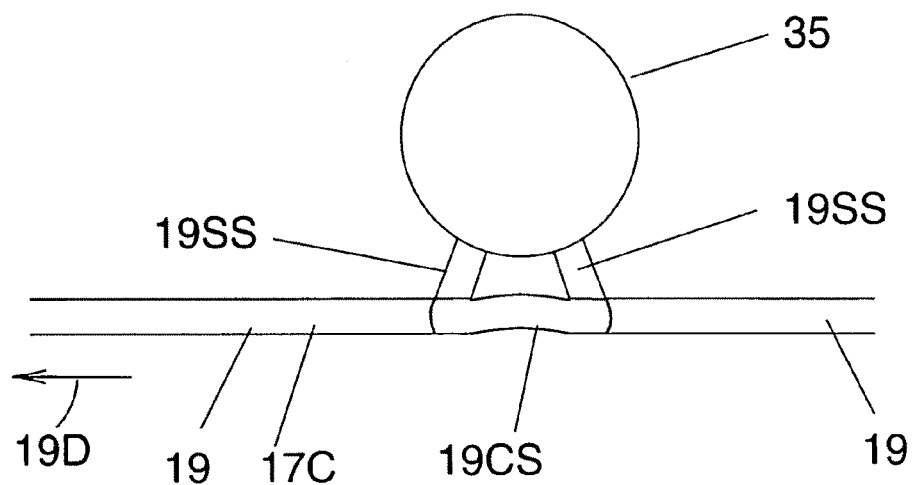
FIGS. 9A and 9B illustrate the use of cable design and connectivity to rotatable pulleys.
Figure 9B:
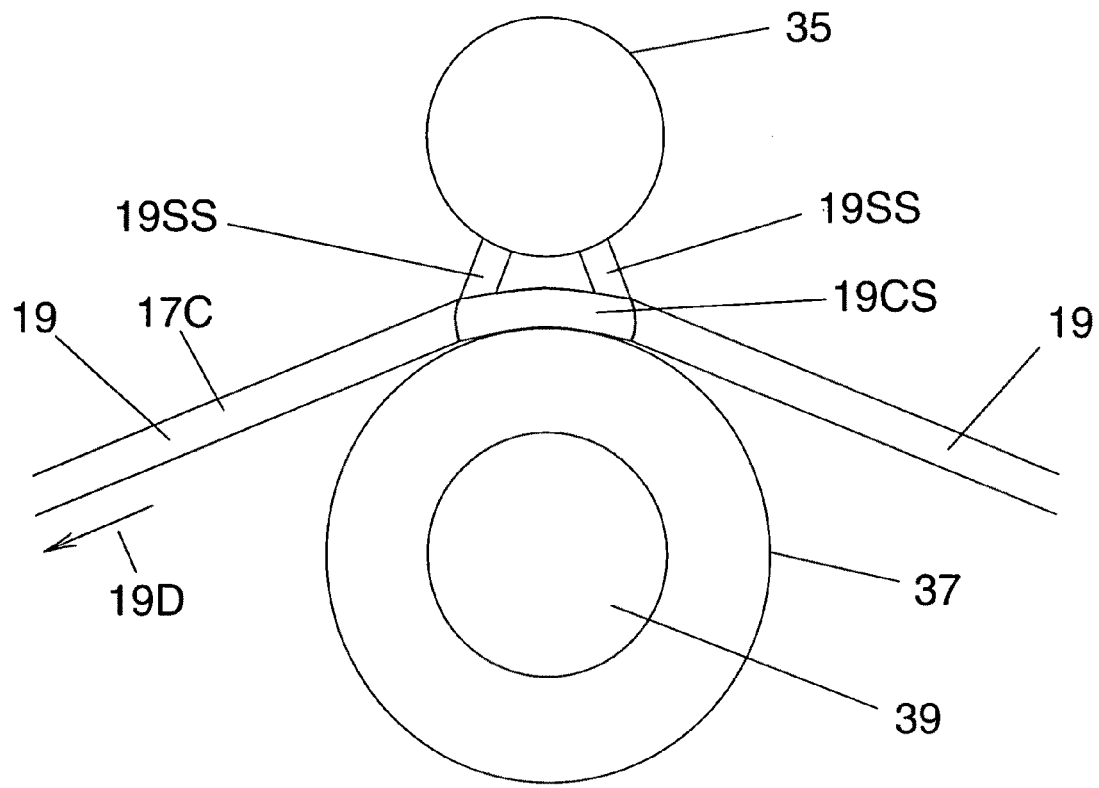

FIGS. 9A and 9B illustrate the use of cable design and connectivity to rotatable pulleys, for embodiments of the invention in the general class of the embodiment of FIGS. 1, 2A and 2B, for example.

FIG. 9A shows a fluid-foil base member 35 connected to a substantially closed-loop cable 17C that serves as a connecting member 19 for connecting adjacently located fluid-foil means, and that moves in a cable travel direction 19D. The fluid-foil base member 35 is connected to the cable by cable support structure 19SS, which includes a curved segment structure 19CS.

FIG. 9B shows the same fluid-foil base member 35 and the substantially closed-loop cable 17C as they rotate around a rotatable pulley 37 spinning around a hub 39. Note that the use of the curved segment structure 19CS facilitates the smooth engagement and rotation of the cable, the curved segment structure 19CS, the cable support structure 19SS and the fluid-foil base member 35 around the pulley 37. In an alternate embodiment smooth engagement and rotation could be accomplished with the curved segment structure deleted, and just the flexible cable 17C between two attach points of the cable support structure 19SS with the cable 17C.

FIGS. 10A through 10D illustrate aspects of control system means for controlling the fluid-dynamic renewable energy harvesting system.

Figure 10A:
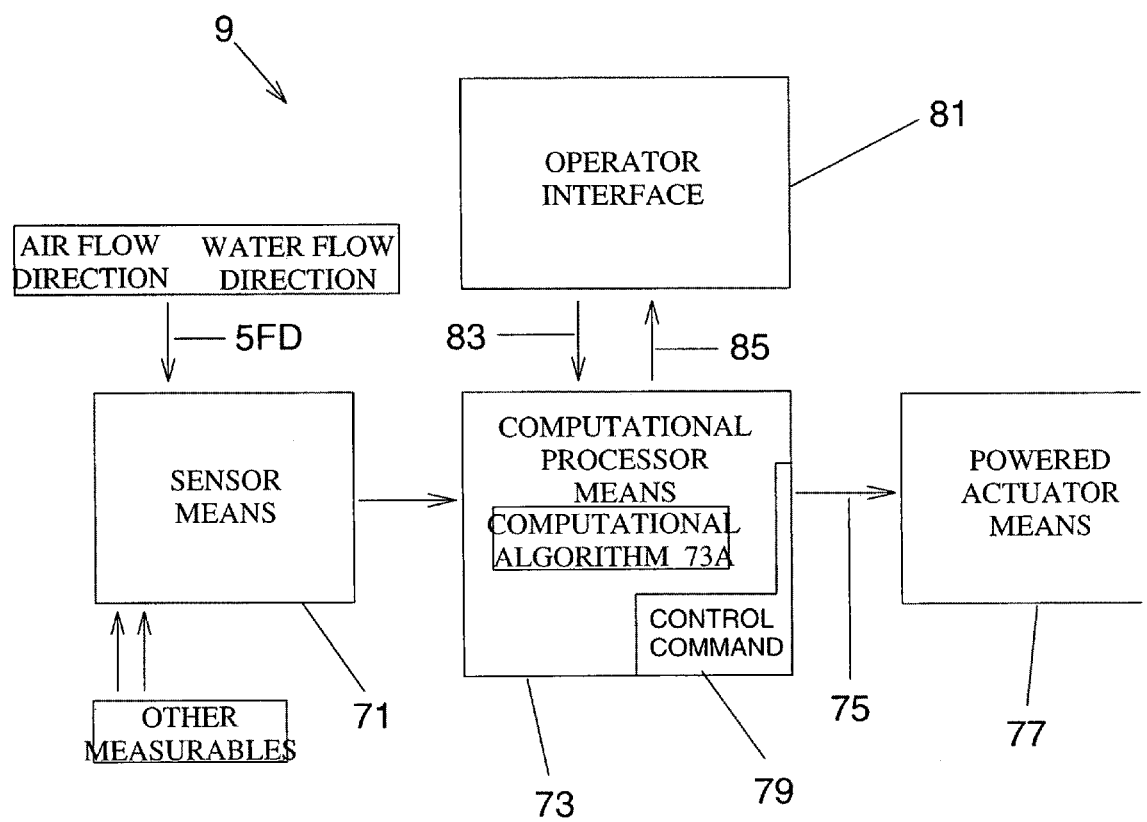

FIG. 10A illustrates a representative control system block diagram for a fluid-dynamic renewable energy harvesting system, wherein control system means 9 including actuator means, for controlling time-variable orientations of fluid-foil means, comprises (i) sensor means 71 for sensing a flow direction 5FD comprising at least one of an air flow direction (of an air current such as a wind) and a water flow direction (of a water current such as an ocean current or tidal current or river current) and optionally for sensing other measurables, (ii) computational processor means 73 with at least one computational algorithm 73A for generating a control command 79 as a function of said flow direction SFD, (iii) at least one powered actuator means 77 for executing the control command 79, and (iv) at least one signal transmission means 75 for transmitting a signal containing said control command 79 from said computational processor means 73 to said powered actuator means 77. The powered actuator means 73 can either directly control the orientation of fluid-foil means (that can include one or both of airfoil means 3A and water foil means 3WF), e.g. with a rotary or linear actuator or actuators, and/or indirectly control orientation of fluid-foil means using a control tab or other means for controlling including means for controlling at least one of a control surface 9CS, tab 3TAB, flap 3F, blown flap 3BF, slat 3SL, and morphing shape aerodynamic member 3MSA (not shown in this Figure but shown earlier). FIG. 10A also illustrates an optional operator interface 81 sending operator command(s) 83 to computational processor means 73 and receiving at least one of data and annunciation(s) 85 to an operator. An operator may actively control operation of the fluid-dynamic renewable harvesting system, or in alternate embodiments monitor its automatic operation and only intervene or override for non-normal, failure or emergency situations.

Figure 10B:
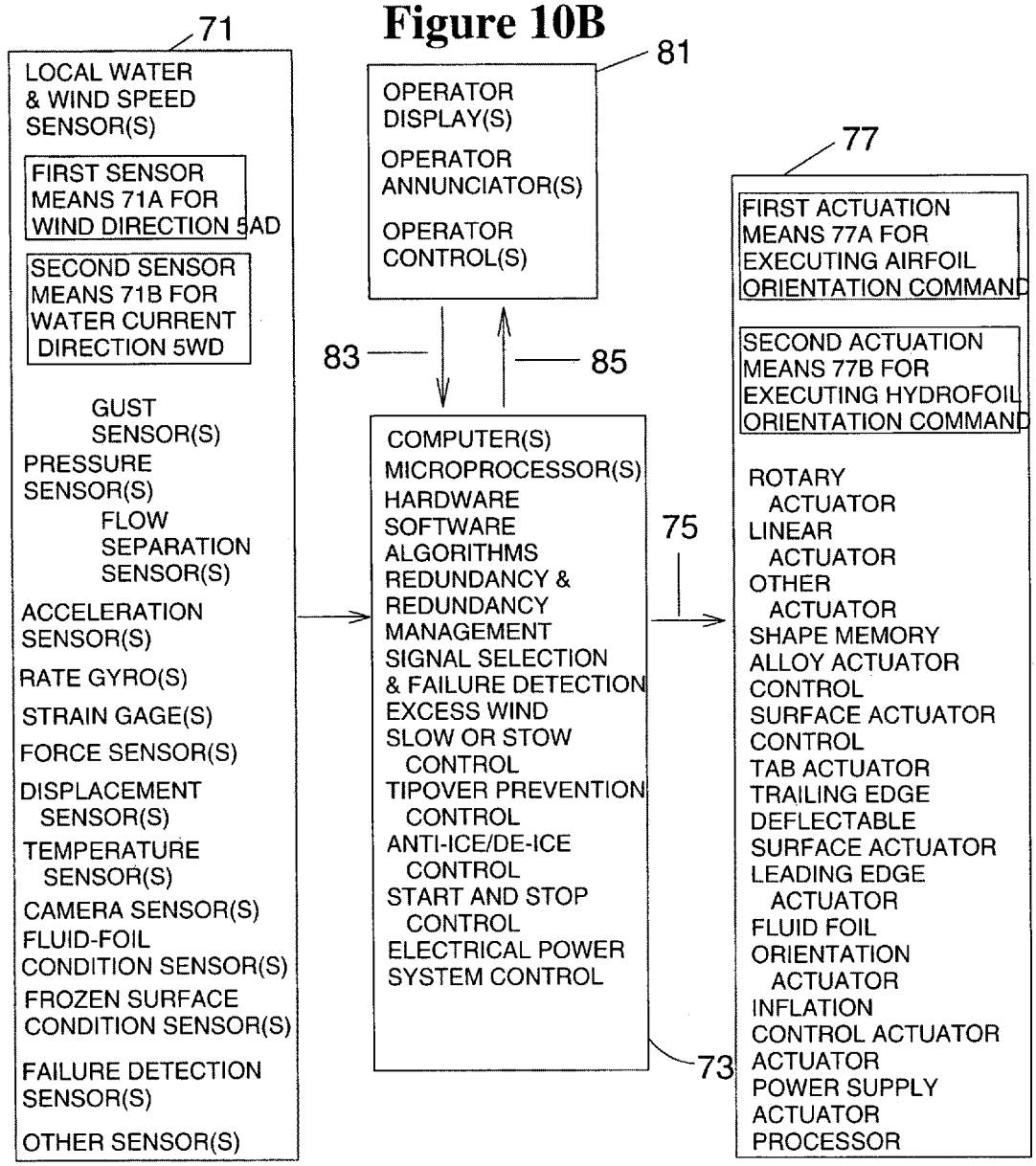

FIG. 10B illustrates several optional sub-elements which may reside in each of the blocks of the control system shown in FIG. 10A. The elements in the sensor means 71 could include a local wind speed sensor, local water speed sensor, air or wind flow direction sensor, water flow direction sensor(s) at one or more depths, gust sensor, pressure sensor, acceleration sensor, rate gyro, force sensor, displacement sensor, temperature sensor, camera sensor, fluid-foil condition sensor, icing condition sensor, failure detection sensor and/or other sensor(s). The computational processor means 73 could include a computer, a microprocessor, hardware, software algorithms, redundancy and redundancy management, sensor signal selection and failure detection, excess wind stow or slow control, tipover prevention control, anti-ice/de-ice control, start and stop control and/or electrical power system control. The powered actuator means 77 could include a rotary actuator, a linear actuator, other actuator, a shape memory alloy actuator, a control surface actuator, a control tab actuator, a trailing edge deflectable surface actuator, a leading edge actuator, a fluid-foil orientation actuator, an inflation control actuator, an actuator power supply and/or actuator processor. The optional operator interface 81 could include one or more of an operator display, an operator annunciator, and/or an operator control.

FIG. 10C illustrates for a fluid-dynamic renewable energy harvesting system, a computational algorithm 73A that comprises orientation command generation means 73OC for generating time-variable orientation commands 79OC for each of plural fluid-foil means 3 as a function of at least one of said flow direction 5FD and time-varying location 3TVL of at least one of said plural fluid-foil means 3, which time-variable orientation commands if properly executed by the at least one powered actuator means 77, would result in time-variable orientations of said plural fluid-foil means 3 that tend to substantially maximize the net work on the fluid-foil means 3 over the course of a cycle of substantially periodic motion of the fluid-foil means, through time-variable fluid-dynamic pressure distributions that tend to substantially maximize resulting forces acting on the fluid-foil means 3 to drive said substantially periodic motion when a fluid current comprising an air current and/or water current exists and carries energy in the form of fluid-dynamic kinetic energy. The fluid-foil means includes at least one of airfoil means and water foil means.

FIG. 10C illustrates for a fluid-dynamic renewable energy harvesting system, the additional feature comprising at least one of first command generation means 73OCA for commanding orientations of airfoil or wind foil means to beneficially harvest wind or air current energy, and second command generation means 73OCB for commanding orientations of hydrofoil or water foil means to beneficially harvest water current energy.

Figure 10D:
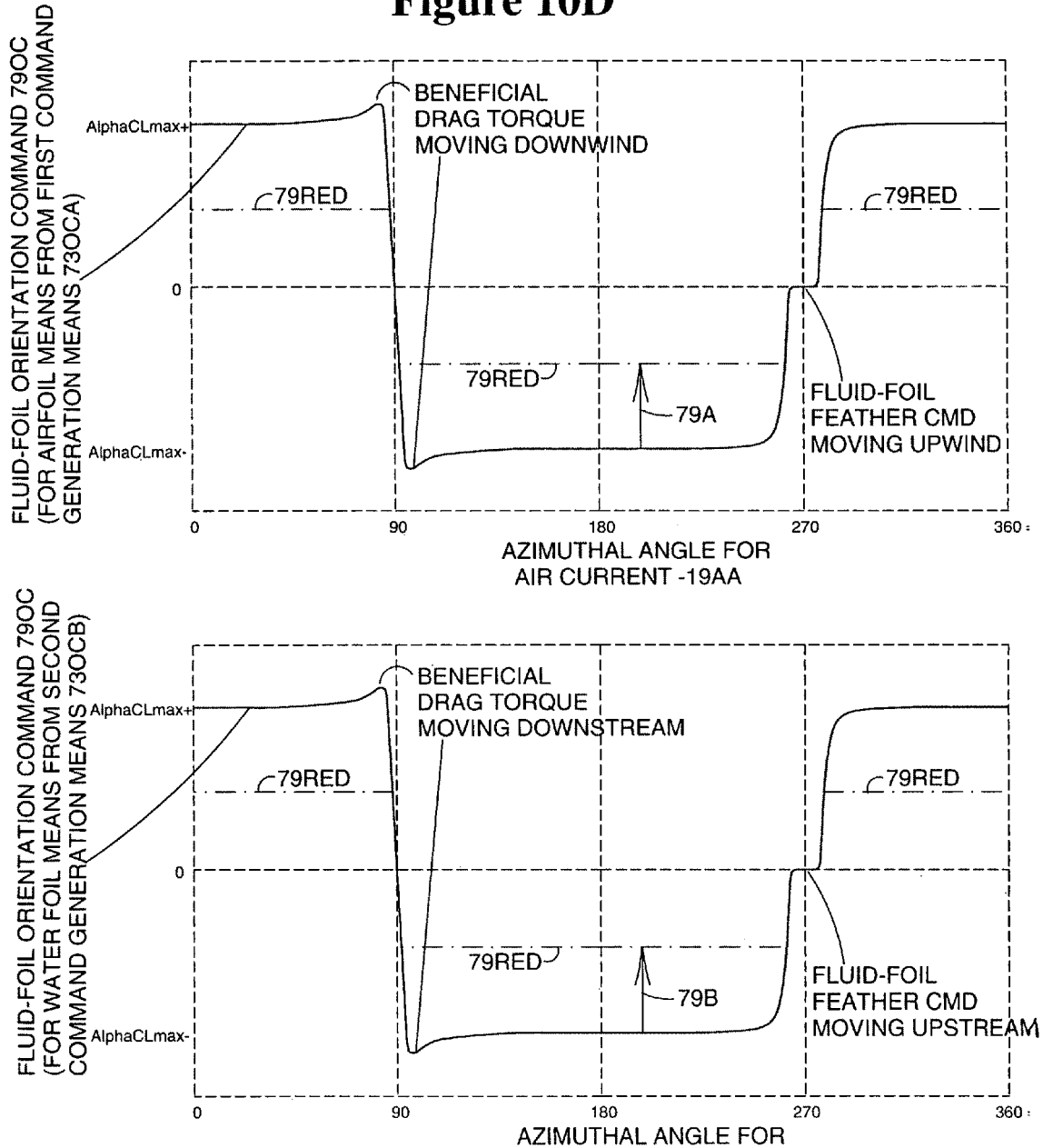

The upper Figure in FIG. 10D illustrates for a wind or air current, a representative fluid-foil orientation command 79OC schedule (for airfoil or wind foil means) as a function of the azimuthal angle 19AA along the rotational direction of motion 19RD, starting with 0 at incoming air flow direction, as described earlier in the context of FIG. 3A. In this representative preferred schedule, note that the fluid-foil is commanded to a maximum lift coefficient ($C_L$) orientation for the crosswind legs of its motion, while it can be commanded to a beneficial drag torque orientation on the peak downwind leg of motion near 90 deg azimuthal angle, and to a minimum drag feathered orientation on the peak upwind leg of motion near 270 deg azimuthal angle. Variant algorithms for fluid-foil orientation commands as a function of various sensor inputs and to achieve multiple objectives, are possible within the spirit and scope of the invention as claimed. For excessively high wind speed or storm conditions where the fluid-foils may be at risk of excess loads or of tipping over, the orientation commands can be diminished or reduced as shown in the dot-dashed lines for reduced magnitude orientation commands 79RED. The reduced magnitude orientation commands can optionally vary in magnitude as a function of azimuthal angle and other parameters such as wind speed or algorithmically calculated-tipping risk. While this orientation schedule has been shown for embodiment similar to that of FIG. 3A and the other parts of FIG. 3, it should be understood that functionally analogous schedules can be defined for the cable connected fluid-foil embodiments such as shown in FIGS. 1, 2A, 2B, 2C, 2D, 2E and 2F.

For a water current, the lower Figure in FIG. 10D illustrates a representative fluid-foil orientation command 79OC schedule (for hydrofoil or water foil means) as a function of the azimuthal angle 19WA along the rotational direction of motion 19RD, starting with 0 at incoming water flow direction, as described earlier in the context of FIG. 3A. In this representative preferred schedule, note that the fluid-foil is commanded to a maximum lift coefficient ($C_L$) orientation for the cross-current legs of its motion, while it can be commanded to a beneficial drag torque orientation on the peak downstream leg of motion near 90 deg azimuthal angle, and to a minimum drag feathered orientation on the peak upstream leg of motion near 270 deg azimuthal angle. Variant algorithms for fluid-foil orientation commands as a function of various sensor inputs and to achieve multiple objectives, are possible within the spirit and scope of the invention as claimed. For excessively high water current speed or storm conditions where the fluid-foils may be at risk of excess loads or of tipping/capsizing, the orientation commands can be diminished or reduced as shown in the dot-dashed lines for reduced magnitude orientation commands 79RED. The reduced magnitude orientation commands can optionally vary in magnitude as a function of azimuthal angle and other parameters such as water speed or algorithmically calculated tipping/capsizing risk. While this orientation schedule has been shown for embodiment similar to that of FIG. 3A and the other parts of FIG. 3, it should be understood that functionally analogous schedules can be defined for the cable connected fluid-foil embodiments such as shown in FIGS. 1, 2A, 2B, 2C, 2D, 2E and 2F.

Note also that different complementary and possibly cross-linked algorithms could be implemented for wind foils 3A and for water foils 3WF operating in conjunction, in the spirit and scope of the invention.

FIG. 10D thus illustrates for a fluid-dynamic renewable energy harvesting system, the additional feature comprising at least one of (i) airfoil command modification means 79A in said first command generation means 73OCA, for modifying said airfoil orientation commands to avoid potential harm when said airfoil means 3A are at risk of harm from at least one of wind loads and tipping, and (ii) hydrofoil command modification means 79B in said second command generation means 73OCB, for modifying said hydrofoil orientation commands to avoid potential harm when said hydrofoil means 3WF are at risk of harm from at least one of water current loads and tipping.

Note that the type of orientation command vs. azimuthal angle schedules shown in FIG. 10D will yield considerably greater energy extracted than a simple sinusoidal or similar fixed schedule orientation control. Note also that individual local flow speed and direction sensors for air and/or water flow may provide additional input to optimize each fluid foil orientation for wind foils and/or water foils at each instant, including considerations of downwash, wake, and local flow variations both natural and induced by other fluid foils.

FIGS. 10A through 10D collectively disclose for a fluid-dynamic renewable energy harvesting system, control system means 9 that includes at least one of (i) first sensor means 71A for at least one of measuring and estimating wind direction plus first command generation means 73OCA for generating airfoil orientation commands intended to control said time-variable orientations of airfoil means 3A that are members of said fluid-foil means 3 plus first actuation means 77A for executing said airfoil orientation commands; and (ii) second sensor means 71B for at least one of measuring and estimating water current direction plus second command generation means 73OCB for generating hydrofoil orientation commands intended to control said time-variable orientations of hydrofoil means 3WF that are members of said fluid-foil means 3 plus second actuation means 77B for executing said hydrofoil orientation commands.

The airfoil orientation commands in one class of embodiments typically comprise airfoil angle of attack commands relative to the wind direction 5AD and the hydrofoil orientation commands may typically comprise hydrofoil angle of attack commands relative to the water current direction 5WD.

In one particular variant embodiment the airfoil orientation commands comprise a discrete set of airfoil orientation commands including (i) zero angle of attack relative to said wind direction 5AD, (ii) angle of attack corresponding to maximum airfoil lift coefficient acting towards the right hand side from a perspective oriented against the wind direction 5AD, and (iii) angle of attack corresponding to maximum airfoil lift coefficient acting towards the left hand side from a perspective oriented against the wind direction 5AD.

In one particular variant embodiment the hydrofoil orientation commands comprise a discrete set of hydrofoil orientation commands including (i) zero angle of attack relative to said water current direction 5WD, (ii) angle of attack corresponding to maximum hydrofoil lift coefficient acting towards the right hand side from a perspective oriented against the water current direction 5WD, and (iii) angle of attack corresponding to maximum hydrofoil lift coefficient acting towards the left hand side from a perspective oriented against the water current direction 5WD.

FIGS. 11A through 11F illustrate side views of a variety of anchoring means for anchoring parts of a fluid-dynamic renewable energy harvesting system, typically to a ground surface such as an underwater ground surface.

Figure 11A:
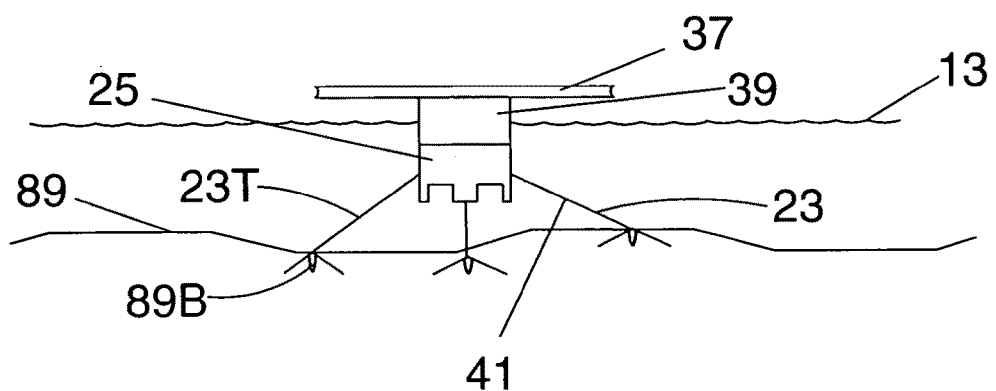

FIG. 11A illustrates a pulley hub 39 floating at a water surface 13, supporting a rotatable pulley 37 (through bearing means not shown). The hub 39 is anchored in a ground surface 89 by means for anchoring 41 it in that ground surface 89, where the means for anchoring 41 may include cable or rod elements as well as ground penetrating fastener or anchor or stake or screw elements. The means for anchoring 41 serves also as position keeping means 23 such as position-keeping tether or cable 23T, connected at their lower ends to (underwater) ground anchors 89B. The hub contains energy harvesting means 25 as illustrated in this embodiment and as earlier illustrated in a similar embodiment in FIGS. 1 and 2A.

FIG. 11A also illustrates for a fluid-dynamic renewable energy harvesting system, the use of position-keeping means 23 that includes at least one of a tether or cable 23T and an anchor 89B fastened to an underwater ground surface 89U.

Figure 11B:
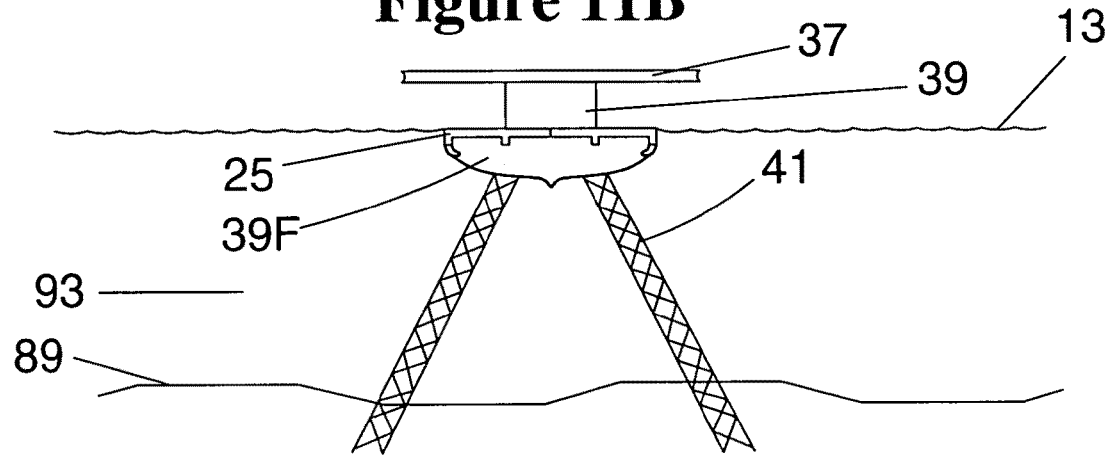

FIG. 11B shows a variant embodiment wherein the means for anchoring 41 have a different configuration (with a truss structure) as illustrated, for anchoring the hub 39 supported by a pulley support float 39F, to the ground surface 89 beneath a liquid water layer 93.

FIG. 11C shows another variant embodiment wherein a nonrotating hub 53 supports a rotatable structure 55, as for instance in the earlier illustrated embodiments of FIGS. 3A, 3B and 3C. The nonrotating hub 53 is anchored in a ground surface 89 below a water layer 93, by means for anchoring 41 it in that surface. The hub contains energy harvesting means 25.

FIG. 11D shows a variant embodiment wherein the means for anchoring 41 have a different configuration as illustrated, for anchoring the nonrotating hub 53 to the ground surface 89 beneath a water layer 93. The means for anchoring 41 here comprise use of ground anchors 89A screwed into the ground surface 89.

In similar manner FIG. 11I shows a variant embodiment where the underwater ground anchor 89B has downward projecting ground engagement projections at various angles, as shown.

Figure 11F:
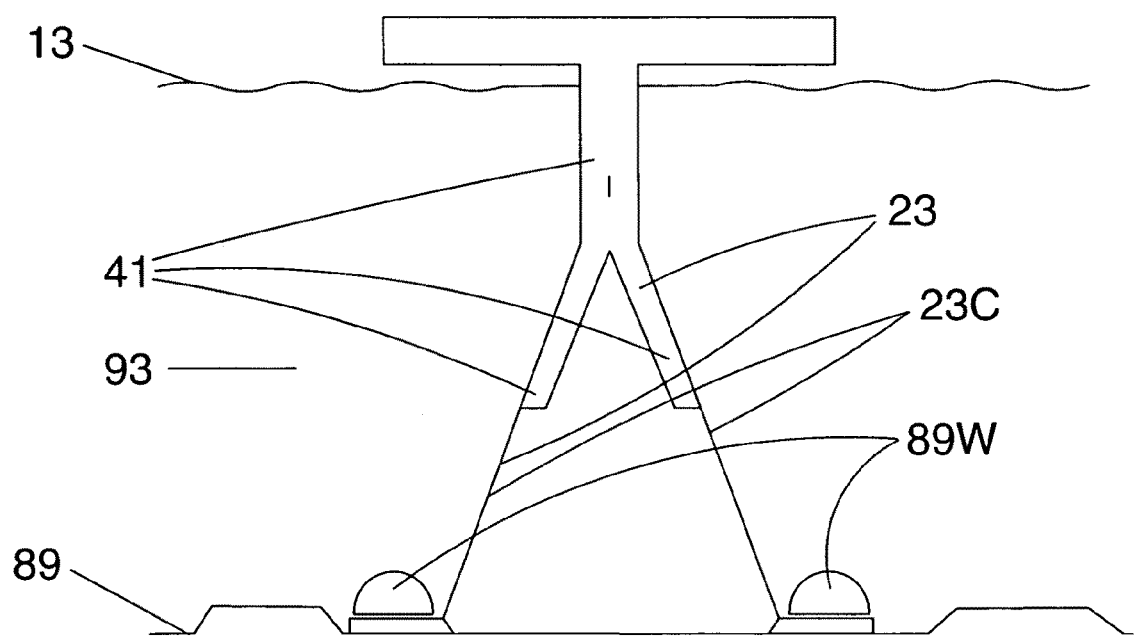

FIG. 11F shows a variant embodiment, where the means for anchoring 41 include at least one underwater weight 89W used to enable friction anchoring of the device to the ground surface 89.

FIG. 11F further illustrates position-keeping means 23 that includes at least one tether or cable 23T and at least one weight 89W with a weight force acting downward on the underwater ground surface and inhibited from translational motion relative to an underwater ground surface 89U by frictional forces.

Figure 12:
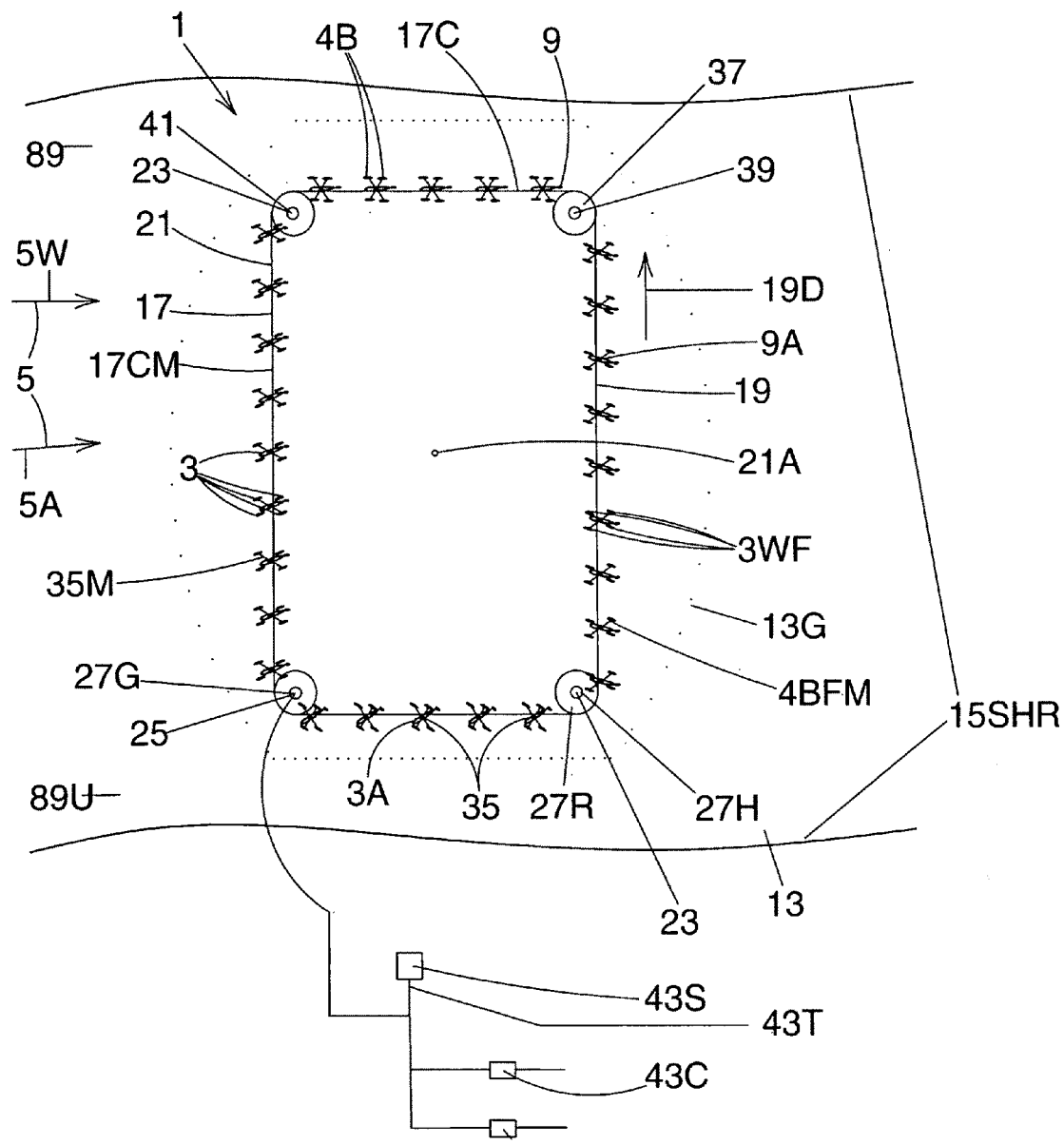
FIG. 12 presents a plan view illustration of position-keeping means for maintaining a fluid-dynamic renewable energy harvesting system within a desired geographic envelope, and further illustrating means for storing, transmitting, processing and conditioning energy harvested by the fluid-dynamic renewable energy harvesting system.

FIG. 12 presents a plan view illustration of position-keeping means for maintaining a fluid-dynamic renewable energy harvesting system 1 within a desired geographic envelope 13G, and further illustrating means for storing, transmitting, processing and conditioning energy harvested by the fluid-dynamic renewable energy harvesting system 1. The renewable energy harvesting system is shown sited in a body of water such as a river or estuary or strait or sound or channel, between shorelines 15SHR. A water current 5W flowing between the two shorelines may be a river current and/or tidal current and/or ocean or sea current. The illustrated fluid-dynamic renewable energy harvesting system uses a combination of fluid-foil means 3 comprising airfoil or wind foil means 3A and hydrofoil or water foil means 3WF, with fluid-foils of the two types arranged together in modules connected by module structure 35M, with the various modules connected a closed-loop sequential arrangement with closed periphery topology, by connecting means 17 here comprising a substantially closed-loop cable 17C including connecting members 19. The individual airfoils and hydrofoils can be independently oriented as a function of the flow direction of fluid currents comprising both an air current or wind 5A and a water current 5W, which are not necessarily aligned. The airfoils and hydrofoils are oriented preferably optimally to harvest wind energy and water current energy respectively, both such as to drive motion of the substantially closed-loop cable 17C and included connecting members 19 in the illustrated direction 19D around axis 21A, with low friction motion enabled by the use of floating modules supported by buoyancy forces acting on the hydrofoils 3W which have nonzero thickness and hence generate buoyancy forces by displacement of water from below a water surface 13. Note that for the downwind and downstream leg of the circuit in the illustrated embodiment, the airfoils and hydrofoils are in desired high-drag configurations but with opposing lift vectors to minimize transverse loading on the closed-loop cable 17C. The closed-loop cable 17C is shown looped around four rotatable pulleys 37 that can rotate around hubs 39, which in turn are anchored to a ground surface under a water surface 13 through the use of means for anchoring 41 such as those shown earlier in the various parts of FIG. 11. The means for anchoring 41 serve as means for maintaining the energy harvesting system within the desired geographic envelope 13G. At least one of the hub and pulley assemblies is fitted with energy harvesting means 25 including generator means 27G, that convert energy carried in the closed-loop cable 17C through rotation of a pulley into electrical energy from generator means 27G. The electrical energy is carried from the wind energy harvesting system by electrical transmission cable means, and can then optionally feed into at least one of means for transmitting energy 43T; means for conditioning energy 43C; means for processing energy 43PR; and means for storing energy 43S. The means for storing energy 43S may include one or more of mechanical energy storage means such as flywheel means, chemical energy storage means such as battery means or other chemical storage, fuel generation means such as electrolysizing means for generation of hydrogen gas fuel from water, and thermal energy storage means. Harvested energy may also optionally be used for other beneficial purposes such as to run a desalination system acting on sea water.

FIG. 12 further illustrates a fluid-dynamic renewable energy harvesting system 1 in plan view, comprising:

plural fluid-foil means 3 for contacting proximate flow fields of a fluid current 5 when said fluid current exists and carries fluid current energy in the form of fluid-dynamic kinetic energy;

an effective, axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement around a circuit 21 of closed periphery topology enclosing an axis of revolution 21A, wherein said axis of revolution is disposed within 60 degrees of vertical; said connecting means 17 including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means 3 as they revolve around closed circuit paths substantially corresponding to said circuit 21, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

FIG. 12 further illustrates a fluid-dynamic renewable energy harvesting system 1, wherein the closed-loop cable 17C and the plural fluid-foil means 3 together execute the cycle of periodic motion, around at least two buoyantly supported rotatable pulleys 37, and wherein the energy harvesting means 25 utilizes transfer of some work from the plural fluid-foil means 3, through tension in the closed-loop cable 17C, to rotational work on at least one buoyantly supported rotatable pulley 37; and wherein the energy conversion means 27 comprises generator means 27G for converting said rotational work to energy in a desired form comprising at least one of electrical energy and chemical energy.

FIG. 12 also illustrates a fluid-dynamic renewable energy harvesting system 1, further comprising at least one of means for transmitting energy 43T, means for conditioning energy 43C, means for processing energy 43PR, and means for storing energy 43S.

Examples of means for storing energy 43S include battery and/or capacitor and/or nanotech capacitor means for storing electrical energy, mechanical means such as a flywheel, chemical means such as electrolysizing water to produce hydrogen, and energy storage as gravitational potential energy or in pressurized fluid. Examples of means for transmitting energy 43T include electrical wires and cables. Examples of means for processing energy 43PR include voltage converters, transformers, AC/DC converters, rectifiers, and similar processing and conversion devices known from the prior art. Examples of means for conditioning energy 43C include surge protectors, means for shaping and/or smoothing alternating currents, frequency and phase conditioners and similar conditioning devices known from the prior art.

FIG. 12 also illustrates a fluid-dynamic renewable energy harvesting system 1, wherein said plural hydrofoil means 3WF are divided amongst multiple floating modules 4BFM, each said floating module 4BFM comprising module structure 35M to which multiple hydrofoil means 3WF are connected, and wherein cable means 17CM are provided for connecting adjacently located floating modules 4BFM, and wherein said energy conversion means 27 includes a rotating member 27R driven to rotational motion by motion of said cable means 17CM which in turn in driven by motion of said floating modules 4BFM including said module structure 35M to which said multiple hydrofoil means 3WF are connected; and wherein said rotating member 27R is rotatable around a nonrotating hub member 27H connected and substantially anchored to said underwater ground surface 89U.

Note that variant embodiments similar but not identical to that of FIG. 12, could feature different numbers of airfoil means 3A and hydrofoil means 3WF (including possibly zero of one or the other type); different numbers and geometric arrangements of pulleys 37; use of floating or ground supported pulleys; and different specific means for anchoring or position-keeping for the fluid-dynamic renewable energy harvesting system 1.

Figure 13:
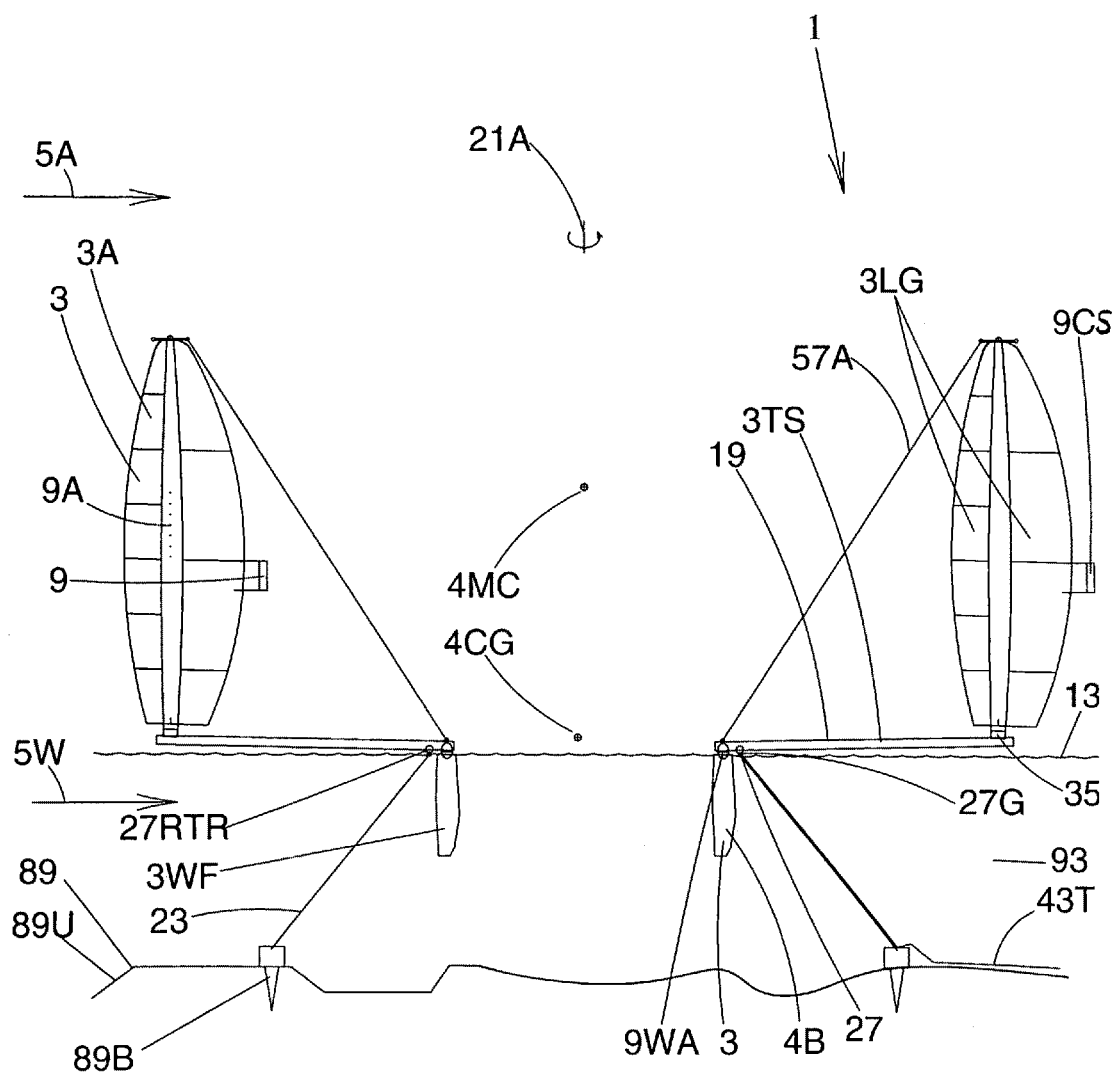
FIG. 13 shows a partial side view of another embodiment of the invention floating on a water surface, with offset airfoils and hydrofoils that see different local rotation-induced fluid velocities even while rotating at a common RPM.

FIG. 13 shows a partial side view of another embodiment of a fluid-dynamic renewable energy harvesting system 1, that utilizes fluid-foil means 3 including both airfoil or wind foil means 3A and hydrofoil or water foil means 3WF, that are mutually connected by tubular structural elements 3TS and angled tension members 57A. This embodiment of the invention is shown floating on a water surface 13, with airfoils or wind foil means 3A and hydrofoil or water foil means 3WF all arranged to revolve around an axis 21A. The wind foil means 3A and water foil means 3WF are offset so that they see different local rotation-induced fluid velocities even while rotating at a common angular velocity (e.g., RPM or revolutions per minute) around axis 21A. The wind foil means 3A may preferably be filled with lifting gas 3LG such as helium or hydrogen gas, to reduce vertical load transfer needed through the tubular structural elements 3TS, with vertical load through the fluid-foil base members 35 varying in different embodiments from a net downward load to a net upward load. The angles of attack of the wind foils 3A relative to the local vector sum of air motion from the incoming air current or wind 5A plus the induced air velocity from rotation of the energy harvesting system, is controlled through the use of control surfaces 9CS in some optimal manner such as to harvest wind energy. Similarly, the angles of attack of the water foils 3W relative to the local vector sum of water motion from the incoming water current 5W plus the induced water velocity from rotation of the energy harvesting system, is controlled through the use of water foil actuators 9WA in some optimal manner such as to harvest water current energy. The rotational energy of the assembly including the air foil means 3A and water foil means 3WF is captured by energy conversion means 27 including generator means 27G that engage a rotating tethering ring 27RTR, as shown. The generator means 27G are located near the upper end of position-keeping means 23 such as tethers, that are anchored at their lower end by underwater ground anchors 89B to a ground surface 89 that is an underwater ground surface 89U.

The water foil means 3WF have nonzero thickness and displace liquid water 93 below a water surface 13, to generate buoyancy forces and act as buoyant support means 4B. Thus a fluid-dynamic renewable energy harvesting system 1 illustrated, wherein a buoyancy force is provided by displacement of liquid water 93 below a water surface 13.

FIG. 13 further illustrates a fluid-dynamic renewable energy harvesting system 1, wherein a portion of said fluid-dynamic renewable energy harvesting system that is supported by said buoyancy force, has a center of gravity location 4CG that is below a metacenter 4MC associated with said buoyancy force.

It should be noted as evident from the prior art that floating entities having a metacenter associated with the entity's center of buoyancy and its movement, float stably when they have a center of gravity location that is below this metacenter. It is similarly known from the prior art that sometimes there are multiple metacenters associated with different axes of rotation of the entity. It should be understood that for variant embodiments of the present invention, the buoyancy may be provided by hydrostatic buoyancy for water support elements and/or aerostatic buoyancy for air support elements.

Figure 14:
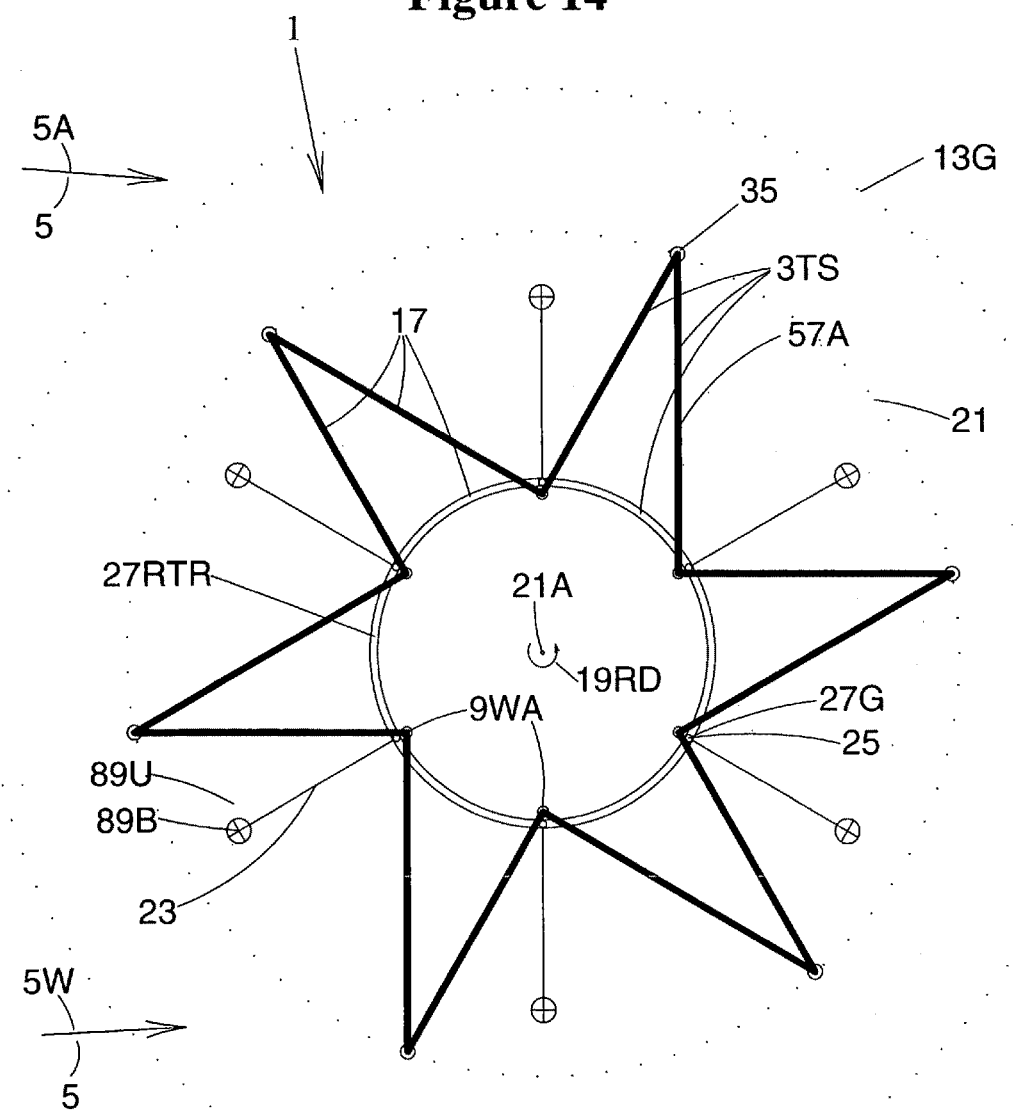
FIG. 14 shows a full plan view of the embodiment of FIG. 13.

FIG. 14 shows a partial feature illustration plan view of the embodiment of FIG. 13. The structural connection geometry utilizing tubular structural elements 3TS to connect the airfoils or wind foil means 3A (not shown, for clarity) through the fluid-foil base elements 35 (shown), with the hydrofoil or water foil means 3WF (not shown, for clarity) through the water foil actuators 9WA (shown), is evident in this Figure. The tubular structural elements may be of composite or metal or hybrid construction, and may optionally be inflated with air or a lifting gas for at least one of stabilization and buoyancy. The tubular structural elements may utilize ply tailored composite materials with different ply orientations, arrangements, and varying modulus fibers, to react design loads in a cost-effective and weight-efficient manner. The tubular structural elements may also include integral or fastened-on stiffener elements such as stringer and/or longeron and/or frame and/or truss elements as known from the prior art of structural design. While in the illustrated embodiment the angled tension members 57A are shown above only the more azimuthally angled radial structural spoke going to the airfoil location, in alternate embodiments such angled tension members could also be provided over the less azimuthally angled radial structural spoke, or with other locations for their inner fastening points.

The ratio of the radial distance from the rotation axis 21A to the fluid-foil base elements 35 (and corresponding airfoil or wind foil means) over the radial distance from the rotation axis 21A to the water foil actuators 9WA (and corresponding hydrofoil or water foil means), is approximately 2.7 in the illustrated embodiment, so the rotation induced air velocity component acting on the airfoil or wind foil means, will be 2.7 times the rotation induced water velocity component acting on the hydrofoil or water foil means. This ratio of rotation-induced air to water speeds greater than one, will be generally beneficial in efficiently harvesting both wind and water current energy, at locations where average or median wind speed is greater than average or median water current speed, which is true at most site locations worldwide. Clearly different numerical radial distance ratios are possible in variant embodiments of the invention intended for optimal application at different sites with different wind and water current statistical velocity distributions. Note that these ratios have applicability with regard to average wind and water speeds rather than directions, as the device can efficiently collect both wind and water current energy for arbitrary and non-aligned wind and water current directions, by optimal and independent orientation of airfoil or wind foil means on the one hand, and of hydrofoil or water foil means on the other hand, as each category of fluid-foil move circumferentially around the axis 21A in the rotational direction 19RD.

The rotational energy of the assembly including the air foil means and water foil means is captured by energy harvesting means 25 including generator means 27G that engage a rotating tethering ring 27RTR, as shown. The generator means 27G are located near the upper end of position-keeping means 23 such as tethers, that are anchored at their lower end by underwater ground anchors 89B to an underwater ground surface 89U.

FIGS. 13 and 14 together illustrate a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement, including connecting members 19 that connect adjacently-located fluid-foil means in said sequential arrangement; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

FIGS. 13 and 14 also together illustrate a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B comprising at least one of a float, an inflated float, a pontoon, a hull, a catamaran hull, a trimaran hull, multiple connected hulls, plural hydroskis with finite thickness and plural hydrofoils 3WF with finite thickness, for utilizing a buoyancy force from water displacement to at least partially contribute to supporting said plural fluid-foil means 3 above an underwater ground surface 89U;

connecting means 17 for connecting said plural fluid-foil means in a sequential arrangement, including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

FIGS. 13 and 14 also together illustrate a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement around a circuit 21 of closed periphery topology enclosing an axis of revolution 21A, wherein said axis of revolution is disposed within 60 degrees of vertical; said connecting means 17 including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means 3 as they revolve around closed circuit paths substantially corresponding to said circuit 21, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

Note that each fluid foil path (illustrated airfoil path but also applicable similarly to the water foil path) may vary somewhat from the circuit 21, being offset by particular fluid foil location as modified by fluid force induced path displacements.

Figure 15:
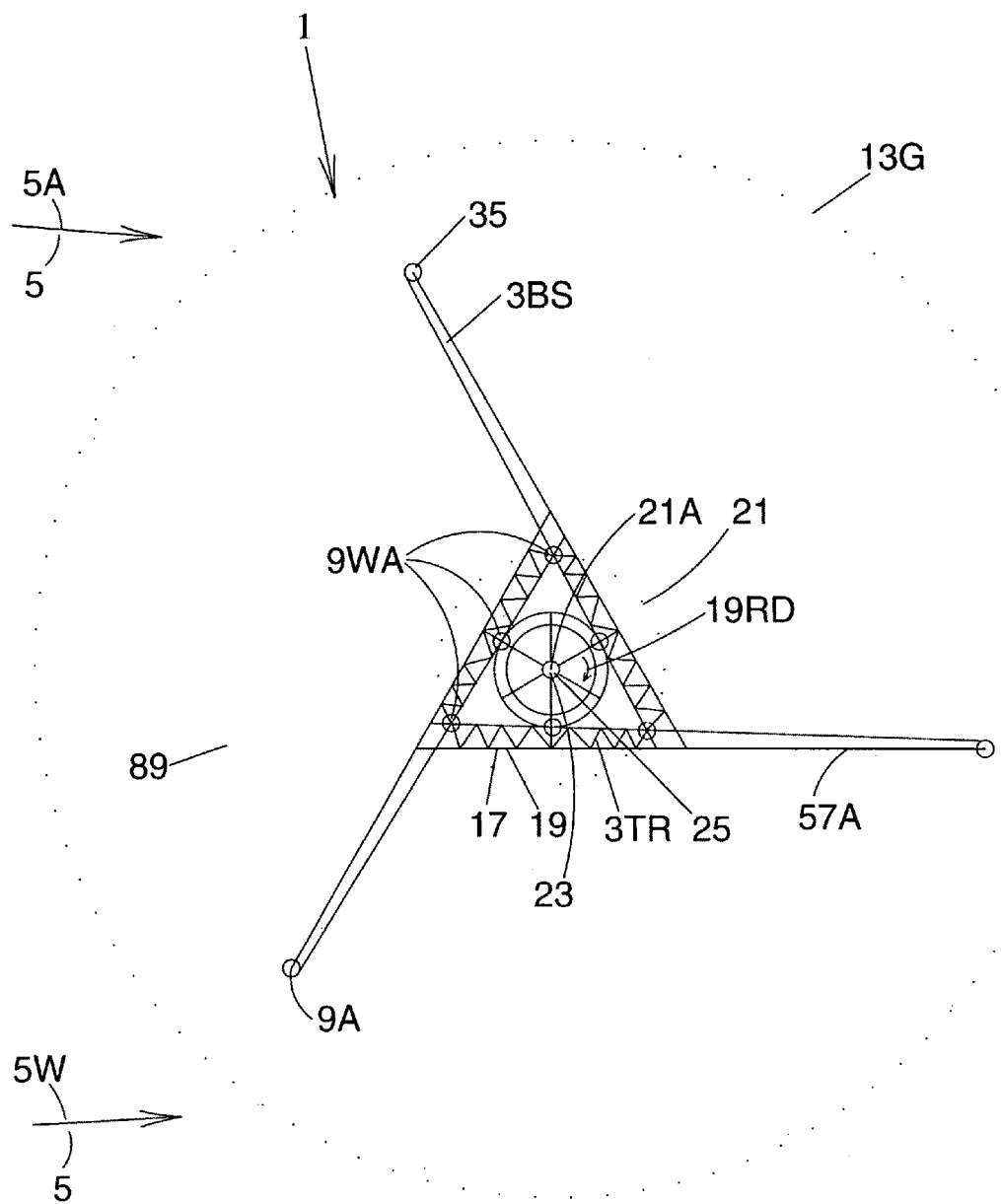
FIG. 15 shows a plan view of an alternative to the embodiment of FIG. 14.

FIG. 15 shows a partial plan view of an alternative embodiment in the same class as the embodiment of FIGS. 14 and 13. The tubular structural elements 3TS are replaced by beam structural elements 3BS and truss structural elements 3TR as illustrated, but clearly variants with any combination of tubular, beam, truss, plate and other types of known structural elements are possible within the spirit and scope of the invention. The embodiment of FIG. 15 has 3 fluid-foil base elements 35 intended to support airfoil or wind foil means 3A (not shown, for clarity), and has 6 water foil actuators 9WA for controlling downwardly projecting hydrofoil or water foil means 3WA (not shown, for clarity).

The ratio of the radial distance from the rotation axis 21A to the fluid-foil base elements 35 (and corresponding airfoil or wind foil means) over the radial distance from the rotation axis 21A to the outer 3 water foil actuators 9WA (and corresponding hydrofoil or water foil means), is approximately 3.7 in the illustrated embodiment. The ratio of the radial distance from the rotation axis 21A to the fluid-foil base elements 35 (and corresponding airfoil or wind foil means) over the radial distance from the rotation axis 21A to the inner 3 water foil actuators 9WA (and corresponding hydrofoil or water foil means), is approximately 7.2 in the illustrated embodiment. Thus this embodiment may be better optimized for locations where the average wind to water current speed ratio is higher than for the cases where the FIG. 14 embodiment would be optimal. To cite a Gulf Stream example, the wind to water speed ratio will be higher on average at locations offshore from North Carolina, as compared to offshore from Florida. It should be kept in mind that numerous considerations can drive different preferred embodiment solutions in different siting locales.

The embodiment of FIG. 15 illustrates a fluid-dynamic renewable energy harvesting system 1, comprising:

plural fluid-foil means (airfoil means and water foil means, not shown for clarity) for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means including actuator means (such as water foil actuators 9W), for controlling time-variable orientations of said fluid-foil means relative to said proximate flow fields of said fluid current when said fluid current exists and carries fluid current energy in the form of fluid-dynamic kinetic energy;

buoyant support means (comprising buoyant water foils, not shown for clarity) for utilizing a buoyancy force from fluid displacement to at least partially contribute to supporting said fluid-foil means above a ground surface 89;

connecting means 17 for connecting said plural fluid-foil means in a sequential arrangement around a circuit 21 of closed periphery topology enclosing an axis of revolution 21A, wherein said axis of revolution is disposed within 60 degrees of vertical; said connecting means 17 including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means, for converting a portion of said fluid-dynamic kinetic energy into net work on said fluid-foil means over the course of a cycle of substantially periodic motion of said fluid-foil means 3 as they revolve around closed circuit paths substantially corresponding to said circuit 21, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means for converting at least some of said net work into energy in a desired form for at least one of transmission, storage, processing and use.

Figure 16:
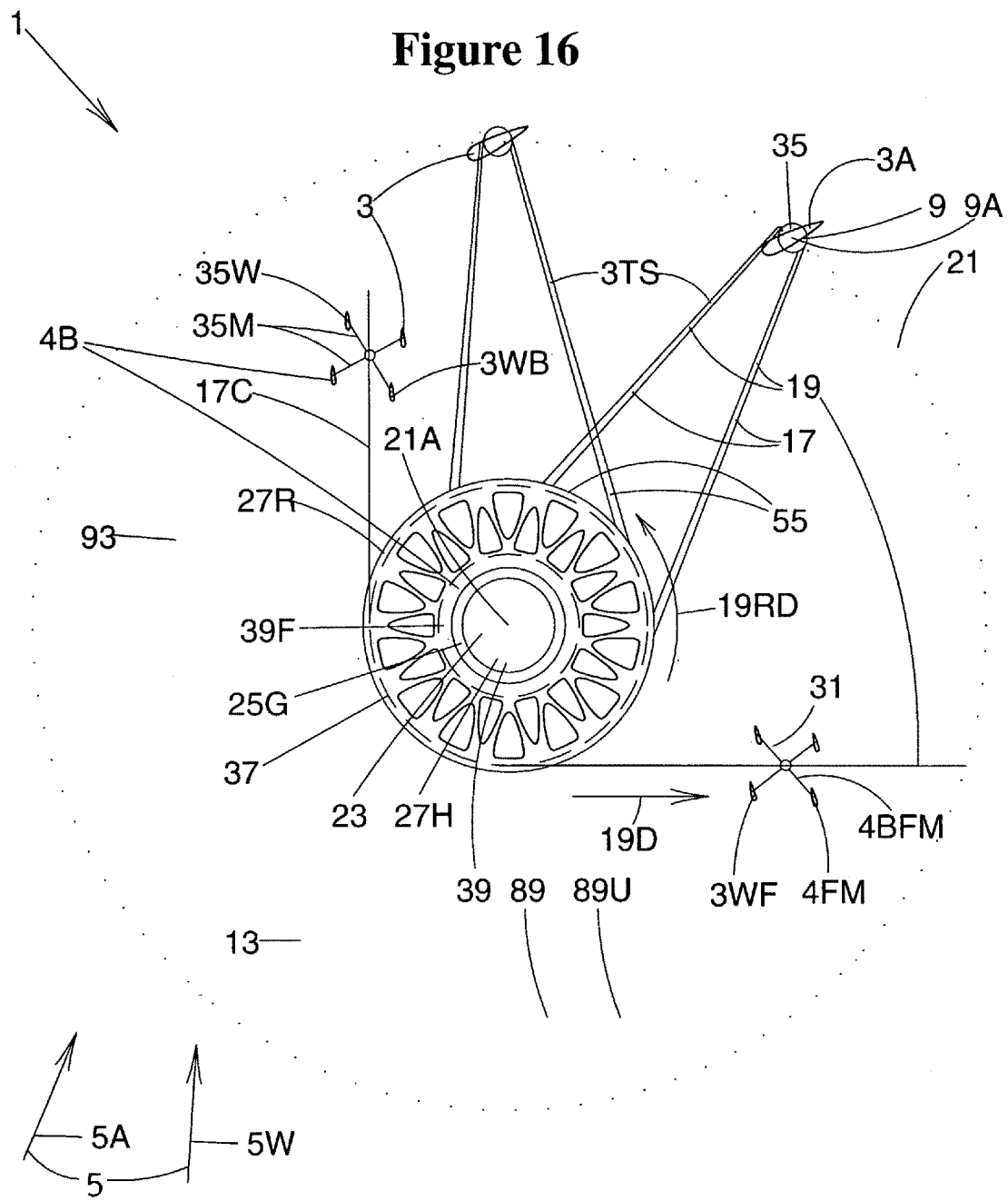
FIG. 16 shows a partial plan view of a hybrid embodiment combining cable-connected hydrofoils or water foil means, with non-cable-connected airfoils or wind foil means.

FIG. 16 shows a partial plan view of a hybrid embodiment combining cable-connected hydrofoils or water foil means 3WF, with non-cable-connected airfoils or wind foil means 3A. Both the water foils and wind foils are types of fluid-foil means 3. The illustrated fluid-dynamic renewable energy harvesting system 1 is floating on a liquid water layer 93 below a water surface 13 and above a ground surface 89 that is an underwater ground surface 89U. In this embodiment nine airfoil or wind foil means 3A are spaced around a rotating member 27R that rotates around a nonrotating hub member 27H that is tethered to an underwater ground surface by position-keeping means 23 including underwater tethers connecting to the underside of the nonrotating hub member (which is not visible in this plan view). Only two of the nine airfoil or wind foil means 3A are shown, for clarity of illustration. The airfoil or wind foil means 3A are supported on fluid-foil base members 35, with control system means 9 included in the base members 35, for orienting the airfoil or wind foil means 3A as needed to capture wind energy from the air current or wind 5A. The fluid-foil base members 35 are shown structurally connected with the rotating member 27R through tubular structure 3TS, though beam and/or truss structures could be used in lieu of or in addition to the tubular structure. The tubular structure 3TS serves as connecting means 17 for connecting plural fluid-foil means (here airfoil or wind foil means 3A) in a sequential arrangement around a circuit 21 of closed periphery topology enclosing an axis of revolution 21A. The rotation of the rotatable structure 55 including rotating member 27R, relative to the nonrotating hub member 27H can be used to drive generator means 27G for harvesting wind energy captured by the plurality of wind foils 3A, and converting that wind energy into electrical energy.

Also connected to the nonrotating hub member 27H is a rotatable pulley 37 around which a substantially closed loop cable 17C runs (only a portion of the cable 17C is visible in this partial plan view). The fluid-foil means that are hydrofoil or water foil means 3WF are grouped in floating modules 4BFM and connected by connecting structure 31 comprising module structure 35M connecting the water foil top support members 35W. The water foil means 3WF are here buoyant hydrofoils or buoyant water foil means 3WB, and serve as buoyant support means 4B. The pulley support float 39F also serves as buoyant support means 4B. While only two modules of hydrofoil means are shown in this illustration for clarity, actual implementations can incorporate varying numbers of modules at selected variable spacings. The cable travel direction of motion 19D is shown in the same sense as the rotational direction of motion 19RD of the rotatable structure 55 and the wind foil means 3A. However, the angular rate of rotation of the two do not need to match, and the generator means 25G will preferably include separate interfaces between the nonrotating hub member 27H and the rotating structure 55 connected to the wind foil means 3A on the one hand, and between the nonrotating hub member 27H and the rotatable pulley 37 connected to the substantially closed-loop cable 17C and the attached water foil means 3WF on the other hand. This permits each renewable energy subsystem (the wind and water current subsystems) to operate at their respective optimal rotational rates depending on wind and water current conditions at any given time. In variant embodiments, the sense of motion of the cable travel direction of motion 19D may be of the opposite sense as the rotational direction of motion 19RD of the rotatable structure 55. In this case it may also be possible to have an element of the generator means 25G at the interface between the rotatable structure 55 and the rotatable pulley 37 which are now revolving in opposite directions.

FIG. 16 illustrates a fluid-dynamic renewable energy harvesting system 1, wherein connecting members 19 comprise at least one of connecting cable elements (e.g., substantially closed-loop cable 17C) and connecting rod elements (e.g., tubular structural elements 3TS).

Figure 17:
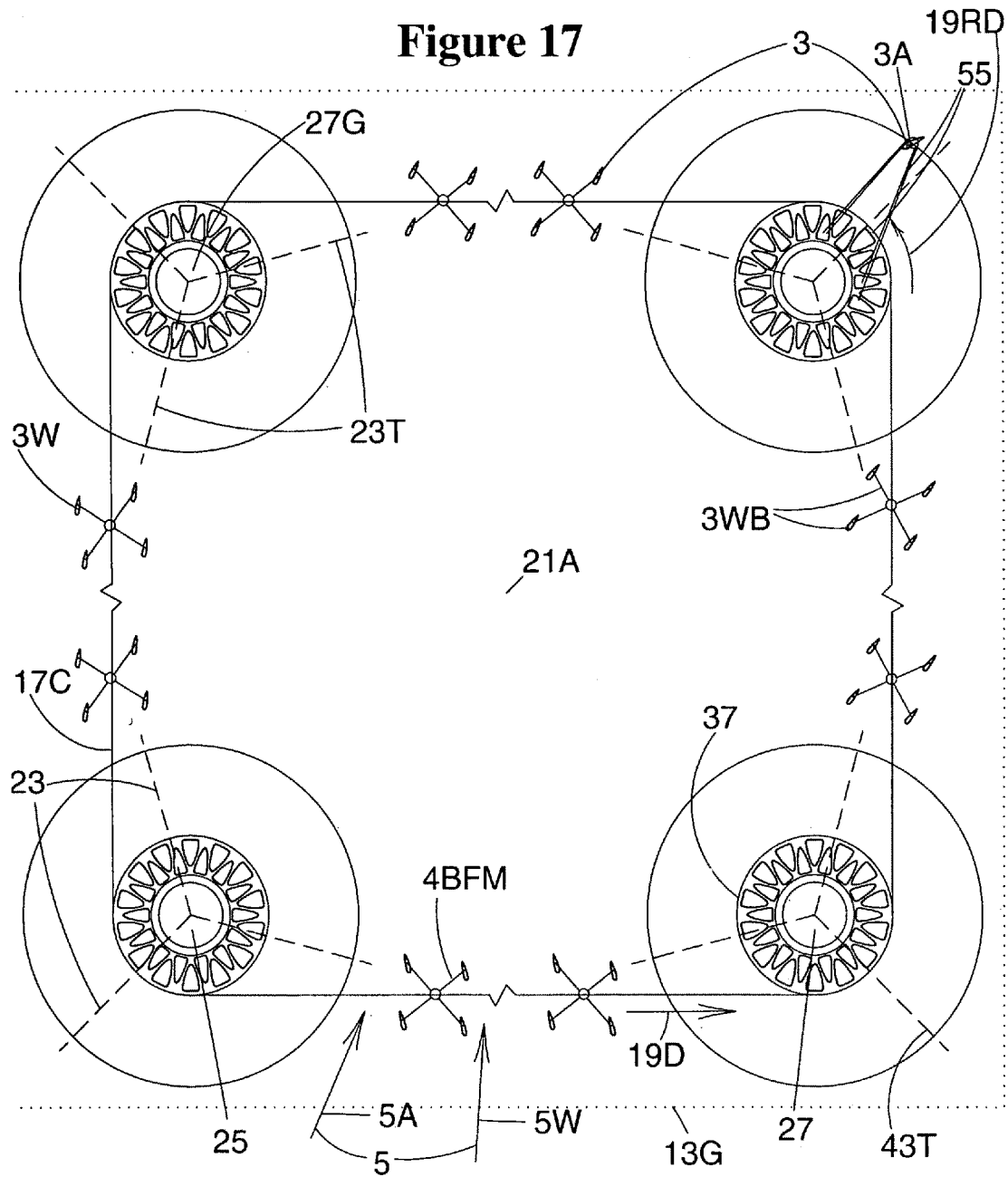
FIG. 17 shows a larger area plan view of the embodiment of FIG. 16.

FIG. 17 shows a larger area plan view of the embodiment of FIG. 16, but with some detail elements not shown so as not to confuse the view of the overall embodiment. It can be seen that there are four separate rotatable structures 55 carrying airfoil or wind foil means 3A; while four rotatable pulleys 37 that are concentric with these rotatable structures, serve as the corner points of a quadrilateral circuit around which the substantially closed-loop cable 17C is looped and runs in circuits, carried by the buoyant hydrofoil or buoyant water foil means 3WB grouped in floating modules 4BFM. In variant embodiments different numbers and arrangements of rotatable structures could be used, such as for example the arrangements shown earlier in FIGS. 2C through 2F.

FIGS. 16 and 17 together illustrate a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement, including connecting members 19 that connect adjacently-located fluid-foil means in said sequential arrangement; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

FIGS. 16 and 17 also together illustrate a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B comprising at least one of a float, an inflated float, a pontoon, a hull, a catamaran hull, a trimaran hull, multiple connected hulls, plural hydroskis with finite thickness and plural hydrofoils 3WF with finite thickness, for utilizing a buoyancy force from water displacement to at least partially contribute to supporting said plural fluid-foil means 3 above an underwater ground surface 89U;

connecting means 17 for connecting said plural fluid-foil means in a sequential arrangement, including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

FIGS. 16 and 17 also together illustrate a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement around a circuit 21 of closed periphery topology enclosing an axis of revolution 21A, wherein said axis of revolution is disposed within 60 degrees of vertical; said connecting means 17 including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means 3 as they revolve around closed circuit paths substantially corresponding to said circuit 21, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

The position-keeping means 23 may optionally include at least one of tether tensioning means and tether length control means such as power reels.

Figure 18:
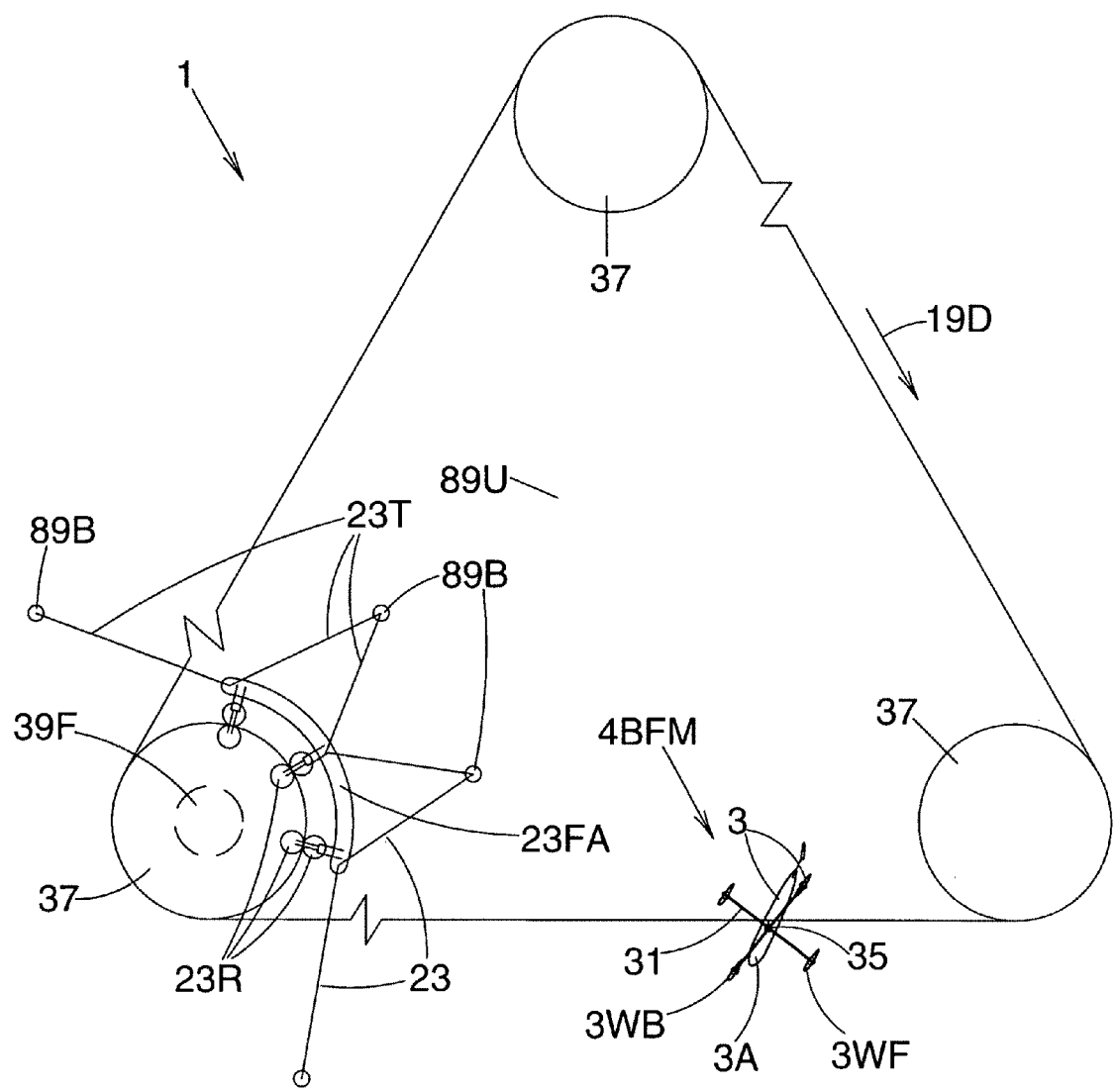
FIG. 18 shows a plan view of an anchored corner float for anchoring connected fluid-foil means.

FIG. 18 shows a partial plan view of an anchored corner float or position-keeping floating assembly 23FA to implement a position-keeping function for fluid-foil means connected by a substantially closed-loop cable 17C. The illustrated embodiment has three pulleys 37 around which the closed-loop cable 17C is looped. Alternate embodiments may have other numbers of pulleys, as described earlier. For clarity, only one of many floating modules 4BFM is shown, which is connected to the closed-loop cable 17C. Each floating module 4BFM includes fluid-foil means 3 including airfoil or wind foil means 3A above fluid-foil base members 35, which then connect via connecting structure 31 to plural (here four) hydrofoil or water foil means 3WF, which are here buoyant hydrofoil or water foil means 3WB.

FIG. 18 shows a fluid-dynamic renewable energy harvesting system 1, wherein said position-keeping means 23 includes at least one of a tether or cable 23T and an anchor 89B fastened to the underwater ground surface 89U.

Here plural tethers or cables 23T anchor in position a position-keeping floating assembly 23FA, which in turn holds in position a rotatable pulley 37 via plural position-keeping rollers 23R, as illustrated. The rotatable pulley 37 rotates around a pulley support float 39F, and is thin enough in height to allow the hydrofoil or water foil means 3WF to pass below it, and to allow the airfoil or wind foil means 3A to pass above it. While the details of the position-keeping system is shown for one rotatable pulley 37, clearly similar systems can be used for the other rotatable pulleys in the fluid-dynamic renewable energy harvesting system 1.

While this position-keeping system engages the perimeter region of the rotatable pulley 37, in variant embodiments position-keeping mechanisms could engage the hub of the pulley instead of or in addition to the rotatable part or perimeter.

Figure 19A:
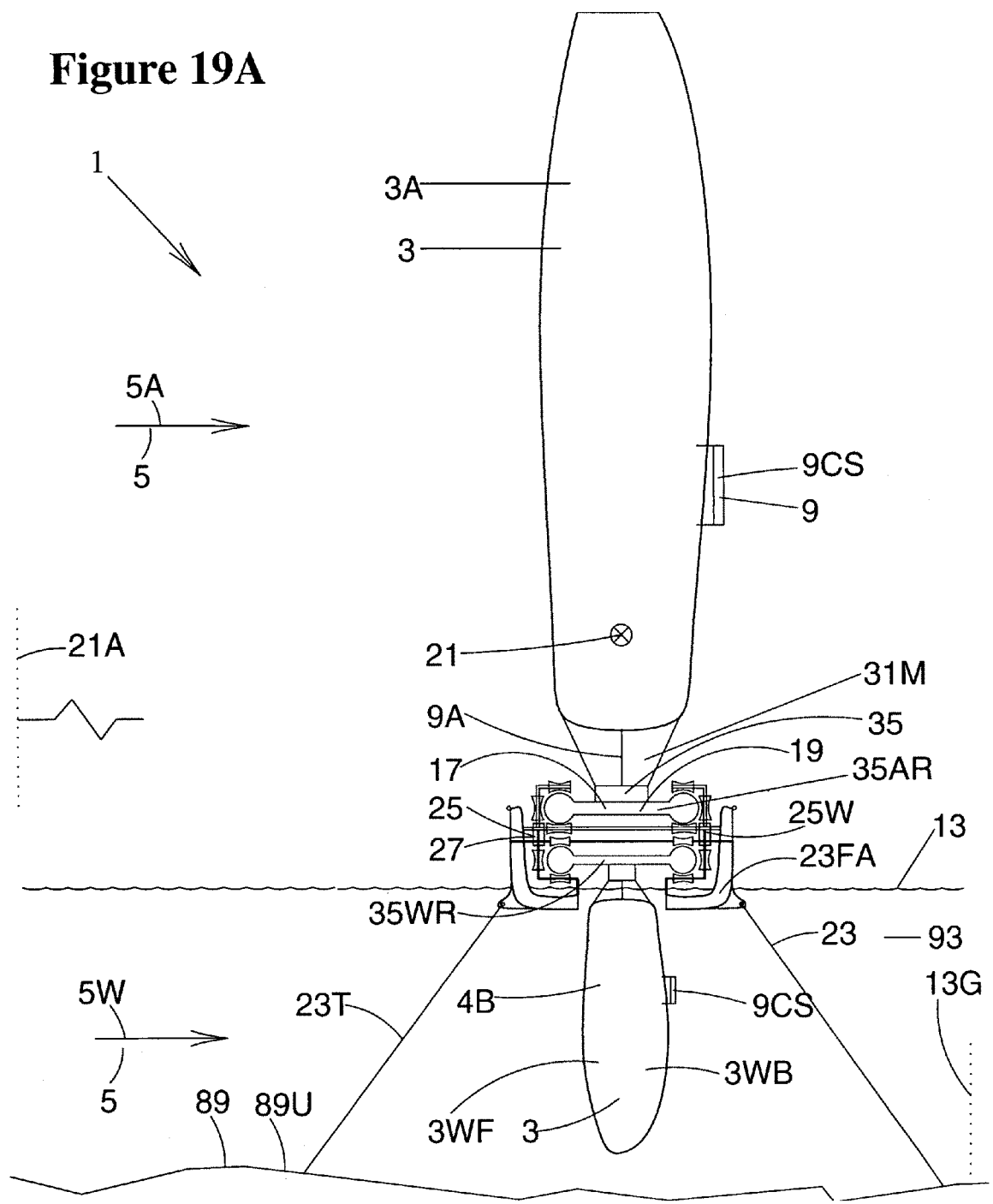
FIG. 19A shows a side sectional view of a method for using bearings at an interface between airfoils or wind foil means on the one hand, and hydrofoils or water foil means on the other hand, to permit these two sets of fluid-foils to rotate at different and separately optimizable RPMs.

FIG. 19A shows a partial side sectional view of an embodiment of a fluid-dynamic renewable energy harvesting system 1 of a class related to that shown earlier in FIG. 13, but with airfoil or wind foil means 3A and hydrofoil or water foil means 3WF now not laterally offset, and now capable of rotating around an axis 21A (shown by extension to the left of the left edge of the page in this view) at different and separately optimizable RPMs. The hydrofoil means are buoyant hydrofoils or water foil means 3WB, which connect to and support a water foil assembly support ring 35WR. The airfoil or wind foil means are similarly connected to and above an airfoil assembly support ring 35AR to which they are connected via fluid-foil base members 35. At spaced azimuthal angles around axis 21A, position-keeping floating assemblies 23FA connect to and hold in position the water foil assembly support ring 35WR and the airfoil assembly support ring 35AR through contact rollers or bearings, as illustrated. The rollers or bearings may employ solid structures, truss structures, plate structures, and pneumatic contact elements as may be beneficial. The connections and bearings will preferably be designed to perform position-keeping and load transfer and energy extraction functions, while still allowing some desired measure of flexure as the airfoils and hydrofoils encounter variable loads of all kinds. The floating assemblies 23FA also incorporate energy harvesting means 25 for capturing the kinetic energy of the rotation of the water foil assembly support ring 35WR driven by water current energy driving the water foil means 3WF, as well as the kinetic energy of the rotation of the airfoil assembly support ring 35AR driven by wind energy driving the airfoil means 3A.

Note that the control surfaces 9CS on the airfoil means 3A and the hydrofoil means 3WF can be independently controlled, and so this version of the fluid-dynamic renewable energy harvesting system 1 can optimally capture both wind and water energy, even if wind and water current are in different directions and have different flow speeds.

In addition to the illustrated rollers or bearings at the azimuthal locations of the floating assemblies 23FA as illustrated, additional bearing means such as roller or ball or fluid bearings may be provided at other azimuthal locations, for carrying some amount of vertical load down from the airfoil assembly support ring 35AR to the water foil assembly support ring 35WR.

The embodiment of FIG. 19A thus illustrates a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement, including connecting members 19 that connect adjacently-located fluid-foil means in said sequential arrangement; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

The embodiment of FIG. 19A further illustrates a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B comprising at least one of a float, an inflated float, a pontoon, a hull, a catamaran hull, a trimaran hull, multiple connected hulls, plural hydroskis with finite thickness and plural hydrofoils 3WF with finite thickness, for utilizing a buoyancy force from water displacement to at least partially contribute to supporting said plural fluid-foil means 3 above an underwater ground surface 89U;

connecting means 17 for connecting said plural fluid-foil means in a sequential arrangement, including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

The embodiment of FIG. 19A further illustrates a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement around a circuit 21 of closed periphery topology enclosing an axis of revolution 21A, wherein said axis of revolution is disposed within 60 degrees of vertical; said connecting means 17 including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means 3 as they revolve around closed circuit paths substantially corresponding to said circuit 21, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

Note that for the embodiment of FIG. 19A, the position-keeping means 23 synergistically serves as means for maintaining both airfoil or wind foil means 3A and hydrofoil means or water foil means 3WF, within the desired geographic envelope 13G.

The embodiment of FIG. 19A further illustrates a fluid-dynamic renewable energy harvesting system 1, wherein said fluid-foil means 3 for interfacing with a fluid current comprise buoyant hydrofoils for interfacing with a water current; wherein said buoyant hydrofoils 3WB contribute to said buoyancy force; wherein said proximate flow fields of said fluid current 5 when said fluid current exists comprise proximate flow fields of a water current 5W when said water current exists; wherein said fluid-dynamic renewable energy in the form of fluid-dynamic kinetic energy comprises water current renewable energy in the form of water current kinetic energy; wherein said time-variable fluid-dynamic forces comprise time-variable hydrodynamic forces;

and further comprising movable members 31M at least partially supported by said buoyancy force, which movable members 31M include airfoil means 3A for interfacing with an air current; and wherein said energy harvesting means 25 further comprises wind energy harvesting means 25A that includes an airfoil control system capable of controlling time-variable airfoil orientations of said airfoil means 3A relative to proximate flow fields of said air current 5A when said air current exists and carries aerodynamic renewable energy in the form of wind kinetic energy, for converting a portion of said wind kinetic energy into net work on said airfoil means over the course of a cycle of airfoil periodic motion of said airfoil means, by utilizing time-variable aerodynamic forces acting on said airfoil means 3A at said time-variable airfoil orientations to further contribute to driving said airfoil periodic motion.

Figure 19B:
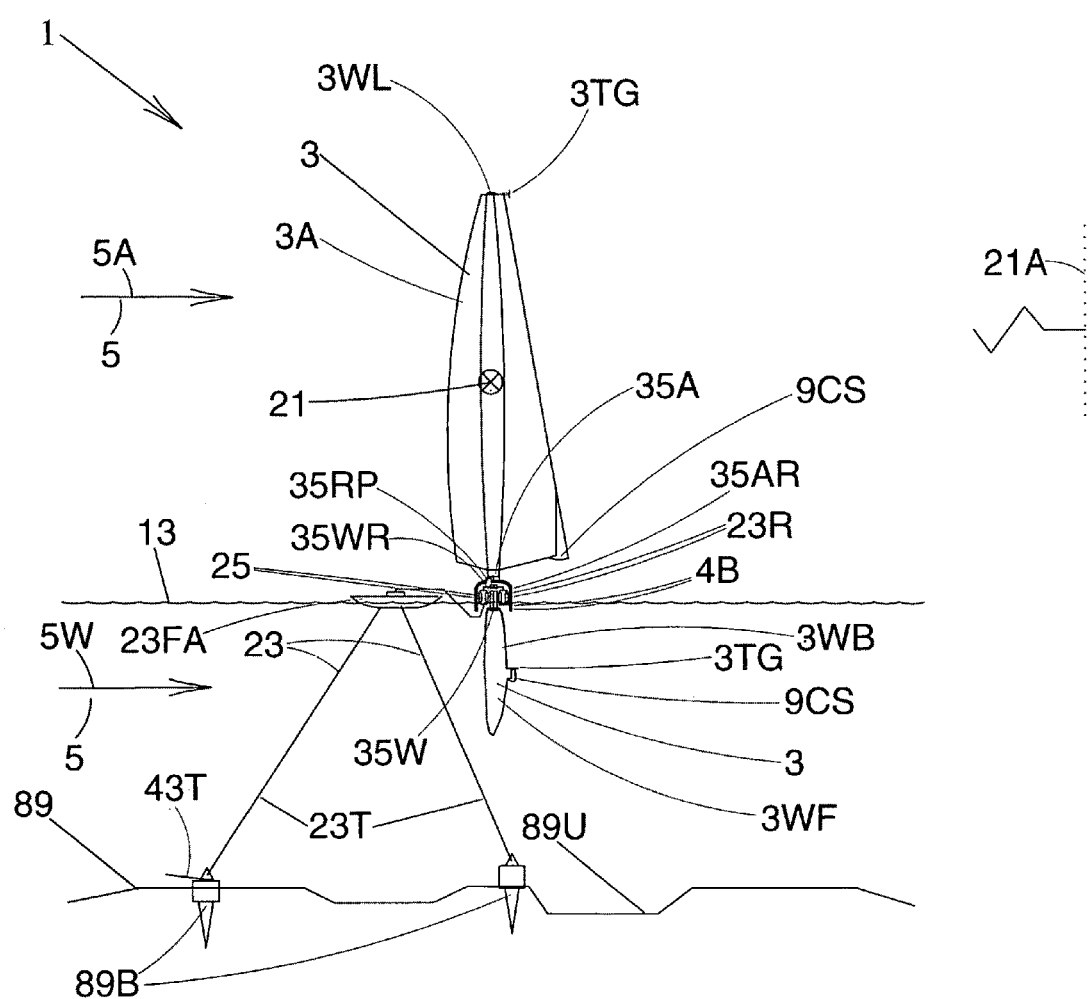
FIG. 19B shows a partial front sectional view of a hybrid embodiment with separate rings connecting airfoils or wind foil means on the one hand, and hydrofoils or water foil means on the other hand.

FIG. 19B shows a partial front sectional view of another hybrid embodiment of a fluid-dynamic renewable energy harvesting system 1 in the class of the embodiment of FIG. 19A, with separate rings connecting airfoils or wind foil means 3A on the one hand, and hydrofoils or water foil means 3WF on the other hand.

The fluid-foil means 3 that are airfoils or wind foil means 3A, are fitted with control surfaces 9CS, a warning light 3WL at their upper extremity, and a small turbine generator 3TG to provide local power to the airfoil, such as to power the actuators controlling the control surface 9CS. The airfoils or wind foil means 3A are connected through airfoil base members 35A to an airfoil assembly support ring 35AR which now has a cross-section somewhat resembling an inverted U shape. The legs of the inverted U penetrate below the water surface 13, and having nonzero thickness these legs serve as buoyant support means 4B that provide hydrostatic buoyancy support to the airfoil assembly support ring 35AR and to the airfoils or wind foil means 3A. The bottom edges of the legs of the inverted U of the airfoil assembly support ring 35AR may optionally be serrated in a sloped hydroski alternating with a step, such that when the airfoil assembly support ring 35AR is driven to high rotational speeds by aerodynamic forces acting on the airfoils or wind foil means 3A in high wind conditions, the sloped hydroski surfaces provide hydrodynamic lift to the airfoil assembly support ring 35AR in addition to the hydrostatic lift, raising the airfoil assembly support ring 35AR relative to the water surface 13 and hence reducing water drag as it rotates. This feature is analogous to a speedboat reducing water drag at high speeds as it climbs higher on a planing surface, with hydrodynamic lift replacing a significant portion of the hydrostatic lift of the speedboat's hull. The airfoil assembly support ring 35AR may also optionally be fitted with ring pressurization means 35RP, such as at least one of air scoops and air fans and air compressors, that pressurize the air volume under the inverted U cross-section of the airfoil assembly support ring 35R, to provide pressure differential lift force (similar to the case for a ram air cushion vehicle or a hovercraft) in addition to the hydrostatic lift, raising the airfoil assembly support ring 35AR relative to the water surface 13 and hence reducing water drag as it rotates.

The fluid-foil means 3 that are hydrofoils or water foil means 3WF are fitted with control surfaces 9CS and a small turbine generator 3TG to provide local power to the water foil, such as to power the actuators controlling the control surface 9CS that are fitted to the water foil means. The hydrofoils or water foil means 3WF are connected through water foil top support members 35W to a water foil assembly support ring 35WR which is illustrated with a substantially rectangular cross-section here but may have alternate cross-sectional shapes and sizes in variant embodiments. The entire assembly is hydrostatically buoyant, with buoyancy provided by buoyant support means 4B comprising at least one of a buoyant water foil assembly support ring 35WR and the optional use of buoyant hydrofoils or water foil means 3WB for the hydrofoils or water foil means 3WF. Position-keeping rollers 23R connected to energy harvesting means 25 (such as electrical generator means) are located between the buoyant water foil assembly support ring 35WR on one hand, and the inverted U shaped cross-section airfoil assembly support ring 35AR on the other hand, as illustrated. The position-keeping rollers 23R are structurally connected to a position-keeping floating assembly 23FA, as illustrated. The connections and bearings will preferably be designed to perform position-keeping and load transfer and energy extraction functions, while still allowing some desired measure of flexure as the airfoils and hydrofoils encounter variable loads of all kinds. The position-keeping floating assembly 23FA is connected to a ground surface 89 (that is an underwater ground surface 89U located below a layer of liquid water 93), by position-keeping means 23 comprising position-keeping tethers or cables 23T.

In addition to the illustrated rollers or bearings at the azimuthal locations of the upwind and/or upcurrent floating assembly 23FA as illustrated, additional bearing means such as roller or ball or fluid bearings may be provided at other azimuthal locations, for maintaining appropriate spacing between the water foil assembly support ring 35WR and the inverted U shaped cross-section airfoil assembly support ring 35AR.

In the embodiment of FIG. 19B a fluid-dynamic renewable energy harvesting system 1 is shown, with airfoil or wind foil means 3A and hydrofoil or water foil means 3WF not laterally offset, and capable of rotating around an axis 21A (shown by extension to the right of the right edge of the page in this view) at different and separately optimizable RPMs. Note that the control surfaces 9CS on the airfoil means 3A and the hydrofoil means 3WF can be independently controlled, and so this version of the fluid-dynamic renewable energy harvesting system 1 can optimally capture both wind and water energy, even if wind and water current are in different directions and have different flow speeds. The energy harvesting means 25 provides means for capturing the kinetic energy of the rotation of the water foil assembly support ring 35WR driven by water current energy driving the water foil means 3WF, as well as the kinetic energy of the rotation of the airfoil assembly support ring 35AR driven by wind energy driving the airfoil means 3A. Energy can be transmitted to users via the illustrated underwater electrical cable preferably doubly insulated, that serves as means for transmitting energy 43T.

Figure 20A:
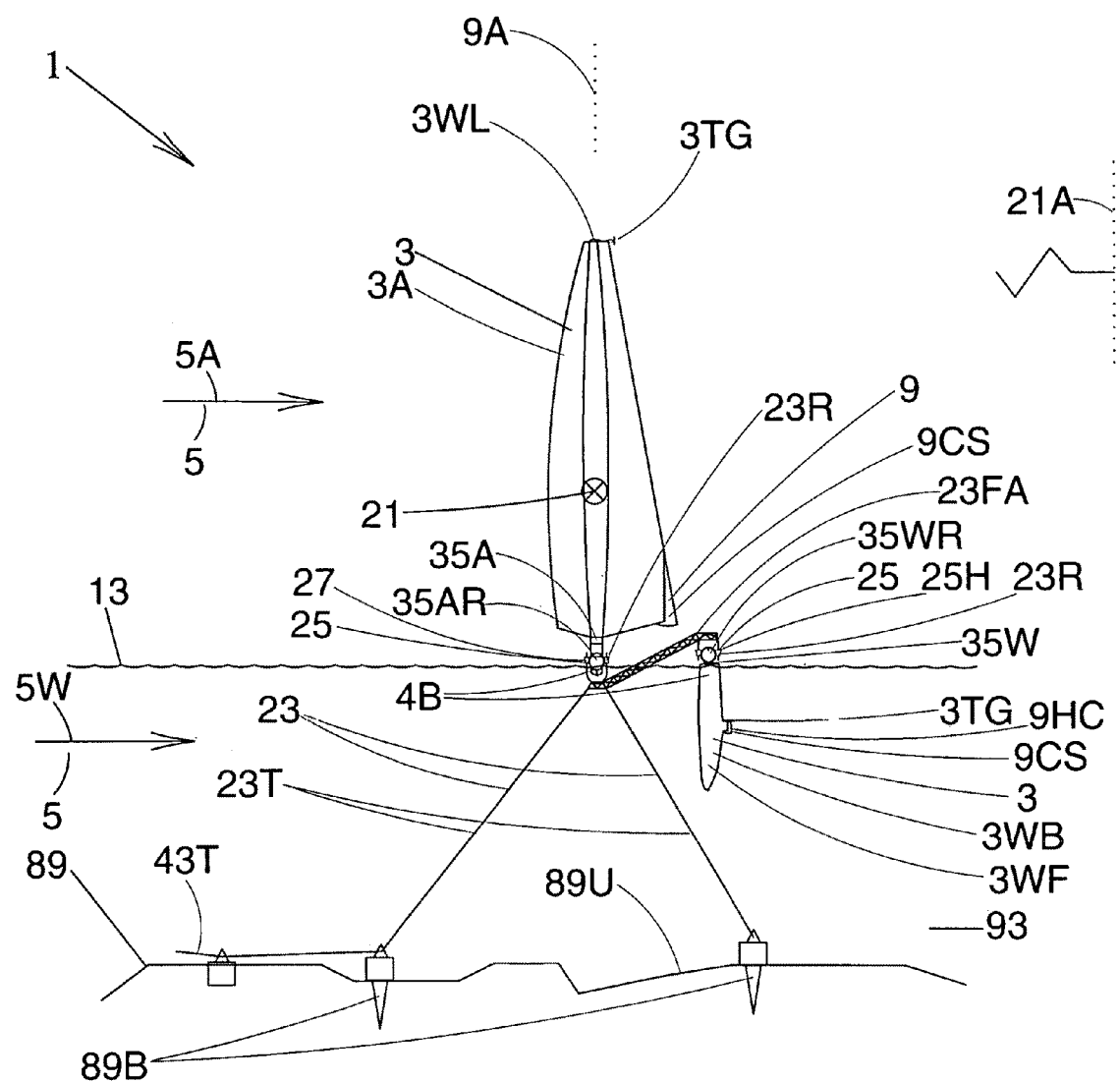
FIG. 20A shows a partial front sectional view of a variant hybrid embodiment with separate rings connecting airfoils or wind foil means on the one hand, and hydrofoils or water foil means on the other hand.

FIG. 20A shows a partial front sectional view of another hybrid embodiment of a fluid-dynamic renewable energy harvesting system 1 in the vicinity of a water surface 13, in the class of the embodiment of FIG. 19B and with separate rings connecting airfoils or wind foil means 3A on the one hand, and hydrofoils or water foil means 3WF on the other hand; but with the airfoils or wind foil means 3A and hydrofoils or water foil means 3WF no longer substantially vertically aligned.

FIG. 20A shows a fluid-dynamic renewable energy harvesting system 1, with both airfoil means 3A and water foil 3WF members, supported respectively by an airfoil base member 35A and a water foil top support member 35W. Plural airfoil base members 35A are connected to an airfoil assembly support ring 35AR, a cross-sectional cut of which is illustrated with a substantially elliptical cross-section here but may have alternate cross-sectional shapes and sizes in variant embodiments. Similarly, plural water foil top support members 35W are connected to a water foil assembly support ring 35WR. The airfoil assembly support ring 35AR and the water foil assembly support ring 35WR are both held within an envelope of allowable locations, by position-keeping floating assembly 23FA. The position-keeping floating assembly 23FA utilizes a substantially rigid truss type structure in the illustrated embodiment, but may alternatively use other structural members such as tubular elements and/or plate elements and/or beam elements. Elements of the position-keeping floating assembly 23FA will be buoyant and provide hydrostatic lift the keep it floating. The position-keeping floating assembly 23FA is tethered to a ground surface 89 that is an underwater ground surface 89U, by position-keeping means 23 here comprising position-keeping tethers 23T.

The fluid-foil means 3 that are airfoils or wind foil means 3A, are fitted with control surfaces 9CS, a warning light 3WL at their upper extremity, and a small turbine generator 3TG to provide local power to the airfoil, such as to power the actuators controlling the control surface 9CS. The bottom of the airfoil assembly support ring 35AR is fitted with a V-shaped planing surface as illustrated (optionally serrated with sloping and step surface contours into the page), such that when the airfoil assembly support ring 35AR is driven to high rotational speeds by aerodynamic forces acting on the airfoils or wind foil means 3A in high wind conditions, the sloped V-shaped planing surfaces provide hydrodynamic lift to the airfoil assembly support ring 35AR in addition to the hydrostatic lift, raising the airfoil assembly support ring 35AR relative to the water surface 13 and hence reducing water drag as it rotates. This feature is analogous to a speedboat reducing water drag at high speeds as it climbs higher on a V-shaped planing surface, with hydrodynamic lift replacing a significant portion of the hydrostatic lift of the speedboat's hull. The planing surfaces may be of rigid or semi-rigid or pneumatic (e.g., inflated) construction in variant embodiments.

The fluid-foil means 3 that are hydrofoils or water foil means 3WF are fitted with control surfaces 9CS and a small turbine generator 3TG to provide local power to the water foil, such as to power the actuators controlling the control surface 9CS that are fitted to the water foil means. The hydrofoils or water foil means 3WF are connected through water foil top support members 35W to a water foil assembly support ring 35WR which is illustrated with a substantially elliptical or circular cross-section here but may have alternate cross-sectional shapes and sizes in variant embodiments. The entire assembly is hydrostatically buoyant, with buoyancy provided by buoyant support means 4B that may comprise use of buoyant hydrofoils or water foil means 3WB for the hydrofoils or water foil means 3WF. Position-keeping rollers 23R connected to energy harvesting means 25 (such as electrical generator means) are located adjacent to both the buoyant water foil assembly support ring 35WR on one hand, and the airfoil assembly support ring 35AR on the other hand, as illustrated. The position-keeping rollers 23R are structurally connected to the position-keeping floating assembly 23FA, as illustrated. The connections and bearings will preferably be designed to perform position-keeping and load transfer and energy extraction functions, while still allowing some desired measure of flexure as the airfoils and hydrofoils encounter variable loads of all kinds.

In the embodiment of FIG. 20A a fluid-dynamic renewable energy harvesting system 1 is shown, with airfoil or wind foil means 3A and hydrofoil or water foil means 3WF that are laterally offset, and capable of rotating around an axis 21A (shown by extension to the right of the right edge of the page in this view) at different and separately optimizable angular velocities or RPMs. Note that the control surfaces 9CS on the airfoil means 3A and the hydrofoil means 3WF can be independently controlled, and so this version of the fluid-dynamic renewable energy harvesting system 1 can optimally capture both wind and water energy, even if wind and water current are in different directions and have different flow speeds. The energy harvesting means 25 provides means for capturing the kinetic energy of the rotation of the water foil assembly support ring 35WR driven by water current energy driving the water foil means 3WF, as well as the kinetic energy of the rotation of the airfoil assembly support ring 35AR driven by wind energy driving the airfoil means 3A. Energy can be transmitted to users via the illustrated underwater electrical cable preferably double or multiple layer or sheath insulated, that serves as means for transmitting energy 43T.

Figure 20B:
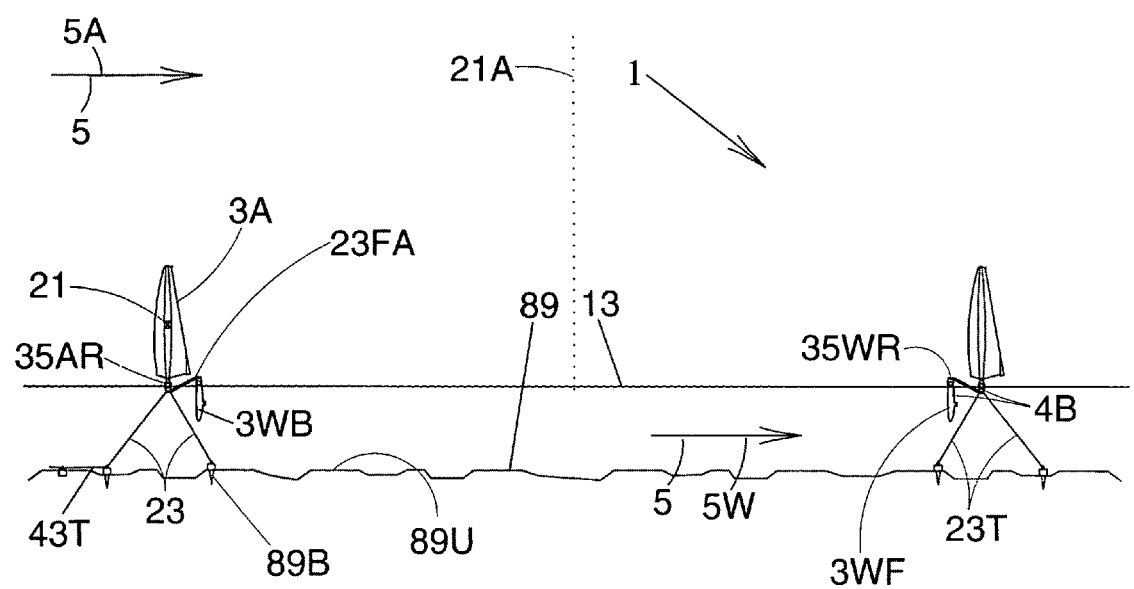
FIG. 20B shows a full front sectional view of the embodiment of FIG. 20A.

FIG. 20B shows a full front sectional view of the embodiment of FIG. 20A. It can be seen that airfoil or wind foil means 3A are attached to the airfoil assembly support ring 35AR both upwind and downwind a considerable distance from the rotation axis 21A, and rotate in the direction 21. Similarly it can be seen that the hydrofoil or water foil means 3WF that use buoyant hydrofoils or water foil means 3WB, are similarly attached to the water foil assembly support ring 35WR both upstream and downstream a considerable distance from the rotation axis 21A. In alternate embodiments varying distances from the axis of rotation can clearly be used.

Figure 21:
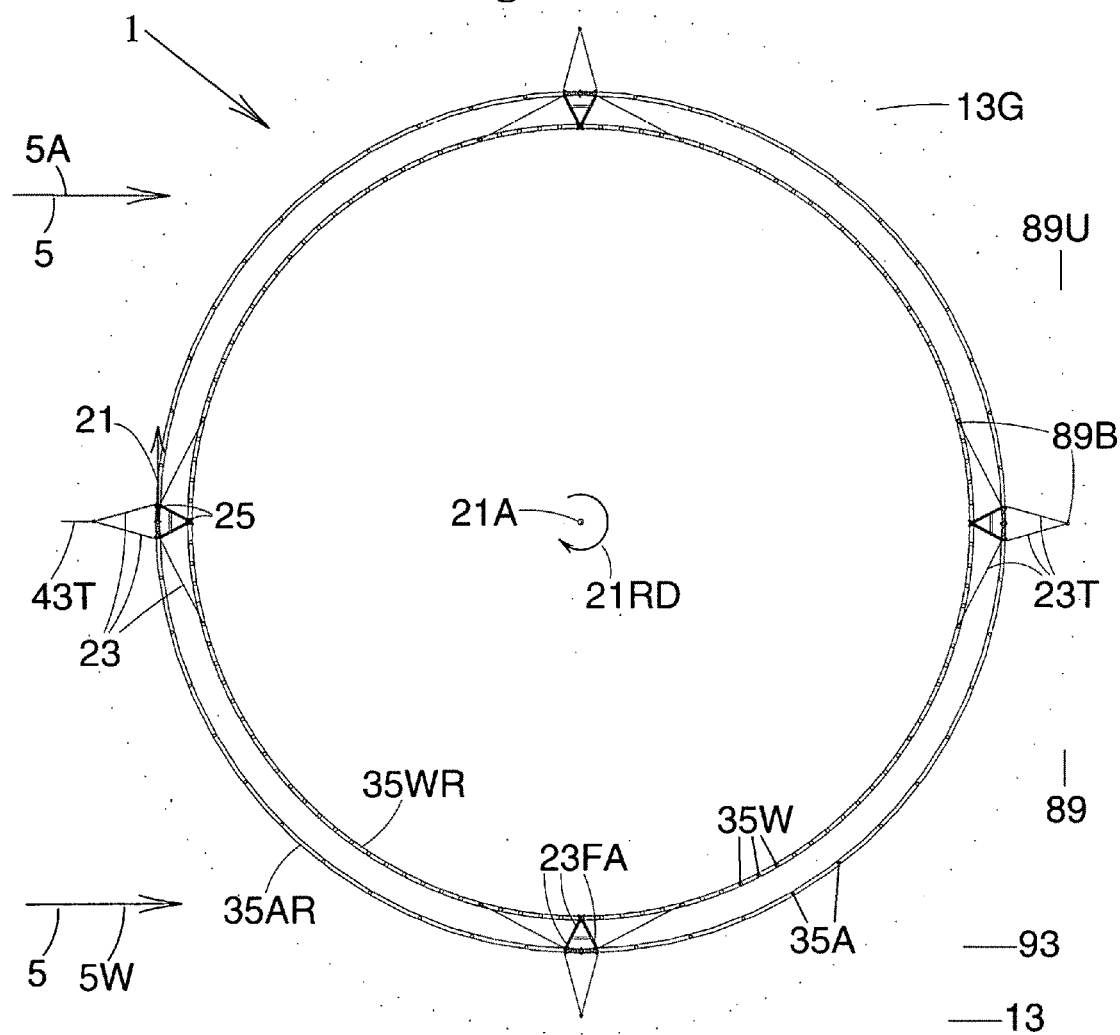
FIG. 21 shows a plan view of the embodiment of FIGS. 20A and 20B.

FIG. 21 shows a partial plan view of the embodiment of FIGS. 20A and 20B, to better illustrate the relationships between the airfoil assembly support ring 35AR, the water foil assembly support ring 35WR, and the position-keeping floating assemblies 23FA. For clarity of illustration, the airfoils or wind foil means 3A and the hydrofoils or water foil means 3WF are not shown in this Figure. However, the 48 airfoil base members 35A and 120 water foil top support members 35W are shown in the Figure, to indicate positions where the airfoils or wind foil means 3A and the hydrofoils or water foil means 3WF are located in this representative embodiment. This representative embodiment could be implemented on a very wide variety of scales over many orders of magnitude, with one representative scale being support ring diameters on the order of 3 kilometers, for example only. Note that different diameters of the airfoil assembly support ring 35AR and the water foil assembly support ring 35WR are possible in different variant embodiments, as are different spacings between adjacent the airfoils or wind foil means 3A and adjacent hydrofoils or water foil means 3WF.

Each position-keeping floating assembly 23FA is shown connected to position-keeping means 23 comprising position-keeping tethers or cables 23T going down to anchors 89B in a ground surface 89 that is an underwater ground surface 89U below the water surface 13. One of the position-keeping floating assemblies is shown fitted with energy harvesting means 25 (such as electric generator means), and electricity can be carried away by means for transmitting energy 43T. In variant embodiments energy harvesting means may be implemented on any number or all of the position-keeping floating assemblies 23FA. Four position-keeping floating assemblies 23FA are illustrated in FIG. 21, but in alternate embodiments any number of position-keeping floating assemblies 23FA could be used.

As illustrated in FIG. 21, the airfoil assembly support ring 35AR and the water foil assembly support ring 35WR rotate around axis 21A in the rotation direction 21RD (clockwise in this plan view). In one preferred variant embodiment, the airfoil assembly support ring 35AR and the water foil assembly support ring 35WR can rotate in opposite directions around the axis 21A, to reduce lateral loads at the position-keeping floating assemblies 23FA and to develop opposing sense induced air and water vorticity in the downstream flow fields of air and water respectively.

Figure 22:
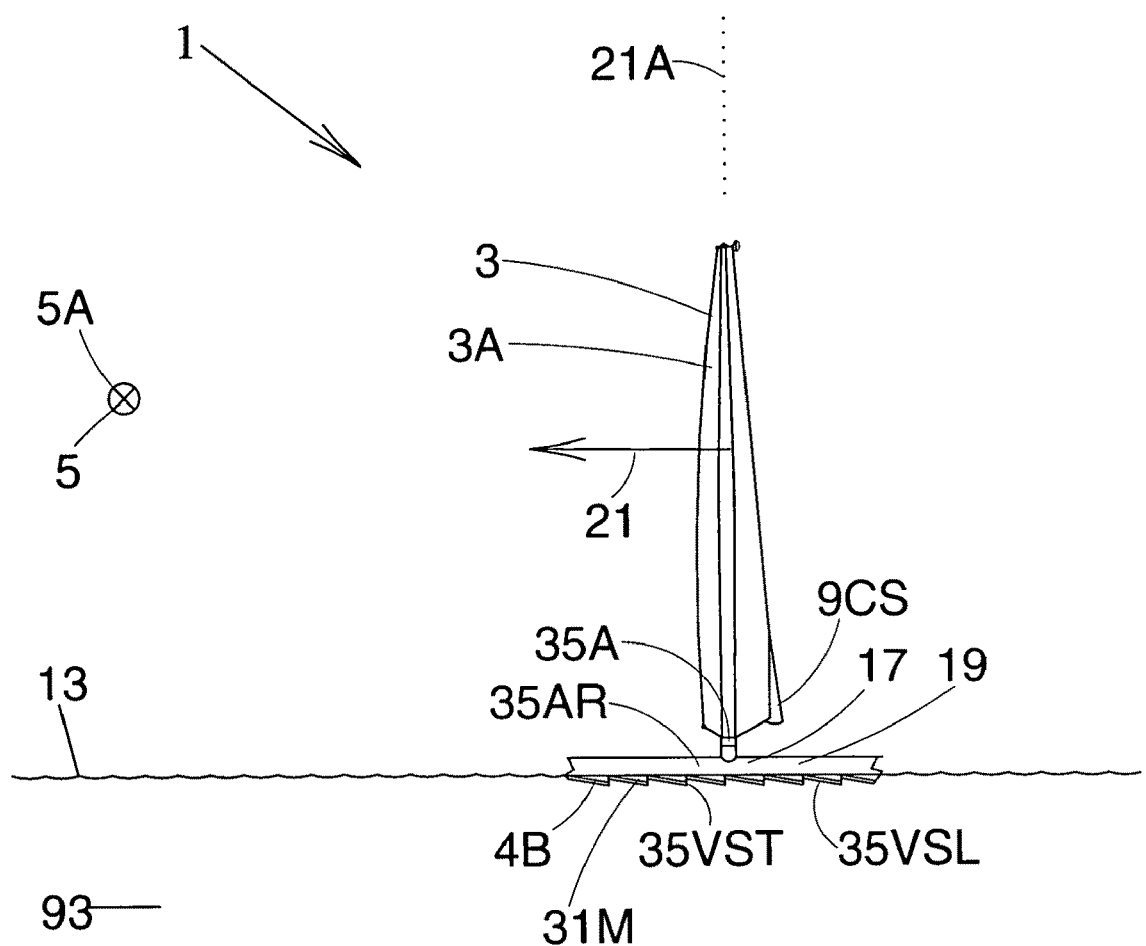
FIG. 22 shows a partial side sectional view of the embodiment of FIGS. 20A and 20B.

FIG. 22 shows a partial side sectional view of the embodiment of FIGS. 20A and 20B and 21, most closely corresponding to a side view from the left side of the page of the partial view of FIG. 20A and viewing specifically the airfoil or wind foil means 3A along with the airfoil assembly support ring 35AR, to illustrate specific features thereof. The bottom of the airfoil assembly support ring 35AR is fitted with a V-shaped planing surface as illustrated, with a serrated bottom surface with both V-shaped planing surface sloping surfaces 35VSL and V-shaped planing surface steps 35VST, such that when the airfoil assembly support ring 35AR is driven to high rotational speeds by aerodynamic forces acting on the airfoils or wind foil means 3A driving them on path 21 in high wind conditions, the sloping surfaces 35VSL provide hydrodynamic lift to the airfoil assembly support ring 35AR in addition to the hydrostatic lift, raising the airfoil assembly support ring 35AR relative to the water surface 13 and hence reducing water drag as it rotates. This feature is analogous to a speedboat reducing water drag at high speeds as it climbs higher on a V-shaped planing surface, with hydrodynamic lift replacing a significant portion of the hydrostatic lift of the speedboat's hull.

FIG. 22 also illustrates a fluid-dynamic renewable energy harvesting system 1, wherein the buoyant support means 4B includes movable members 31M, with underwater portions of the movable members 31M displacing a volume of liquid water 93 beneath a water surface 13 to generate a corresponding hydrostatic buoyant support force, and with water engaging surfaces of the movable members 31M capable of translational sliding motion relative to liquid water 93 beneath the water surface 13.

FIGS. 20A, 20B, 21 and 22 together illustrate a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement, including connecting members 19 that connect adjacently-located fluid-foil means in said sequential arrangement; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

FIGS. 20A, 20B, 21 and 22 together also illustrate a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B comprising at least one of a float, an inflated float, a pontoon, a hull, a catamaran hull, a trimaran hull, multiple connected hulls, plural hydroskis with finite thickness and plural hydrofoils with finite thickness, for utilizing a buoyancy force from water displacement to at least partially contribute to supporting said plural fluid-foil means 3 above an underwater ground surface 89U;

connecting means 17 for connecting said plural fluid-foil means in a sequential arrangement, including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

FIGS. 20A, 20B, 21 and 22 together also illustrate a fluid-dynamic renewable energy harvesting system 1, wherein liquid water 93 being displaced by said water displacement, comprises water of at least one of an ocean, a sea, an inlet, a bay, a gulf, a sound, a strait, a channel, a passage, an arm, a reach, a harbor, a port, an estuary, a lake, a reservoir, a pond, a pool, a river, a stream, a brook, a creek, a canal, a bog, a swamp, a slough, and a marsh.

FIGS. 20A, 20B, 21 and 22 together also illustrate a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement around a circuit 21 of closed periphery topology enclosing an axis of revolution 21A, wherein said axis of revolution is disposed within 60 degrees of vertical; said connecting means 17 including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means 3 as they revolve around closed circuit paths substantially corresponding to said circuit 21, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

Note that each fluid foil path may vary somewhat from its designated circuit path, being offset by particular foil location and/or attachment movement and/or fluid force induced path displacements.

FIGS. 20A, 20B, 21 and 22 together also illustrate a fluid-dynamic renewable energy harvesting system 1, wherein the fluid current 5 comprises an air current or wind 5, wherein said renewable energy as fluid-dynamic kinetic energy comprises air current or wind energy, and wherein said fluid-foil means 3 comprise airfoil means 3A.

FIGS. 20A, 20B, 21 and 22 together also illustrate a fluid-dynamic renewable energy harvesting system 1, wherein the fluid current 5 comprises a water current 5W beneath a water surface 13, wherein said renewable energy as fluid-dynamic kinetic energy comprises water current energy, and wherein said fluid-foil means 3 comprise hydrofoil or water foil means 3WF.

FIGS. 20A, 20B, 21 and 22 together also illustrate a fluid-dynamic renewable energy harvesting system 1, wherein the buoyant support means 4B includes said plural hydrofoil means 3WF of finite thickness; wherein said fluid-foil means 3 comprise said plural hydrofoil means 3WF with finite thickness and wherein said fluid current 5 when said fluid current exists comprises a water current 5W when said water current exists.

FIGS. 20A, 20B, 21 and 22 together also illustrate a fluid-dynamic renewable energy harvesting system 1, wherein the buoyant support means 4B includes said plural hydrofoil means 3WF of finite thickness; further comprising water current energy harvesting means 25H including hydrofoil control system means 9HC, for converting a portion of water current kinetic energy when a water current 5W exists and carries water current energy in the form of said water current kinetic energy, into net work on said plural hydrofoil means 3WF over the course of a cycle of substantially periodic hydrofoil motion of said plural hydrofoil means 3WF, by utilizing time-variable fluid-dynamic pressure distributions and resulting hydro-dynamic forces acting on said plural hydrofoil means 3WF at time-variable hydrofoil orientations to contribute to driving said substantially periodic hydrofoil motion when said water current 5W exists and carries said water current energy in the form of said water current kinetic energy.

Figure 23:
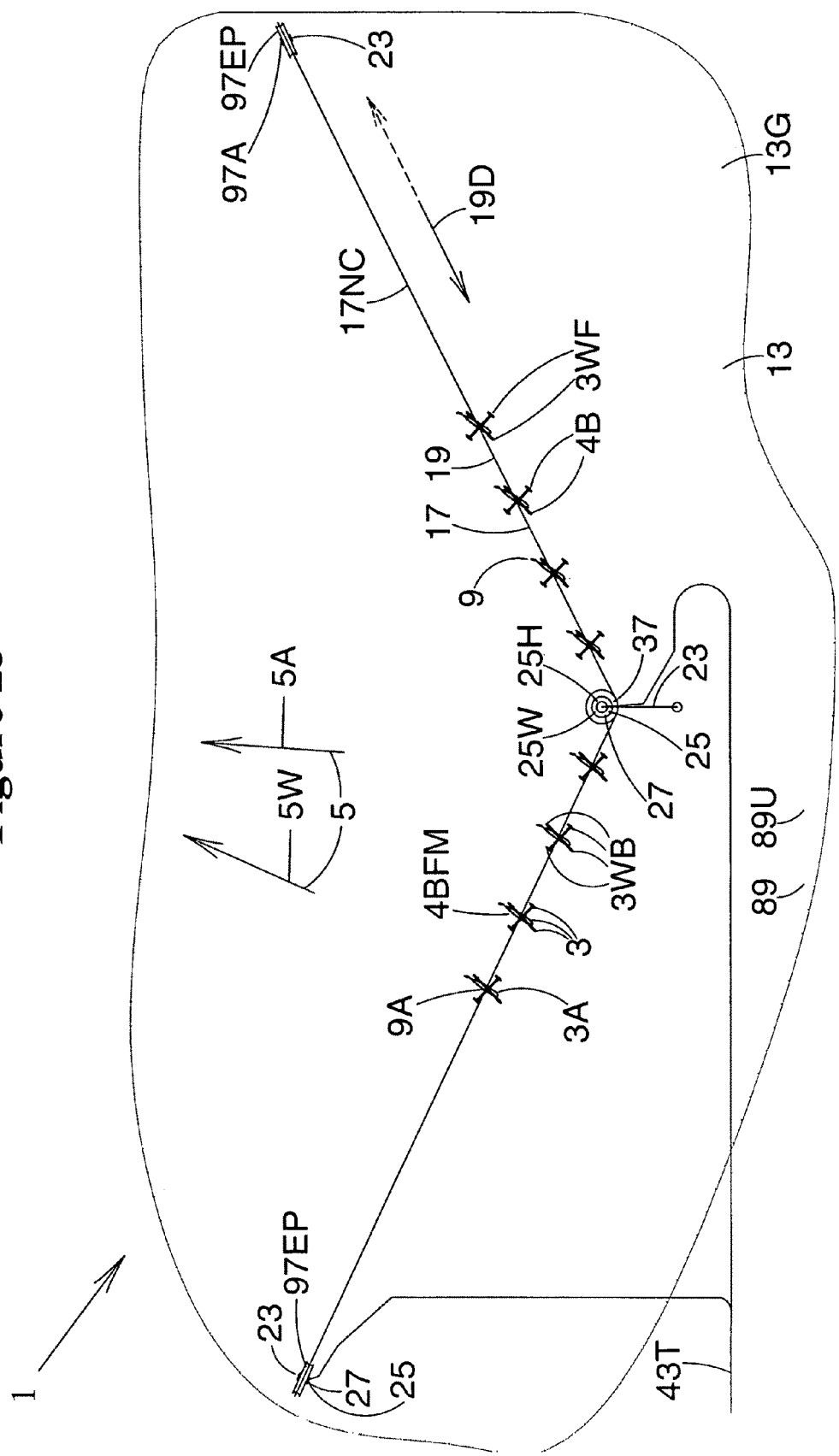
FIG. 23 shows a plan view of a periodically oscillating embodiment of a fluid-dynamic renewable energy harvesting system.

FIG. 23 shows a plan view of a periodically oscillating embodiment of a fluid-dynamic renewable energy harvesting system 1. This embodiment is related to the embodiment of FIG. 2B, but now features oscillating or reciprocating motion rather than cyclic rotational motion of the fluid-foil means. In this embodiment a plurality of floating modules 4BFM that are floating on a water surface 13, each include fluid-foil means 3 comprising both hydrofoil or water foil means 3WF penetrating below the water surface 13, and airfoil or wind foil means 3 projecting up into the air above the water surface 13. The plurality of floating modules 4BFM are connected by connecting means 17, including connecting members 19 that connect adjacently-located floating modules 4BFM in a sequential arrangement. The connecting means 17 here comprise a non-closed loop cable 17NC, the terminal ends of which are reeled around end pulleys 97EP that are connected to end anchor means 97A. The end pulleys 97EP may optionally be either under the water surface 13 such as at a location close to the end anchor means 97A located proximate an underwater ground surface 89U, or above or near the water surface 13 and supported by floats or buoyant support means. The non-closed loop cable 17NC may also optionally engage any number (zero to a large number) of rotatable pulleys 37 at locations intermediate between the two end pulleys 97EP, with engagement with a single such rotatable pulley 37 shown in this representative illustration. For the illustrated air current or wind 5A and illustrated water current 5W, the illustrated airfoil means 3A and water foil means 3WF are shown oriented such as to generate forces pulling the cable 17NC to the left in the illustrated view, with cable travel direction of motion 19D as indicated with the solid arrow pointing leftward. The dashed arrow pointing rightward is included to indicate that after the cable 17NC and the floating modules 4BFM move to a left end position, the airfoil means 3A and water foils 3WF will be reoriented to pull the cable in the rightward direction as indicated by the dashed arrow. Similarly, when the cable 17NC and the floating modules 4BFM move to a right end position, the airfoil means 3A and water foils 3WF will be once again be reoriented to pull the cable in the leftward direction as indicated by the solid arrow. On both the leftward and rightward strokes of the system, renewable energy comprising wind energy and/or water current energy can be harvested by energy harvesting means 25, that can be located at a location corresponding to at least one of an end pulley 97EP and a non-end pulley 37. While energy harvesting means 25 are shown at both an end pulley and non-end pulley in the illustration, it should be understood that in variant embodiments the energy harvesting means may be located in only one or the other of end pulley(s) and intermediate or non-end pulley(s). The energy harvesting means 25 include energy conversion means 27, and the energy harvesting means 25 can include at least one of wind energy harvesting means 25A and water energy harvesting means 25W. The energy harvesting means may include electrical generator elements, and harvested energy may be transmitted by means for transmitting energy 43T.

FIG. 23 here illustrates a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement, including connecting members 19 that connect adjacently-located fluid-foil means in said sequential arrangement; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

Furthermore, FIG. 23 here illustrates a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B comprising at least one of a float, an inflated float, a pontoon, a hull, a catamaran hull, a trimaran hull, multiple connected hulls, plural hydroskis with finite thickness and plural hydrofoils with finite thickness (here hydrofoil or water foil means 3WF that are buoyant hydrofoils or buoyant water foil means 3WB), for utilizing a buoyancy force from water displacement to at least partially contribute to supporting said plural fluid-foil means 3 above an underwater ground surface 89U;

connecting means 17 for connecting said plural fluid-foil means in a sequential arrangement, including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

FIG. 23 also illustrates a fluid-dynamic renewable energy harvesting system 1, wherein connecting members 19 comprise at least one of connecting cable elements and connecting rod elements. While connecting cable elements are shown, in variant embodiments connecting rod elements and/or chain elements and/or belt elements could be used for linearly and/or sequentially linked fluid-foils 3, with either oscillatory translational motion as shown in FIG. 23, or cyclic rotational motion as shown earlier in FIG. 2B, for example.

Figure 24A:
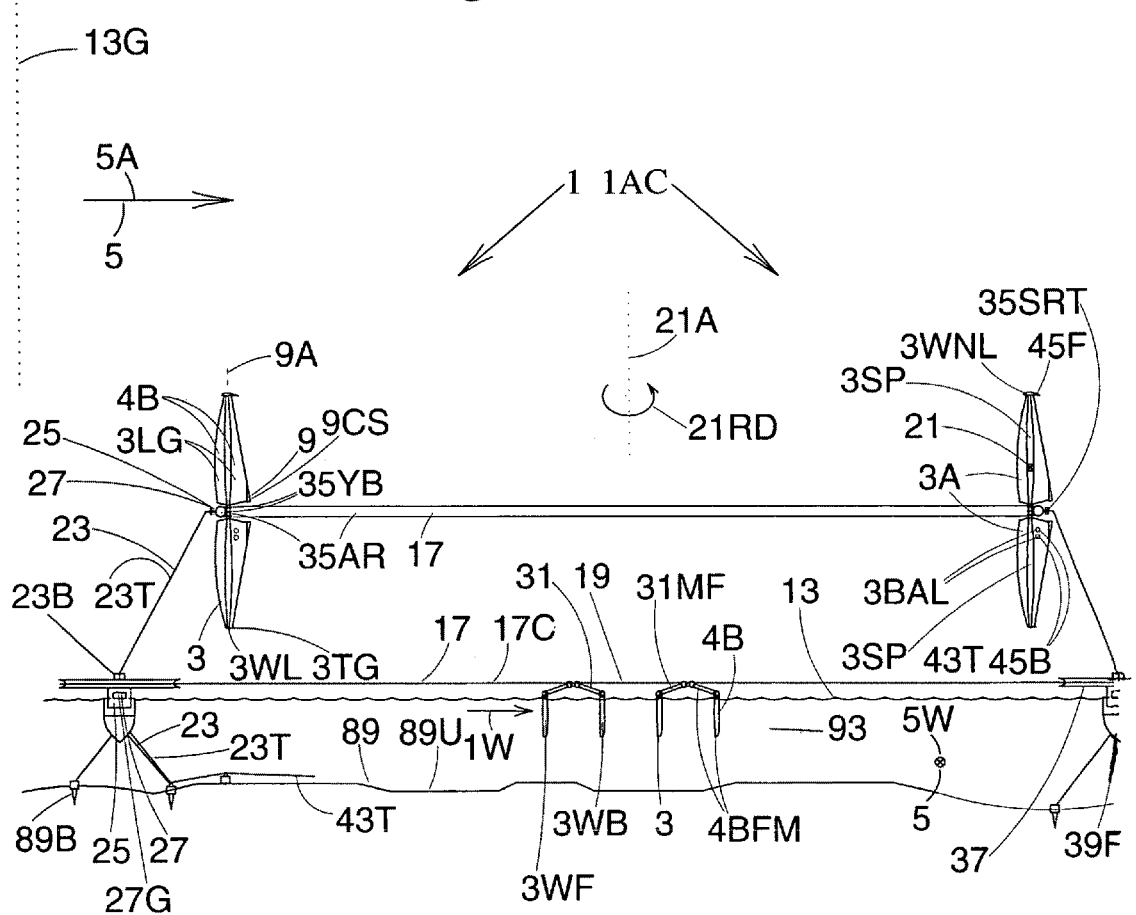
FIGS. 24A and 24B show front views of key elements of embodiments that include a fluid-dynamic renewable energy harvesting system or subsystem thereof, supported by aerostatic buoyancy forces in a manner analogous to aerostatically supported dirigibles, airships or balloons.
Figure 24B:
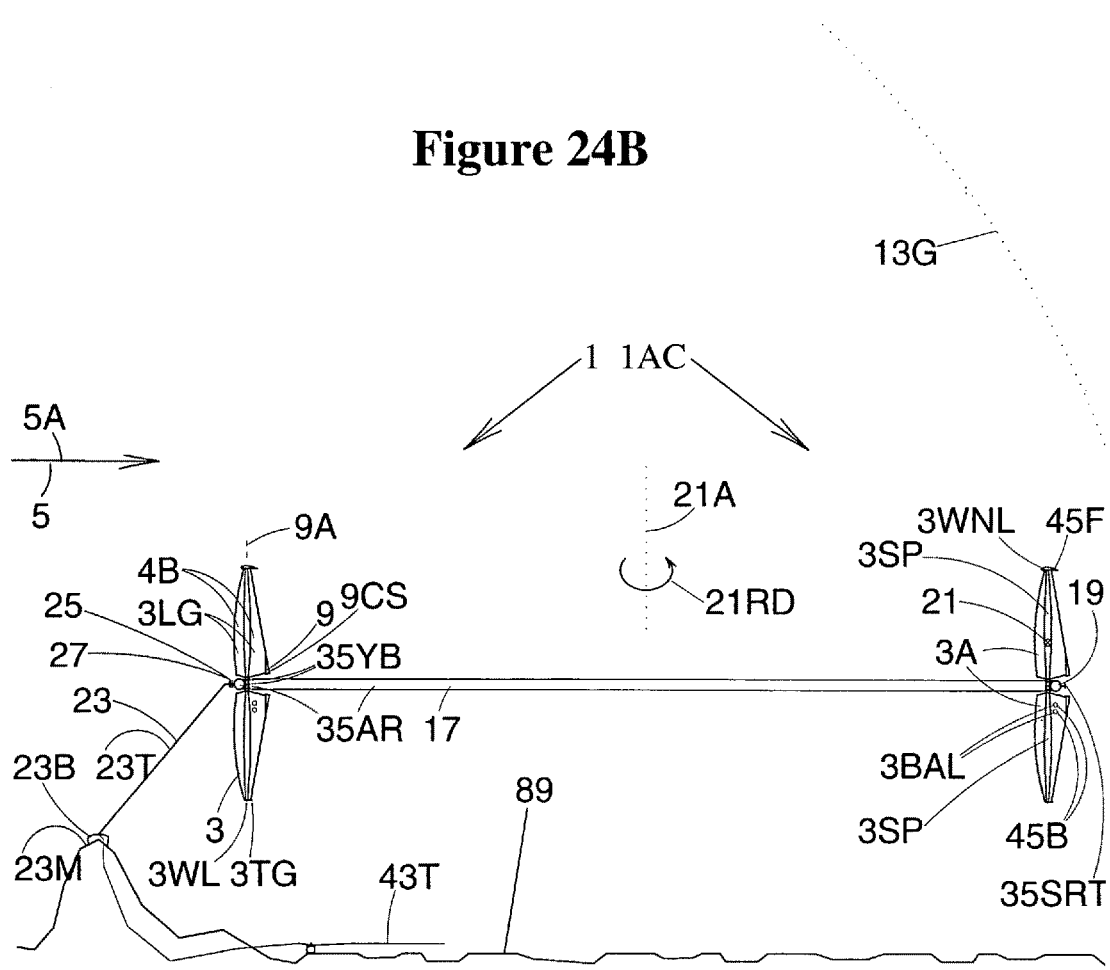

FIGS. 24A and 24B show front views of key elements of embodiments that include a fluid-dynamic renewable energy harvesting system 1 or subsystem thereof, that is supported by aerostatic buoyancy forces in a manner analogous to aerostatically supported dirigibles, airships or balloons.

FIG. 24A shows an embodiment of a fluid-dynamic renewable energy harvesting system 1 that includes both a water current energy harvesting subsystem 1WC and a wind or air current energy harvesting subsystem 1AC, both utilizing a connected anchoring system; wherein the wind or air current energy harvesting subsystem 1AC is supported by aerostatic buoyancy forces in a manner analogous to aerostatically supported dirigibles, airships or balloons.

The water current energy harvesting subsystem 1WC comprises plural fluid-foil means 3 that are hydrofoils or water foil means 3WF. The hydrofoils or water foil means 3WF are buoyant hydrofoils or water foil means 3WB floating on a water surface 13 and arranged in groups of 4 (number not limiting) connected by connecting structure 31 in the form of movable frames 31MF, into floating modules 4BFM. For clarity of illustration only two adjacent floating modules are shown out of plural floating modules, which might number 20 (number not limiting) through the length of connecting means 17 in the form of a substantially closed-loop cable 17C. The closed-loop cable 17C loops around two rotatable pulleys 37 that are rotatable around hubs that are supported by pulley support floats 39F. This arrangement is analogous to the layout of FIG. 2D shown earlier. The pulley support floats 39F is connected to a ground surface 89 that is an underwater ground surface 89U beneath a layer of liquid water 93, by position-keeping means 23 comprising position-keeping tethers or cables 23T that go down to anchors 89B in said underwater ground surface 89U. As a fluid current 5 comprising a water current 5W goes into the page in this view, roughly perpendicular to a line connecting the two rotatable pulleys 37 to maximize water current energy harvestable when the water current direction is typically closely aligned with a prevailing water current direction also going into the page. Water current energy is harvested by the hydrofoil or water foil means 3WF being appropriately oriented as a function of position and time so as to pull the closed-loop cable 17C around the rotatable pulleys 37, at least one of which rotatable pulleys drives energy harvesting means 25 including energy conversion means 27 such as generator means 27G. Harvested energy can be transmitted by means for transmitting energy 43T that can lead to energy use locations, which means for transmitting energy 43T can optionally comprise high-voltage or superconducting electrical cable.

The wind or air current energy harvesting subsystem 1AC is supported by aerostatic buoyancy forces in a manner analogous to aerostatically supported dirigibles, airships or balloons. The wind or air current energy harvesting system 1AC comprises a plurality of airfoil or wind foil means 3A that are filled in considerable part with lifting gas 3LG such as at least one of helium, hydrogen, other lifting gas and hot air; and connecting means 17 comprising a substantially toroidal ring structure that is an airfoil assembly support ring 35AR, that is also preferably inflated with lifting gas 3LG. If hydrogen is used as some or all of the lifting gas, it can optionally be re-supplied from electrolysis of water using energy from generator means 27G to produce hydrogen, which can be fed by a pipe (not shown so as not to clutter the Figure) to the inflated elements to replace leakage losses of the lifting gas (any additional hydrogen produced could optionally be sent by pipe or barge or ship to end user entities on shore). Lightweight structure for the airfoil means 3A and the support ring 35AR may both use advanced strong and light materials such as advanced composites, advanced fabrics and advanced metallic elements, and construction architectures such as those used in rigid, semirigid or nonrigid airships, for example. For clarity of illustration only the most upwind and most downwind airfoil or wind foil means 3A are illustrated (relative to a wind or air current 5A that is also a fluid current 5), with other wind foil means 3A arranged in spaced azimuthal fashion around the periphery of the airfoil assembly support ring 35AR not shown for clarity. The total number of wind foil locations around the perimeter of the airfoil assembly support ring 35AR might number 30 (number not limiting). While devices of many different orders of magnitude scale are possible, one representative large scale would be an airfoil assembly support ring 35AR with a diameter on the order of 3 kilometers, with a corresponding spacing between the most upwind and most downwind airfoil means 3A also of the same order of 3 kilometers distance. For devices of this large scale or larger, it may be desirable to manufacture the airfoils means 3A horizontally, then build up the ring and add airfoils such that the ring rises into the air with the axis 21A initially horizontal for manufacture, then tilted to substantially horizontal when the entire assembly is ready for air or ground towed transportation to an installation site.

As illustrated, each airfoil assembly includes airfoil elements above and below the airfoil assembly support ring 35AR, optionally sharing a common wing spar 3SP as shown. The between-airfoils part of the spar will preferably be approximately cylindrical, and connected to the airfoil assembly support ring 35AR by connection means with yaw bearings 35YB, as illustrated. The use of connection means with yaw bearings 35YB permits each airfoil or wind foil means 3A connected by a common wing spar 3SP, to be independently orientable by control system means 9, to optimize wind energy extraction as a function of local wind direction at the airfoil or wind foil means 3A as they transit around a circuit 21 around axis 21A in rotation direction 21RD. The bottom ends of the airfoil elements below the support ring 35AR may be air filled instead of lifting gas filled, or optionally have water or solid ballast, to ensure that the center of gravity of the entire assembly is below its center of buoyancy.

The aerostatically supported wind or air current energy harvesting subsystem 1AC is held in position by position keeping means 23 here comprising two position-keeping tethers or cables 23T, which are attached at their upper ends to engage a support ring track 35SRT with multiple roller contacts as illustrated, and which are anchored at their lower ends to base structure 23B attached to each of the two pulley support floats 39F, and thence by the underwater tethers or cables 23T leading down to anchors 89B in an underwater ground surface 89U. The above and below water position-keeping tethers or cables 23T, will preferably include dual or multiple load paths to ensure continued safe tethering even in high wind or hurricane conditions or following partial failures caused by impact or material degradation over time.

The aforementioned multiple roller contacts engaging the support ring track 35SRT, also drive means for harvesting energy 25 comprising means for converting energy 27 that can convert some rotational energy of the airfoil assembly support ring 35AR rotating around axis 21A driven by the fluid-foil means 3, into electrical energy using generator means. Harvested energy can subsequently be transmitted by the same means for transmitting energy 43T used for the water current energy harvesting subsystem 1WC.

To keep the wind or air current energy harvesting subsystem 1AC either level or slightly unlevel in a desired tilt angle, means for controlling a buoyant force 45B such as ballonets 3BAL, and/or means for controlling a fluid-dynamic force 45F such as the illustrated winglets 3WNL with either a morphing or deflectable trailing edge, can preferably be provided for beneficial use.

While the embodiment of FIG. 24A has a water current energy harvesting subsystem 1WC wherein fluid-foils are cable-connected and a wind or air current energy harvesting subsystem 1AC wherein fluid-foils are structure-connected; it should be understood that in variant embodiments fluid-foils may be either cable or structure connected for the water current energy harvesting subsystem 1WC; in any combination with fluid-foils being either cable or structure connected for the wind or air current energy harvesting subsystem 1AC.

FIG. 24B shows an embodiment of a fluid-dynamic renewable energy harvesting system 1 that comprises a wind or air current energy harvesting subsystem 1AC (and no connected water current harvesting system); wherein the wind or air current energy harvesting subsystem 1AC is supported by aerostatic buoyancy forces in a manner analogous to aerostatically supported dirigibles, airships or balloons. The wind or air current energy harvesting system 1AC comprises a plurality of airfoil or wind foil means 3A that are filled in considerable part with lifting gas 3LG such as at least one of helium, hydrogen, other lifting gas and hot air; and connecting means 17 comprising a substantially toroidal ring structure that is an airfoil assembly support ring 35AR, that is also preferably inflated with lifting gas 3LG. Lightweight structure for the airfoil means 3A and the support ring 35AR may both use advanced strong and light materials such as advanced composites, advanced fabrics and advanced metallic elements, and construction architectures such as those used in rigid, semirigid or nonrigid airships, for example. For clarity of illustration only the most upwind and most downwind airfoil or wind foil means 3A are illustrated, with others arranged in spaced azimuthal fashion around the periphery of the airfoil assembly support ring 35AR not shown for clarity. While devices of many different orders of magnitude scale are possible, one representative large scale would be an airfoil assembly support ring 35AR with a diameter on the order of 3 kilometers, with a corresponding spacing between the most upwind and most downwind airfoil means 3A also of the same order of 3 kilometers distance. For devices of this large scale or larger, it may be desirable to manufacture the airfoils means 3A horizontally, then build up the ring and add airfoils such that the ring rises into the air with the axis 21A initially horizontal for manufacture, then tilted to substantially horizontal when the entire assembly is ready for air or ground towed transportation to an installation site.

As illustrated, each airfoil assembly includes airfoil elements above and below the airfoil assembly support ring 35AR, optionally sharing a common wing spar 3SP as shown. The between-airfoils part of the spar will preferably be approximately cylindrical, and connected to the airfoil assembly support ring 35AR by connection means with yaw bearings 35YB, as illustrated. The use of connection means with yaw bearings 35YB permits each airfoil or wind foil means 3A connected by a common wing spar 3SP, to be independently orientable by control system means 9, to optimize wind energy extraction as a function of local wind direction at the airfoil or wind foil means 3A as they transit around a circuit 21 around axis 21A in rotation direction 21RD. The bottom ends of the airfoil elements below the support ring 35AR may be air filled instead of lifting gas filled, or optionally have water or solid ballast, to ensure that the center of gravity of the entire assembly is below its center of buoyancy to provide pendulum static stability.

The aerostatically supported wind or air current energy harvesting system 1AC is held in position by position keeping means 23 here comprising a position-keeping tether or cable 23T, which is attached at its upper end to engage a support ring track 35SRT with multiple roller contacts as illustrated, which also drive means for harvesting energy 25 comprising means for converting energy 27 that can convert some rotational energy of the airfoil assembly support ring 35AR rotating around axis 21A driven by the fluid-foil means 3, into electrical energy using generator means. Harvested energy can subsequently be transmitted on means for transmitting energy 43T such as high-voltage or superconducting electrical cable.

The position-keeping tether or cable 23T is anchored at its lower end by base structure to anchor position-keeping tether or cable 23B, which may include anchoring elements in the ground and above-ground structure as well, and may optionally be sited on or near the top of at least one of a mountain and hill and ridge 23M, as illustrated. The position-keeping tether or cable 23T or plural tethers or cables, will preferably include dual or multiple load paths to ensure continued safe tethering even in high wind or hurricane conditions or following partial failures caused by impact or material degradation over time. This type of installation will also permit the entire wind or air current energy harvesting system 1AC to swivel downwind of the base structure 23B as and when the wind changes direction. In alternate variant embodiments multiple tethers or cables may be provided at different azimuths around the circuit 21, to keep the wind or air current energy harvesting system 1AC more tightly located over a particular geographic area.

To keep the wind or air current energy harvesting system 1AC at a desired altitude and either level or slightly unlevel in a desired tilt angle, means for controlling a buoyant force 45B such as ballonets 3BAL, and/or means for controlling a fluid-dynamic force 45F such as the illustrated winglets 3WNL with either a morphing or deflectable trailing edge, can preferably be provided for beneficial use.

FIGS. 24A and 24B illustrate embodiments of a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement, including connecting members 19 that connect adjacently-located fluid-foil means in said sequential arrangement; and energy harvesting means 25 including said control system means 9, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

FIGS. 24A and 24B also illustrate embodiments of a fluid-dynamic renewable energy harvesting system 1, comprising:

plural fluid-foil means 3 for contacting proximate flow fields of a fluid current 5 when said fluid current exists and carries fluid current energy in the form of fluid-dynamic kinetic energy;

an effective axis of rotation 9A around which each of said fluid-foil means can effectively rotate in orientation to some extent, said axis of rotation being disposed within 60 degrees of vertical during normal operation of said fluid-dynamic energy harvesting system;

control system means 9 including actuator means, for controlling time-variable orientations of said fluid-foil means relative to said proximate flow fields of said fluid current when said fluid current exists and carries fluid current energy in the form of fluid-dynamic kinetic energy;

buoyant support means 4B for utilizing a buoyancy force from fluid displacement to at least partially contribute to supporting said fluid-foil means 3 above a ground surface 89;

connecting means 17 for connecting said plural fluid-foil means in a sequential arrangement around a circuit 21 of closed periphery topology enclosing an axis of revolution 21A, wherein said axis of revolution is disposed within 60 degrees of vertical; said connecting means 17 including connecting members 19 that connect adjacently-located movable members in said sequential arrangement;

position-keeping means 23 for maintaining said fluid-dynamic renewable energy harvesting system 1 substantially within a desired geographic envelope 13G; and energy harvesting means 25 including said control system means 9, for converting a portion of said fluid-dynamic kinetic energy into net work on said fluid-foil means over the course of a cycle of substantially periodic motion of said fluid-foil means 3 as they revolve around closed circuit paths substantially corresponding to said circuit 21, by utilizing time-variable fluid-dynamic pressure distributions and resulting forces acting on said fluid-foil means 3 at said time-variable orientations to contribute to driving said substantially periodic motion when said fluid current 5 exists and carries fluid current energy in the form of fluid-dynamic kinetic energy;

said energy harvesting means further including energy conversion means 27 for converting at least some of said net work into energy in a desired form for at least one of transmission, storage, processing and use.

Note that each fluid foil path may vary somewhat from a nominal circuit path, being offset by particular foil location and/or cable or connecting structure movement and/or fluid force induced path displacements.

FIGS. 24A and 24B also illustrate embodiments of a fluid-dynamic renewable energy harvesting system 1, wherein a buoyancy force is provided by displacement of air by an enclosed volume containing a gas 3LG (commonly called "lifting gas" or "lighter than air gas", such as hydrogen, helium and/or hot air) that is less dense than air.

FIGS. 24A and 24B also illustrate embodiments of a fluid-dynamic renewable energy harvesting system 1, wherein a fluid current 5 comprises an air current or wind 5, wherein renewable energy as fluid-dynamic kinetic energy comprises air current or wind energy, and wherein fluid-foil means 3 comprise airfoil means 3A.

Finally, FIGS. 24A and 24B also illustrate embodiments of a fluid-dynamic renewable energy harvesting system 1, further comprising means for controlling a support force acting on said fluid-foil means 3 which means for controlling a support force comprises at least one of means for controlling a buoyant force 45B and means for controlling a fluid dynamic force 45F.

Figure 25A:
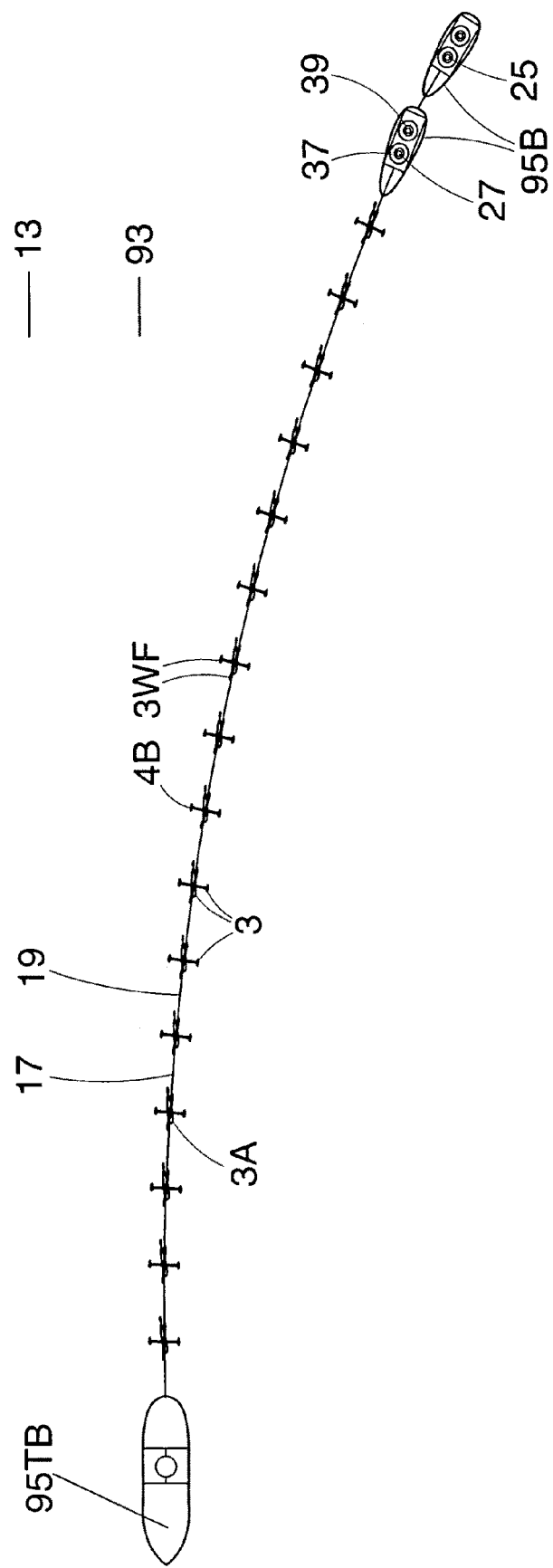
FIGS. 25A, 25B and 25C show plan views of means for transporting fluid-dynamic renewable energy harvesting systems.
Figure 25B:
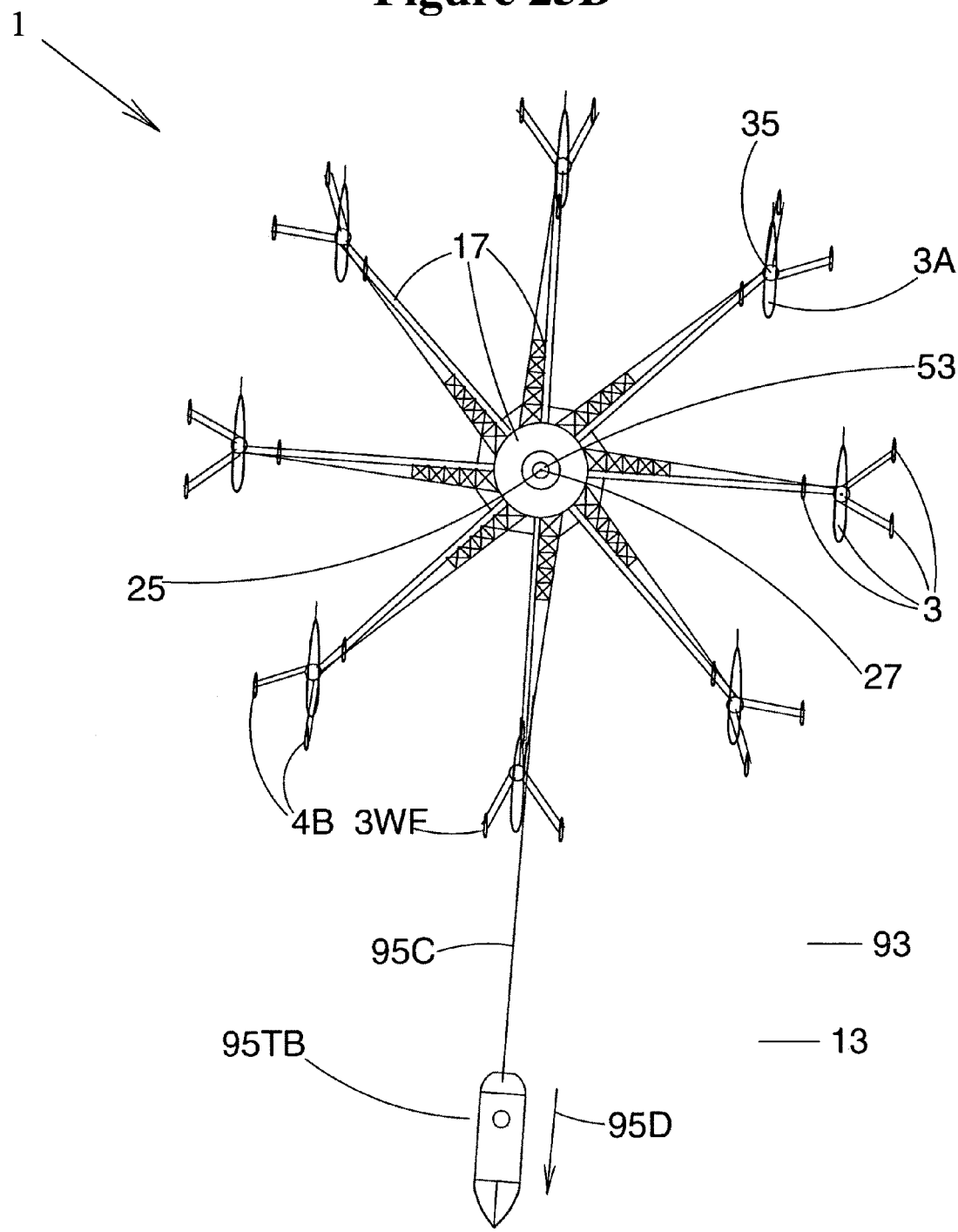
Figure 25C:
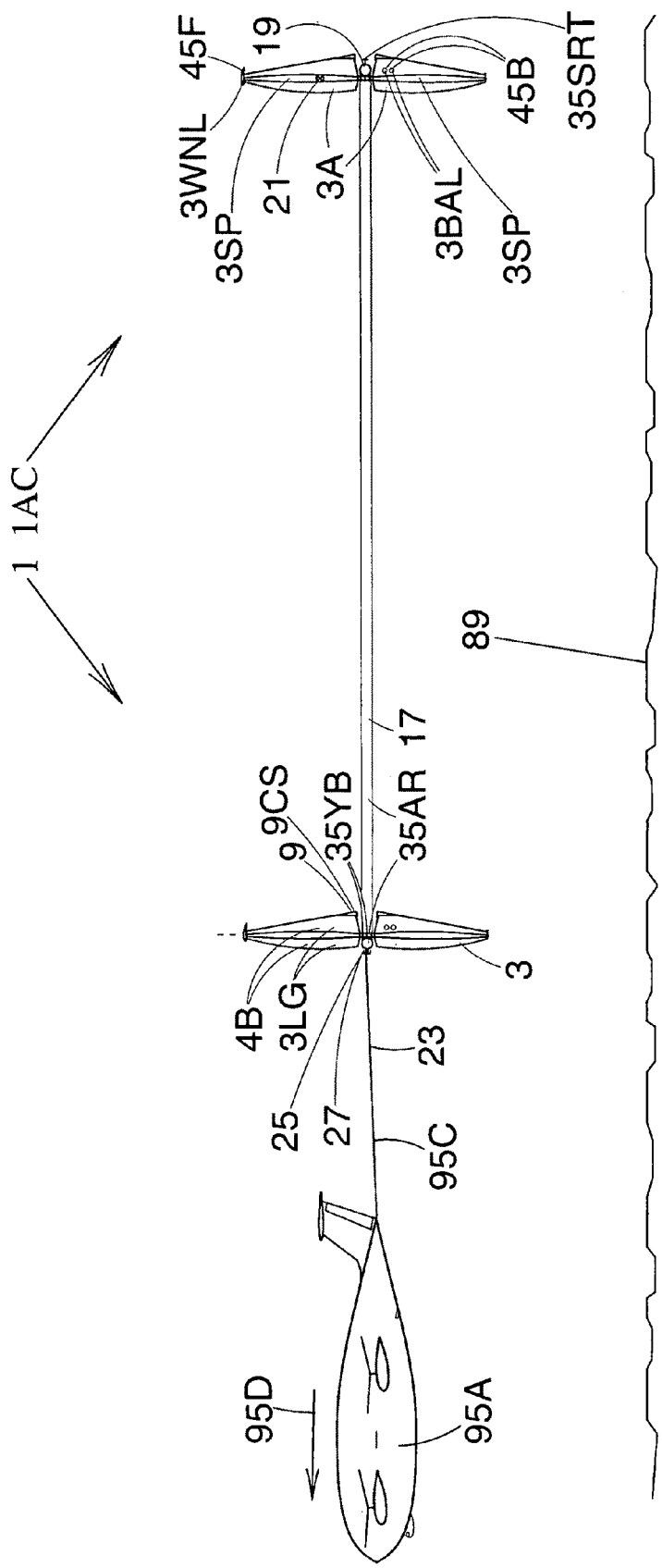

FIGS. 25A, 25B and 25C show plan views of means for transporting fluid-dynamic renewable energy harvesting systems.

FIG. 25A shows a plan view showing transport of the key components of a fluid-dynamic renewable harvesting system similar to that shown in FIG. 2B, towed by at least one tug boat 95TB and utilizing the connecting means 17 to connect towed modules as they are towed on a water surface 13. The connecting means 17 including connecting members 19, may optionally be supplemented by additional tow cable means (not shown). The towed modules include the buoyant support means 4B comprising plural (here four, number not limiting) hydrofoil or water foil means 3WF that have nonzero thickness, connected to airfoil or wind foil means 3A by connecting structure 31; plus a couple of towed barges 95B with the rotatable spools 37 around hubs 39, some number of which also include energy harvesting means 25 including energy conversion means 27 such as generator means. Note that the hydrofoil or water foil means 3WF and the airfoil or wind foil means 3A are both types of fluid-foil means 3. Using this tow-to-site paradigm, it will be possible to manufacture the key elements and subassemblies of a fluid-dynamic renewable energy harvesting system at a central manufacturing facility, then tow the system in the manner shown, to a plurality of desired sites for installation. Final assembly and installation at the sites including setting up the tether and anchor means, can be accomplished with the use of one or more assembly barges or assembly ships.

FIG. 25B shows means for transporting or moving a pre-assembled fluid-dynamic renewable energy harvesting system 1, floating on a water surface 13 above a layer of liquid water 93, by at least one tugboat 95TB and using at least one tow cable 95C. The tugboat 95TB is towing the fluid-dynamic renewable energy harvesting system 1 in tow direction 95D. The fluid-dynamic renewable energy harvesting system 1 shown here is similar to that described earlier with reference to FIG. 3A. The means for transporting or moving may be used to tow the fluid-dynamic renewable energy harvesting system 1 to any of a plurality of installation sites, where installation at the sites including setting up the tether and anchor means, can be accomplished with the use of one or more assembly barges or assembly ships. In one variant concept with the tow cable 95C going underwater to a connection point below the nonrotating hub 53 of the fluid-dynamic renewable energy harvesting system 1, the fluid-dynamic renewable energy harvesting system 1 can be operational while being towed, for example to harvest wind energy and use that harvested wind energy to supply part or all of the towing energy needed, and with any excess harvested wind energy captured by electrolysizing some of the water 93 and storing the resulting hydrogen (and optionally oxygen) on the tugboat 95TB. In a second variant concept, the system could be used on a permanent non-anchored basis, with its normal mode of harvesting wind and water current energy being through the electrolysis of water to generate hydrogen, which can periodically be transferred from the tugboat 95TB to user sites, via either an offshore transfer pipe inlet coupling, or via a transfer vessel. This system would use the thrust and control of the tugboat 95TB as its position-keeping means for maintaining the fluid-dynamic renewable energy harvesting system 1 substantially within a desired geographic envelope; and could be moved to areas of higher wind as weather and wind-storm patterns shift, to increase the amount of energy harvested, and at alternate times it could be temporarily anchored by deployable anchor means that are deployable from either the tugboat 95TB and/or the nonrotating hub 53.

With any embodiments that can be towed while fully assembled, it may also be possible to relocate plural fluid-dynamic renewable energy harvesting systems to locations and arrangements where they can support dual objectives of harvesting more energy and contributing to damage minimization on high-value shoreline areas, during times of wind-storms such as cyclonic wind-storms.

FIG. 25C shows means for transporting an aerostatically supported embodiment of a fluid-dynamic renewable energy harvesting system 1, such as that illustrated in FIG. 24B. In FIG. 25C the means for transporting illustrated comprises use of at least one tow aircraft 95A towing the fluid-dynamic renewable energy harvesting system 1 by means of a tow cable 95C, which may optionally be the energy harvesting system's position-keeping means 23. The illustrated tow aircraft is a heli-stat, or a hybrid aircraft with both an airship type body and propulsive lift such as helicopter type rotors attached. In variant embodiments a variety of tow aircraft can be used within the spirit and scope of the invention, including airships, helicopters, V/STOL aircraft and fixed wing aircraft. Using this tow-to-site paradigm, it will be possible to manufacture most of the fluid-dynamic renewable energy harvesting system 1 at a central manufacturing facility, then tow the system in the air in the manner shown, to a plurality of desired sites for installation. Final assembly and installation at the sites including dropping tether or cable or rod type position-keeping means to ground anchor positions for setting anchoring the system, can be accomplished with the use of one or more ground assembly devices.

Figure 26A:
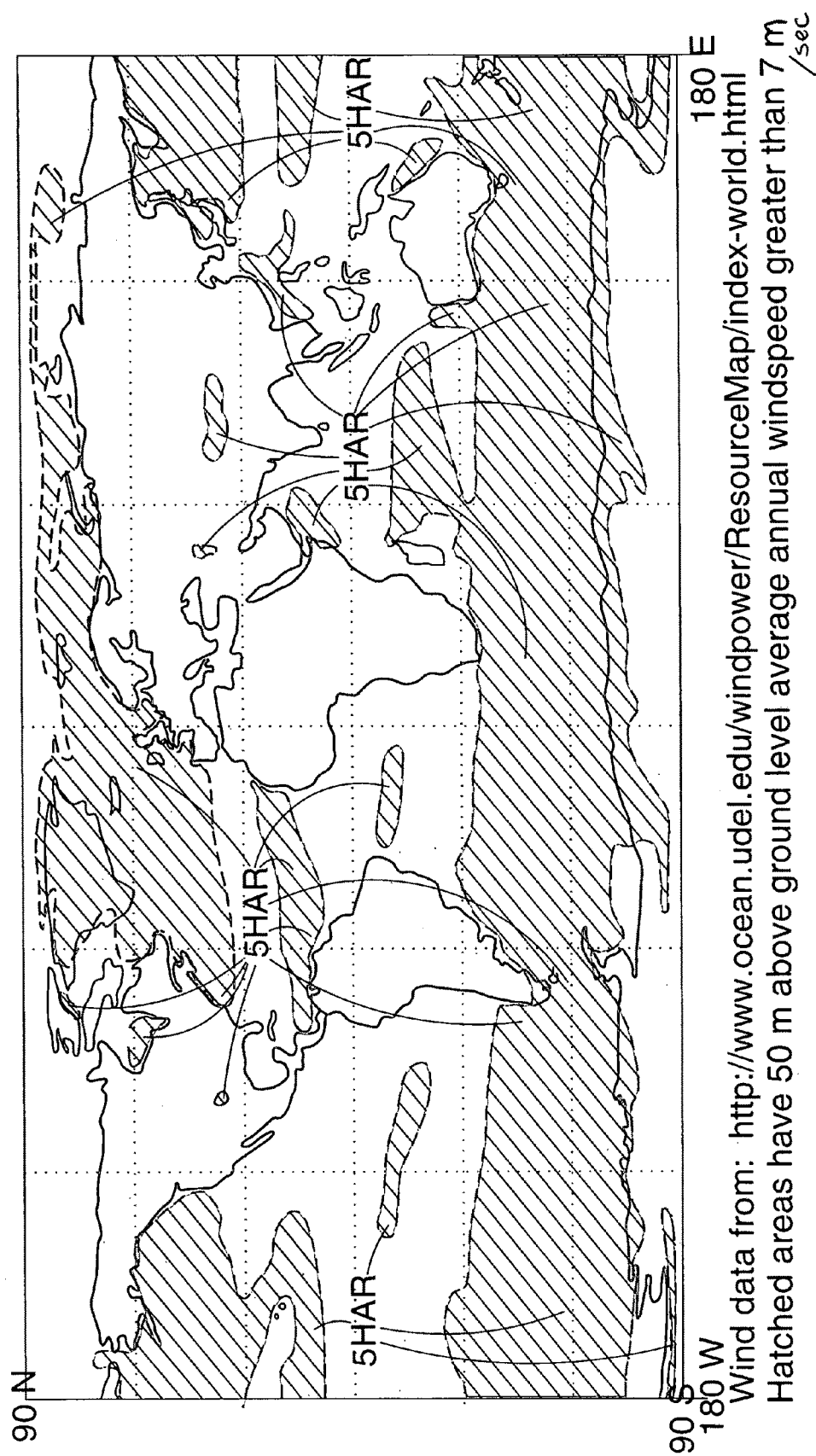
FIGS. 26A and 26B show world maps indicating some preferred locations at which various embodiments of the invention can be beneficially sited, without being limiting or exclusive of many other locations.

FIG. 26A shows a world map indicating some preferred locations at which various embodiments of the invention that include a wind or air current harvesting subsystem can be beneficially sited, without being limiting or exclusive of many other possible locations. Shown in FIG. 26A are very-high-wind regions 5HAR with average annual wind or air current speeds exceeding 7 meters per second at 50 meters above local ground or water level. Note that the majority of these regions are over water, which aids in the implementation of embodiments of the present invention that combine a wind energy harvesting subsystem with a water current energy harvesting system. However, there are also important locations over land, in which wind-only embodiments such as that of FIG. 24B could be sited.

Figure 26B:
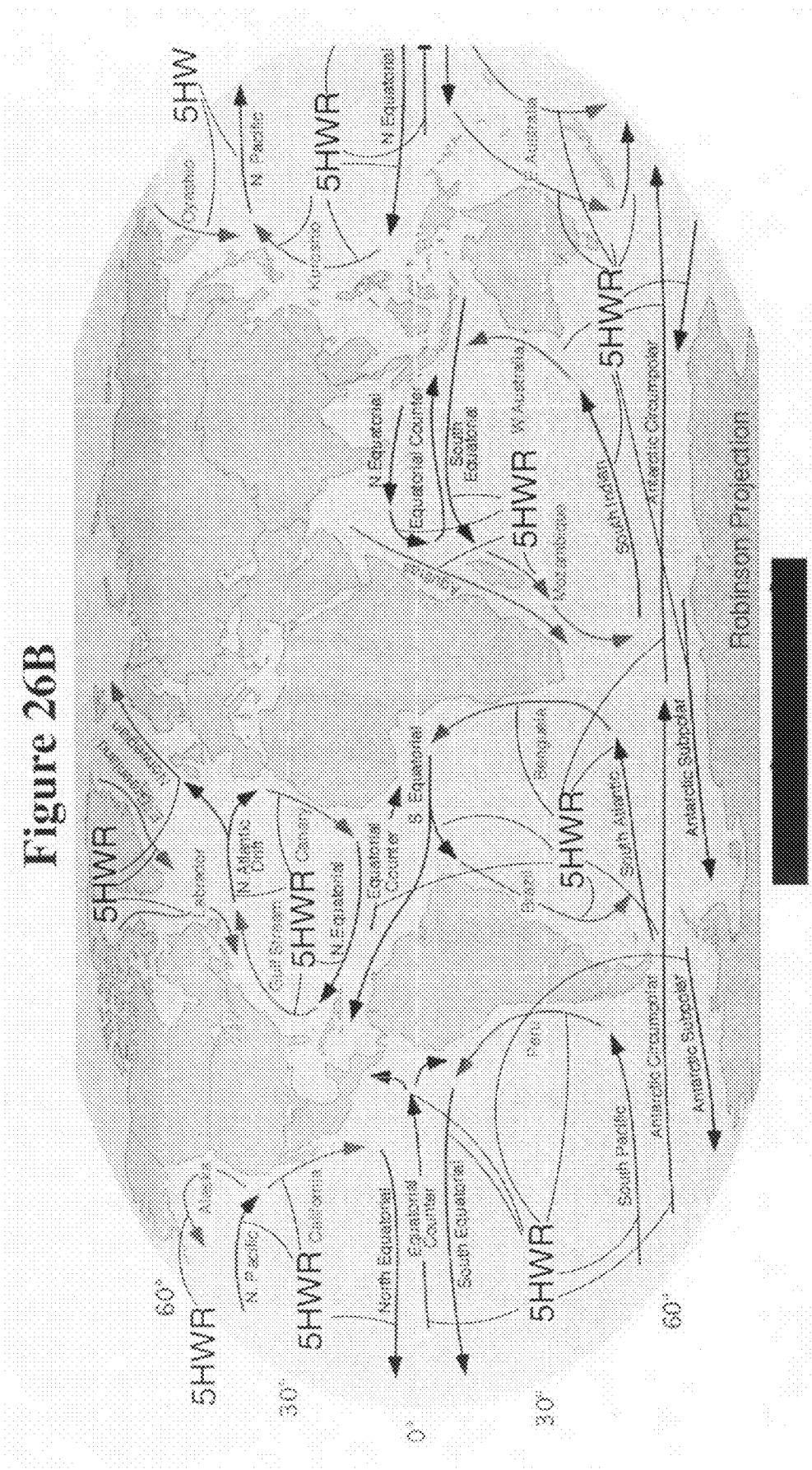

FIG. 26B shows a world map indicating some preferred locations at which various embodiments of the invention that include a water current harvesting subsystem can be beneficially sited, without being limiting or exclusive of many other possible locations. Shown in FIG. 26B are very-high-water current regions 5HWR with strong and persistent ocean currents. It should be understood that some ocean currents such as the Gulf Stream are much stronger than other ocean currents, but that all the ocean currents carry enormous amounts of kinetic energy with potential to be harvested. Use of large quantities of large fluid-dynamic renewable energy harvesting systems 1 of the types described in this invention to harvest both water current and wind energy, suitably sited, can yield energy harvesting at a rate of many tens or hundreds of gigawatts, which could provide for a significant fraction of the World's electric power needs which are currently on the order of one and a half thousand gigawatts. In addition to regions with ocean currents, regions with at least one of tidal currents, river currents, trans-strait currents (as through the Strait of Gibraltar, Strait of Messina, Bering Strait etc.) and other water currents can also be beneficial locations for embodiments of the invention that include a water current harvesting subsystem. Note that many of the regions with strong ocean currents or other water currents also correspond to regions with the very-high-wind regions 5HAR shown earlier in FIG. 26A, which aids in the implementation of embodiments of the present invention that combine a water current energy harvesting subsystem with a wind or air current energy harvesting system.

Certain particular locations may also yield additional benefit mechanisms. For example, locating quantities of large fluid-dynamic renewable energy harvesting systems 1 off the east coast of Florida in the Florida Current, and off the east coast of North Carolina in the Gulf Stream, can extract huge amounts of ocean current and wind energy to provide clean, green renewable energy to serve the eastern states of the United States, and also benefit the World by reducing heat transport in the Gulf Stream to Kalaallit Nunaat (Greenland) and Europe and the Arctic Ocean, reducing the temperature increases in those regions caused by global warming and climate change. This can reduce melting of the Kalaallit Nunaat ice cap and threats to rising ocean levels and coastal communities worldwide, as well as reduce environmentally damaging effects such as dramatic retreat of glaciers in the Alps in Europe and potential extinction of polar bears from depletion of sea ice on the surface of the Arctic Ocean. Careful siting of water current harvesting subsystems in the Gulf Stream could also potentially be used to control the meander directivity of this key ocean current as it goes East and North from the American coast, in beneficial ways. The fluid-dynamic renewable energy harvesting systems 1 can be anchored to the seabed on the continental shelf, but also where needed on the continental slope or in deep ocean water.

While certain preferred embodiments of the invention have been described in detail above with reference to the accompanying Figures, it should be understood that further variations and combinations and alternate embodiments are possible within the spirit and scope of the invention as claimed and described herein.

ACKNOWLEDGEMENT

The inventor offers grateful thanks to God for inspiring this work; and to his wife and son, Usha Sankrithi and Siva Sankrithi, for their steadfast support as well as thought-provoking discussion helping to identify benefits and issues related to the invention.

What is claimed is:

1. A fluid-dynamic renewable energy harvesting system, comprising:
    plural fluid-foil means for contacting proximate flow fields of a fluid current when said fluid current exists and carries fluid current energy in the form of fluid-dynamic kinetic energy;
    an effective axis of rotation around which each of said fluid-foil means can effectively rotate in orientation to some extent, said axis of rotation being disposed within 60 degrees of vertical during normal operation of said fluid-dynamic energy harvesting system;
    control system means including actuator means, for controlling time-variable orientations of said fluid-foil means relative to said proximate flow fields of said fluid current when said fluid current exists and carries fluid current energy in the form of fluid-dynamic kinetic energy;
    buoyant support means for utilizing a buoyancy force from fluid displacement to at least partially contribute to supporting said fluid-foil means above a ground surface;
    connecting means for connecting said plural fluid-foil means in a sequential arrangement, including connecting members that connect adjacently-located fluid-foil means in said sequential arrangement;

and energy harvesting means including said control system means, for converting a portion of said fluid-dynamic kinetic energy into net work on said fluid-foil means over the course of a cycle of substantially periodic motion of said fluid-foil means, by utilizing time-variable fluid-dynamic pressure distributions and resulting forces acting on said fluid-foil means at said time-variable orientations to contribute to driving said substantially periodic motion when said fluid current exists and carries fluid current energy in the form of fluid-dynamic kinetic energy;

said energy harvesting means further including energy conversion means for converting at least some of said net work into energy in a desired form for at least one of transmission, storage, processing and use.

2. The fluid-dynamic renewable energy harvesting system of claim 1, wherein said fluid-foil means for interfacing with a fluid current comprise buoyant hydrofoils for interfacing with a water current; wherein said buoyant hydrofoils contribute to said buoyancy force; wherein said proximate flow fields of said fluid current when said fluid current exists comprise proximate flow fields of a water current when said water current exists; wherein said fluid-dynamic renewable energy in the form of fluid-dynamic kinetic energy comprises water current renewable energy in the form of water current kinetic energy; wherein said time-variable fluid-dynamic forces comprise time-variable hydrodynamic forces;

and further comprising movable members at least partially supported by said buoyancy force, which movable members include airfoil means for interfacing with an air current; and wherein said energy harvesting means further comprises wind energy harvesting means that includes an airfoil control system capable of controlling time-variable airfoil orientations of said airfoil means relative to proximate flow fields of said air current when said air current exists and carries aerodynamic renewable energy in the form of wind kinetic energy, for converting a portion of said wind kinetic energy into net work on said airfoil means over the course of a cycle of airfoil periodic motion of said airfoil means, by utilizing time-variable aerodynamic forces acting on said airfoil means at said time-variable airfoil orientations to further contribute to driving said airfoil periodic motion.

3. The fluid-dynamic renewable energy harvesting system of claim 2, wherein the movable members including airfoil means, each comprise a movable frame connected to both at least one upwardly extending airfoil means and to at least three downwardly extending buoyant hydrofoils.

4. The fluid-dynamic renewable energy harvesting system of claim 1, wherein a portion of said fluid-dynamic renewable energy harvesting system that is supported by said buoyancy force, has a center of gravity location that is below a metacenter associated with said buoyancy force.

5. The fluid-dynamic renewable energy harvesting system of claim 1, wherein said fluid current comprises an air current or wind, wherein said renewable energy as fluid-dynamic kinetic energy comprises air current or wind energy, and wherein said fluid-foil means comprise airfoil means.

6. The fluid-dynamic renewable energy harvesting system of claim 5, wherein said buoyant support means includes said plural hydrofoil means of finite thickness; further comprising water current energy harvesting means including hydrofoil control system means, for converting a portion of water current kinetic energy when a water current exists and carries water current energy in the form of said water current kinetic energy, into net work on said plural hydrofoil means over the course of a cycle of substantially periodic hydrofoil motion of said plural hydrofoil means, by utilizing time-variable fluid-dynamic pressure distributions and resulting hydrodynamic forces acting on said plural hydrofoil means at time-variable hydrofoil orientations to contribute to driving said substantially periodic hydrofoil motion when said water current exists and carries said water current energy in the form of said water current kinetic energy.

7. The fluid-dynamic renewable energy harvesting system of claim 1, wherein said fluid current comprises a water current beneath a water surface, wherein said renewable energy as fluid-dynamic kinetic energy comprises water current energy, and wherein said fluid-foil means comprise hydrofoil of water foil means.

8. The fluid-dynamic renewable energy harvesting system of claim 1, wherein said connecting means includes a substantially closed-loop cable linking all of the plural fluid-foil means in a closed-loop sequential arrangement.

9. The fluid-dynamic renewable energy harvesting system of claim 8, wherein the closed-loop cable loops around at least two buoyantly supported rotatable pulleys.

10. The fluid-dynamic renewable energy harvesting system of claim 9, wherein two specific pulleys of the at least two buoyantly supported rotatable pulleys, are disposed such that a line connecting their respective centers of rotation is disposed within plus or minus 40 degrees from a line perpendicular to a time averaged prevailing flow direction of the fluid current.

11. The fluid-dynamic renewable energy harvesting system of claim 10, further comprising at least one additional specific pulley of the at least two buoyantly supported rotatable pulleys, which at least one additional specific pulley includes at least one of (a) an additional specific downstream pulley that is located downstream or a positive distance along said time averaged prevailing direction, relative to either of the two specific pulleys, and (b) an additional specific upstream pulley that is located upstream or a negative distance along said time averaged prevailing direction, relative to either of the two specific pulleys.

12. The fluid-dynamic renewable energy harvesting system of claim 9, wherein said closed-loop cable and the plural fluid-foil means together execute the cycle of periodic motion, around the at least two buoyantly supported rotatable pulleys, and wherein the energy harvesting means utilizes transfer of some work from said plural fluid-foil means, through tension in the closed-loop cable, to rotational work on at least one buoyantly supported rotatable pulley; and wherein the energy conversion means comprises generator means for converting said rotational work to energy in a desired form comprising at least one of electrical energy and chemical energy.

13. The fluid-dynamic renewable energy harvesting system of claim 12, further comprising at least one of means for transmitting energy, means for conditioning energy, means for processing energy, and means for storing energy.

14. The fluid-dynamic renewable energy harvesting system of claim 1, wherein the buoyant support means for utilizing a buoyancy force from fluid displacement serves as friction-reducing means for reducing frictional forces that act to oppose said motion of said fluid-foil means, relative to an alternate condition wherein said buoyant support means is absent.

15. The fluid-dynamic renewable energy harvesting system of claim 1, further comprising means for controlling a support force acting on said fluid-foil means which means for controlling a support force comprises at least one of means for controlling a buoyant force and means for controlling a fluid dynamic force.

16. The fluid-dynamic renewable energy harvesting system of claim 1, wherein said control system means includes at least one of (i) first sensor means for at least one of measuring and estimating wind direction plus first command generation means for generating airfoil orientation commands intended to control said time-variable orientations of airfoil means that are members of said fluid-foil means plus first actuation means for executing said airfoil orientation commands; and (ii) second sensor means for at least one of measuring and estimating water current direction plus second command generation means for generating hydrofoil orientation commands intended to control said time-variable orientations of hydrofoil means that are members of said fluid-foil means plus second actuation means for executing said hydrofoil orientation commands.

17. The fluid-dynamic renewable energy harvesting system of claim 16, further comprising at least one of (i) airfoil command modification means in said first command generation means, for modifying said airfoil orientation commands to avoid potential harm when said airfoil means are at risk of harm from at least one of wind loads and tipping, and (ii) hydrofoil command modification means in said second command generation means, for modifying said hydrofoil orientation commands to avoid potential harm when said hydrofoil means are at risk of harm from at least one of water current loads and tipping.

* * * * *